US008411745B2

(12) United States Patent
Jang et al.

(10) Patent No.: US 8,411,745 B2
(45) Date of Patent: Apr. 2, 2013

(54) METHOD AND APPARATUS FOR CODING AND DECODING USING BIT-PRECISION

(75) Inventors: Euee-Seon Jang, Seoul (KR); Sun-Young Lee, Seoul (KR); Gi-Seok Son, Seoul (KR); Chung-Ku Lee, Incheon (KR)

(73) Assignee: Humax Co., Ltd., Seongnam-Si (KR)

( * ) Notice: Subject to any disclaimer, the term of this patent is extended or adjusted under 35 U.S.C. 154(b) by 456 days.

(21) Appl. No.: 12/669,770

(22) PCT Filed: Jul. 18, 2008

(86) PCT No.: PCT/KR2008/004232

§ 371 (c)(1), (2), (4) Date: Jan. 19, 2010

(87) PCT Pub. No.: WO2009/011558

PCT Pub. Date: Jan. 22, 2009

(65) Prior Publication Data

US 2010/0158115 A1 Jun. 24, 2010

(30) Foreign Application Priority Data

| | | |
|---|---|---|
| Jul. 18, 2007 | (KR) | 10-2007-0071779 |
| Feb. 20, 2008 | (KR) | 10-2008-0015213 |
| Mar. 17, 2008 | (KR) | 10-2008-0024643 |
| Apr. 23, 2008 | (KR) | 10-2008-0037856 |

(51) Int. Cl.
*H04N 7/32* (2006.01)

(52) U.S. Cl. ......... 375/240.12; 375/E7.243; 375/E7.246

(58) Field of Classification Search ............. 375/240.12, 375/E7.243, E7.246
See application file for complete search history.

(56) References Cited

U.S. PATENT DOCUMENTS

| | | | | |
|---|---|---|---|---|
| 4,947,447 | A | 8/1990 | Miyaoka et al. | |
| 5,963,673 | A | 10/1999 | Kodama et al. | |
| 6,084,908 | A * | 7/2000 | Chiang et al. | 375/240.03 |
| 6,950,466 | B2 | 9/2005 | Kim et al. | |
| 2006/0291565 | A1 | 12/2006 | Chen | |
| 2007/0092150 | A1 | 4/2007 | Chiba et al. | |

FOREIGN PATENT DOCUMENTS

| | | | |
|---|---|---|---|
| EP | 0066697 | A1 | 12/1982 |
| KR | 1998-073962 | A | 11/1998 |
| KR | 10-0636370 | B1 | 10/2006 |
| WO | 92/22166 | A1 | 12/1992 |
| WO | 99/56472 | A1 | 11/1999 |
| WO | 03/005626 | A2 | 1/2003 |
| WO | 2008/060040 | A1 | 5/2008 |

OTHER PUBLICATIONS

"Bit-Precision Method for Low Complex Lossless Image Coding"; ICIC 2005; Part I; LNCS 3644, pp. 155-164; 2005.*

* cited by examiner

*Primary Examiner* — Christopher S Kelley
*Assistant Examiner* — Maria Vazquez Colon
(74) *Attorney, Agent, or Firm* — Birch, Stewart, Kolasch & Birch, LLP

(57) ABSTRACT

Disclosed are a method and an apparatus of encoding/decoding by using a bit precision. In accordance to an aspect of the present invention, it is possible to encoding and decoding an image or a video by using a bit precision. Accordingly, compression efficiency can be improved and the decoding complexity can be reduced by encoding/decoding video data by use of the bit precision.

10 Claims, 42 Drawing Sheets

FIG. 7

```
T : thresh hold value
P(X) : prediction value on X pixel
min(a,b,c,d) : index of minimum value

if(T <|C-D|){
                P(X)=(A+B)/2;
}else{
                switch(min(|E-B|, |F-B|, |G-B|, |(C+F)/2)-B|)
                {
                      case 0: P(X)=C;  break;
                      case 1: P(X)=B;  break;
                      case 2: P(X)=D ;  break;
                      case 3: P(X)=(A+B)/2;
                }
}
```

METHOD AND APPARATUS FOR CODING AND DECODING USING BIT-PRECISION

This application is the National Phase of PCT/KR2008/004232 filed on Jul 18, 2008, which claims priority under 35 U.S.C. 119(a) to Patent Application No. 10-2007-0071779, 10-2008-0024643, 10-2008-0037856, 10-2008-0015213 filed in Korea on Jul. 18, 2007, Mar. 17, 2008, Apr. 23, 2008 and Feb. 20, 2008; respectively, all of which are hereby expressly incorporated by reference into the present application.

TECHNICAL FIELD

The present invention relates to an apparatus for coding and decoding (hereinafter, referred to as coding/decoding), more specifically to a coding/decoding method and apparatus for improving compression efficiency of video data.

BACKGROUND ART

With the increase of data transmission capacity per second through the Internet, there has been an increased amount of multimedia data, including video and picture files, over the past, when simple text data had been mostly transmitted. Accordingly, there has been an increased demand for video compression technologies.

A video is compressed by undergoing an entropy coding, which transforms a bit string indicating a symbol of data to another form. The entropy coding is classified into a Huffman coding and an arithmetic coding. In particular, the Huffman coding is popularly used in many video compression codecs because of its efficient compression and proper decoding complexity. In spite of having high decoding complexity, the arithmetic coding has relatively high compression efficiency. Accordingly, the arithmetic coding is used in the fields which require the high compression efficiency.

The recent advent of low-performance mobile media apparatuses, which runs in limited power, requires an entropy coding method that has less complex decoding. Nevertheless, there have been far less studies on how to make the decoding less complex than how to improve the video compression efficiency.

An entropy coding method using a bit precision has been recently suggested to lower the decoding complexity. However, the entropy coding method has low compression efficiency because of additionally inserting one bit precision into a bitstream per VOP or macroblock.

DISCLOSURE

Technical Problem

Accordingly, the present invention provides a coding/decoding method and apparatus using a bit precision that can improve compression efficiency by selecting an adequate predictor without a generated additional bit.

The present invention also provides a coding/decoding method and apparatus using a bit precision that can lower a decoding complexity and shorten a decoding time by using the bit precision.

The present invention provides a coding/decoding method and apparatus using a bit precision that can encode/decode video data by using an prediction bit precision computed based on an adjacent macroblock, to thereby improve compression efficiency.

The present invention provides a coding/decoding method and apparatus using a bit precision that can encode/decode video data by using a bit precision corresponding to symbols of an adjacent macroblock, to thereby improve compression efficiency and lower decoding complexity.

The present invention provides a coding/decoding method and apparatus using a bit precision that can encode/decode video data by using a bit precision selected by a plurality of methods, to thereby improve compression efficiency.

In addition, the present invention provides a coding/decoding method and apparatus using a bit precision that can encode/decode video data by differently computing a bit precision per each field, to thereby improve compression efficiency.

Technical Solution

An aspect of the present invention features an apparatus capable of encoding video data by using a bit precision.

In accordance with an embodiment of the present invention, an encoding apparatus using a bit precision can include a predicting unit, configured to determine a predicting method of each target pixel of a video datum to be encoded and to compute a prediction value of the target pixel by using the predicting method; an encoding unit, configured to compute an error value by using the prediction value, to successively increase a size of a predetermined block at an increment of a predetermined unit from a predetermined size of the block and to select a first bit precision value according to the error value corresponding to the block to encode the error value; and a variable block forming unit, configured to compute a variable block forming information indicating a forming of a block having an minimum compression capacity by using an encoded result of the block. Here, the encoding unit can generate a bitstream by encoding a block according to the computed variable block forming information.

In accordance with another embodiment of the present invention, an encoding apparatus using a bit precision can include an adaptive bit precision computing unit, configured to compute an adaptive bit precision and an adaptive bit string of a symbol; and an encoding unit, configured to compute a bit precision per field and to insert the adaptive bit string and any one of the bit precision and the adaptive bit precision, according to whether the bit precision is identical to the adaptive bit precision, into a bitstream. Here, the encoding unit can further inserts a bit indicating whether the adaptive bit precision is identical to the adaptive bit string into the bitstream.

In accordance with another embodiment of the present invention, an encoding apparatus can include a bit precision computing unit, configured to compute a bit precision per field; a prediction bit precision computing unit, configured to compute a prediction bit precision of a symbol per block; and an encoding unit, configured to encode the symbol by using any one of the bit precision and the prediction bit precision according to a value of the prediction bit precision.

In accordance with another embodiment of the present invention, an encoding apparatus can include an adaptive bit precision computing unit, configured to compute an adaptive bit precision and an adaptive bit string per symbol; a bit precision computing unit, configured to compute a bit precision per predetermined field; and an encoding unit, configured to encode an input datum by using any one of the adaptive bit precision and the bit precision according to a type of a target field.

Another aspect of the present invention features an apparatus capable of decoding video data by using a bit precision.

In accordance with an embodiment of the present invention, a decoding apparatus using a bit precision can include a block generating unit, configured to generate a variable block by using a variable block forming information being extracted from a bitstream to be decoded; a decoding unit, configured to compute an error value by decoding the bitstream by use of a first bit precision value, a second bit precision value and the variable block forming information being extracted from the bitstream to be decoded; a predicting unit, configured to determine a predicting method of each target pixel of a video datum to be decoded and to compute a prediction value of the target pixel by using the predicting method; and a reconstructing unit, configured to compute a pixel value by using the error value and the prediction value.

In accordance with another embodiment of the present invention, a decoding apparatus using an adaptive bit precision can include an adaptive bit precision extracting unit, configured to extract at least one of an adaptive bit precision and an adaptive bit string from a bitstream; and a decoding unit, configured to extract a bit precision from the bitstream and to decode the adaptive bit string as a symbol by using any one of the bit precision and the adaptive bit precision according to whether the bit precision is identical to the adaptive bit precision. Here, the adaptive bit precision extracting unit can determine whether to extract the adaptive bit precision according to whether the bit precision is identical to the adaptive bit precision.

In accordance with another embodiment of the present invention, a decoding apparatus can include a bit precision extracting unit, configured to extract a bit precision from a bitstream; a prediction bit precision computing unit, configured to compute a prediction bit precision of a datum to be decoded of a target block; and a decoding unit, configured to decode the datum to be decoded as a symbol by using any one of the bit precision and the prediction bit precision according to a value of the prediction bit precision.

In accordance with another embodiment of the present invention, an encoding apparatus can include an adaptive bit precision computing unit, configured to compute an adaptive bit precision and an adaptive bit string of a symbol; and an encoding unit, configured to compute a bit precision per field and to insert the adaptive bit string and any one of the bit precision and the adaptive bit precision, according to whether the bit precision is identical to the adaptive bit precision, into a bitstream. Here, the encoding unit can further insert a bit indicating whether the adaptive bit precision is identical to the adaptive bit string into the bitstream.

Another aspect of the present invention features a method capable of encoding video data by using a bit precision and a recorded medium recorded with a program for executing the same.

In accordance with an embodiment of the present invention, an encoding method using a bit precision can include (a) determining a predicting method corresponding to each target pixel of a video datum to be encoded; (b) computing a prediction value of the target pixel corresponding to the predicting method; (c) computing an error value by using the prediction value, successively increasing a size of a predetermined block at an increment of a predetermined unit from a predetermined size of the block and selecting a bit precision value according to the an error corresponding to the block and selecting according the error value corresponding to the block; (d) encoding the error value by using the selected bit precision value; (e) computing a variable block forming information that minimizes compression capacity by using a result of encoding the block, and (f) generating a bitstream by encoding a block according to the computed variable block forming information.

In accordance with another embodiment of the present invention, a recorded medium tangibly embodying a program of instructions executable by an encoding apparatus to perform an encoding method using a bit precision, the recorded medium being readable by the encoding apparatus, the program can include (a) determining a predicting method corresponding to each target pixel of a video datum to be encoded; (b) computing a prediction value of the target pixel corresponding to the predicting method; (c) computing an error value by using the prediction value, successively increasing a size of a predetermined block at an increment of a predetermined unit from a predetermined size of the block and selecting a bit precision value according to the an error corresponding to the block and selecting according the error value corresponding to the block; (d) encoding the error value by using the selected bit precision value; (e) computing a variable block forming information that minimizes compression capacity by using a result of encoding the block, and (f) generating a bitstream by encoding a block according to the computed variable block forming information.

In accordance with another embodiment of the present invention, an encoding method using an adaptive bit precision can include computing a bit precision per field and inserting the bit precision into a bitstream; computing an adaptive bit precision of a symbol; computing an adaptive bit string of the symbol by using the adaptive bit precision; inserting a bit indicating whether the bit precision is identical to the adaptive bit precision into the bitstream; inserting at least one of the adaptive bit precision and the adaptive bit string, according to whether the bit precision is identical to the adaptive bit precision, into the bitstream.

In accordance with another embodiment of the present invention, a recorded medium tangibly embodying a program of instructions executable by an encoding apparatus to perform an encoding method using an adaptive bit precision, the recorded medium being readable by the encoding apparatus, the program can include computing a bit precision per field and inserting the bit precision into a bitstream; computing an adaptive bit precision of a symbol; computing an adaptive bit string of the symbol by using the adaptive bit precision; inserting a bit indicating whether the bit precision is identical to the adaptive bit precision into the bitstream; inserting at least one of the adaptive bit precision and the adaptive bit string, according to whether the bit precision is identical to the adaptive bit precision, into the bitstream.

In accordance with another embodiment of the present invention, an encoding method can include computing a bit precision per field; computing a prediction bit precision of a symbol per block; and encoding the symbol by using any one of the bit precision and the prediction bit precision according to a value of the prediction bit precision.

In accordance with another embodiment of the present invention, a recorded medium tangibly embodying a program of instructions executable by an encoding apparatus to perform an encoding method of the encoding apparatus, the recorded medium being readable by the encoding apparatus, the program can include computing a bit precision per field; computing a prediction bit precision of a symbol per block; and encoding the symbol by using any one of the bit precision and the prediction bit precision according to a value of the prediction bit precision.

In accordance with another embodiment of the present invention, an encoding method can include computing an adaptive bit precision and an adaptive bit string per symbol;

computing a bit precision per predetermined field; and encoding an input datum by using any one of the adaptive bit precision and the bit precision according to a type of a target field.

In accordance with another embodiment of the present invention, a recorded medium tangibly embodying a program of instructions executable by a digital processing apparatus to perform an encoding method capable of encoding input data, the recorded medium being readable by the digital processing apparatus, the program can include computing an adaptive bit precision and an adaptive bit string per symbol; computing a bit precision per predetermined field; and encoding an input datum by using any one of the adaptive bit precision and the bit precision according to a type of a target field.

Another aspect of the present invention features a method capable of decoding video data by using a bit precision and a recorded medium recorded with a program for executing the same.

In accordance with an embodiment of the present invention, a decoding method using a bit precision can include (a) generating a variable block by extracting a variable block forming information from a bitstream to be decoded; (b) extracting a bit precision value from the bitstream; (c) computing an error value by decoding the bitstream by use of the bit precision value and the variable block; (d) determining a predicting method of each target pixel of a video datum to be decoded and computing a prediction value of the target pixel by using the predicting method; and (e) reconstructing a video datum by using the error value and the prediction value.

In accordance with another embodiment of the present invention, a recorded medium tangibly embodying a program of instructions executable by a decoding apparatus to perform a decoding method using a bit precision, the recorded medium being readable by the decoding apparatus, the program can include (a) generating a variable block by extracting a variable block forming information from a bitstream to be decoded; (b) extracting a bit precision value from the bitstream; (c) computing an error value by decoding the bitstream by use of the bit precision value and the variable block; (d) determining a predicting method of each target pixel of a video datum to be decoded and computing a prediction value of the target pixel by using the predicting method; and (e) reconstructing a video datum by using the error value and the prediction value.

In accordance with another embodiment of the present invention, a decoding apparatus using an adaptive bit precision can include extracting a bit precision from a bitstream; extracting at least one of an adaptive bit precision and an adaptive bit string from the bitstream according to whether the bit precision is identical to the adaptive bit string; and decoding the adaptive bit string as a symbol by using any one of the bit precision and the adaptive bit precision according to whether the bit precision is identical to the adaptive bit precision.

In accordance with another embodiment of the present invention, a recorded medium tangibly embodying a program of instructions executable by a decoding apparatus to perform a decoding method using an adaptive bit precision, the recorded medium being readable by the decoding apparatus, the program can include decoding apparatus using an adaptive bit precision, the program can include extracting a bit precision from a bitstream; extracting at least one of an adaptive bit precision and an adaptive bit string from the bitstream according to whether the bit precision is identical to the adaptive bit string; and decoding the adaptive bit string as a symbol by using any one of the bit precision and the adaptive bit precision according to whether the bit precision is identical to the adaptive bit precision.

In accordance with another embodiment of the present invention, a decoding method can include extracting a bit precision from a bitstream; computing a prediction bit precision of a datum to be decoded; and decoding the datum to be decoded as a symbol by using any one of the bit precision and the prediction bit precision according to a value of the prediction bit precision.

In accordance with another embodiment of the present invention, a recorded medium tangibly embodying a program of instructions executable by a decoding apparatus to perform a decoding method of the decoding apparatus, the recorded medium being readable by the decoding apparatus, the program can include extracting a bit precision from a bitstream; computing a prediction bit precision of a datum to be decoded; and decoding the datum to be decoded as a symbol by using any one of the bit precision and the prediction bit precision according to a value of the prediction bit precision.

In accordance with another embodiment of the present invention, a decoding method can include computing an adaptive bit precision and an adaptive bit string per symbol; extracting a bit precision from a bitstream per predetermined field; and decoding the bitstream by using any one of the adaptive bit precision and the bit precision according to a type of a target field.

In accordance with another embodiment of the present invention, a recorded medium tangibly embodying a program of instructions executable by a digital processing apparatus to perform a decoding method of a bitstream, the recorded medium being readable by the digital processing apparatus, the program can include computing an adaptive bit precision and an adaptive bit string per symbol; extracting a bit precision from a bitstream per predetermined field; and decoding the bitstream by using any one of the adaptive bit precision and the bit precision according to a type of a target field.

Advantageous Effects

The present invention can select an adequate predictor without a generated additional bit to improve compression efficiency by providing a coding/decoding method and device using a bit precision The present invention can also lower a decoding complexity and shorten a decoding time by using the bit precision.

The present invention can encode/decode video data by using a prediction bit precision computed based on an adjacent macroblock, to thereby improve compression efficiency.

The present invention can encode/decode video data by using a bit precision corresponding to symbols of an adjacent macroblock, to thereby improve compression efficiency and lower decoding complexity.

The present invention can encode/decode video data by using a bit precision selected by a plurality of methods, to thereby improve compression efficiency.

In addition, the present invention can encode/decode video data by differently computing a bit precision per each field, to thereby improve compression efficiency.

DESCRIPTION OF DRAWINGS

FIG. 7 shows a prediction algorithm considering a boundary of video data in accordance with an embodiment of the present invention;

MODE FOR INVENTION

Figure 1:
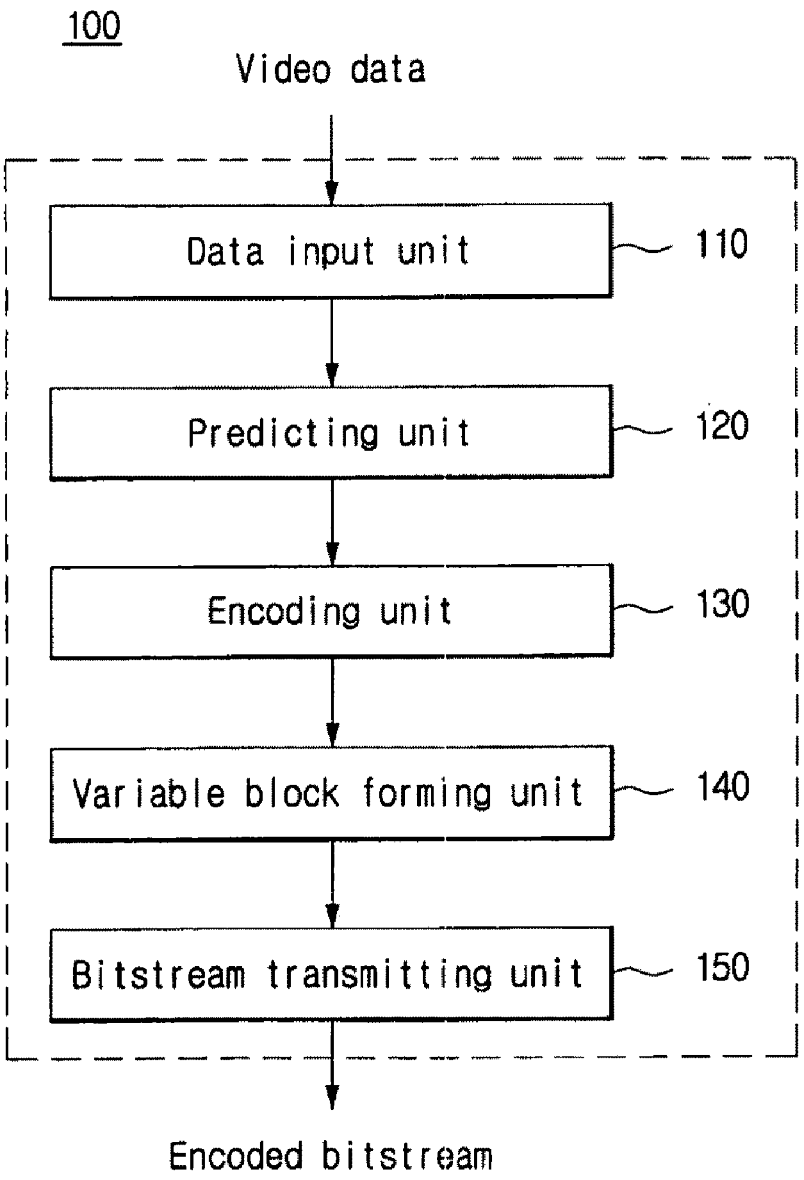
FIG. 1 is a block diagram showing an encoding apparatus in accordance with an embodiment of the present invention.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention. Throughout the drawings, similar elements are given similar reference numerals. Throughout the description of the present invention, when describing a certain technology is determined to evade the point of the present invention, the pertinent detailed description will be omitted.

Terms such as "first" and "second" can be used in describing various elements, but the above elements shall not be restricted to the above terms. The above terms are used only to distinguish one element from the other.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof Hereinafter, some embodiments of the present invention will be described in detail with reference to the accompanying drawings.

For the convenience of understanding and description, the conception of the encoding method using a bit-precision in accordance with an embodiment of the present invention will be firstly described as follows.

The encoding method in accordance with an embodiment of the present invention determines a bit precision for each symbol of input data. Here, the symbol refers to a word unit, which forms the input data. The bit precision indicates a length of a unit bitstream for encoding each symbol by using a bit or a binary code. For example, if the bit precision is n, an inputted symbol is represented and encoded in the binary code by using the unit bitstreams in the quantities of n.

It is assumed that the inputted symbols are {2, 1, 0, 4, 5 3} and the bit-precision value is 2. Values 0 through 3 can be represented by using two bits. If the symbol value is larger than 3, it is impossible to represent the symbol value by using 2 bits. Accordingly, the symbol value that is larger than 3 is represented by additionally assigning two bits.

In particular, the symbol values "2", "1", and '0' are binarized as "10," "01" and "00. " However, since the symbol value "4" is larger than "3" that is the maximum value capable of being represented by using 2 bits, it is impossible that the symbol value "4" is represented by using 2 bits only.

Accordingly, the symbol value "4" is represented by allowing the "3" that is the maximum value capable of being represented by using 2 bits to be represented as "11" and the remainder, "1. " to be represented as "01" by using another 2 bits. As a result, the symbol "4" is represented as "1101" by adding another 2 bits to the first 2 bits. Similarly, the symbol value "5" is represented as "1110" by using the maximum value "3" with 2 bits and the remainder "2" with another 2 bits. Even though it is possible that the symbol value "3" is represented by the 2 bits only, the symbol value "3" is represented by additionally using another 2 bits for the remainder "0" as "1100" in order to distinguish what is represented for 3 and more from what is represented for 3.

If the aforementioned coding method using a bit-precision is applied to the symbol values of data of 0 through 9, the symbol values can be represented as shown in the following table 1.

TABLE 1

| | Bit-precision Value 1 Bit | Bit-precision Value 2 Bit | Bit-precision Value 3 Bit | Bit-precision Value 4 Bit | Bit-precision Value 5 Bit |
|---|---|---|---|---|---|
| 0 | 0 | 00 | 000 | 0000 | 00000 |
| 1 | 01 | 01 | 001 | 0001 | 00001 |
| 2 | 001 | 10 | 010 | 0010 | 00010 |
| 3 | 0001 | 1100 | 011 | 0011 | 00011 |
| 4 | 00001 | 1101 | 100 | 0100 | 00100 |
| 5 | 000001 | 1110 | 101 | 0101 | 00101 |
| 6 | 0000001 | 111100 | 110 | 0110 | 00110 |
| 7 | 00000001 | 111101 | 111000 | 0111 | 00111 |
| 8 | 000000001 | 111110 | 111001 | 1000 | 01000 |
| 9 | 0000000001 | 11111100 | 111010 | 1001 | 01001 |

As shown in the table 1, encoding strings of symbols corresponding to bit precision values are different from each other. Accordingly, it is required to determine which bit precision of various types of bit precisions is used to encode input data before the encoding operation is performed. An encoding compression rate of the input data is also varied depending on the determined bit precision. The symbols to be encoded are encoded by using all bit precisions. Then, the bit precision having the best compression rate is finally selected for the bit precision to be encoded.

For example, if it is assumed that the encoding is performed by using the bit precision values, 1 through 3, all symbols of a certain macroblock is encoded by using the bit precision values, 1 through 3. At this time, if the macroblocks encoded by using the bit precisions, 1, 2 and 3 have the capacities of 3, 2 and 1 Mbyte, respectively, the bit precision 3 is finally selected as the bit precision of the pertinent macroblock.

In accordance with an embodiment of the present invention, an additional bit precision (hereinafter, referred to as an "adaptive bit precision") can be computed corresponding to each symbol in addition to the bit precision. Here, the adaptive bit precision refers to the length of a unit bit string for encoding each symbol. Hereinafter, the adaptive bit precision will be briefly described for the convenience of understanding and description.

Each symbol can be represented in the adaptive bit precision and an adaptive bit string before being inserted into the bitstream. The below table 2 shows the adaptive bit precision and the adaptive bit string of each symbol.

TABLE 2

| Symbol | Adaptive bit precision | Adaptive bit string |
|---|---|---|
| 0 | 0 | — |
| 1 | 1 | — |
| 2 | 2 | — |
| 3 | 3 | 00 |
| 4 | 3 | 01 |
| 5 | 3 | 10 |
| 6 | 3 | 11 |
| 7 | 4 | 000 |
| 8 | 4 | 001 |

The length of each adaptive bit string is determined as a value obtained by subtracting "1" from the adaptive bit precision. For example, if the adaptive bit precision is "3," the length of the pertinent adaptive bit string as "2" (i.e. 2 bits). At this time, if the adaptive bit precision has the values of 0 through 2, the symbol is represented in the adaptive bit precision only without the adaptive bit string. Since the length of each adaptive bit string is a value obtained by subtracting "1" from the adaptive bit precision, the adaptive bit strings can represent the symbols in the quantities of the $n^{th}$ power of 2. Here, n is obtained by subtracting "1" from the adaptive bit precision. For example, the adaptive bit precision, 3, can represent 4 symbols, and the adaptive bit precision, 4, can represent 8 symbols. In the case of the adaptive bit precision, 3, as shown in the table 2, "00," "01," "10" and "11" correspond to 3, 4, 5 and 6, respectively. In the case of the adaptive bit precision, 4, "000," "001," "010," "011," "100," "101," "110" and "111" correspond to 7, 8, 9, 10, 11, 12, 13 and 14, respectively. The aforementioned adaptive bit precision and adaptive bit string are inserted to a bitstream before being transmitted to a decoder. At this time, the adaptive bit precision can be inserted to the bitstream by undergoing an additional process. This will be described in detail below with reference to the related drawings.

FIG. 1 is a block diagram showing an encoding apparatus in accordance with an embodiment of the present invention.

Referring to FIG. 1, the encoding apparatus 100 in accordance with an embodiment of the present invention includes a data input unit 110, a predicting unit 120, an encoding unit 130, a variable block forming unit 140 and a bitstream transmitting unit 150.

A function and operation of each element of the encoding apparatus 100 will be described below in detail with reference to FIG. 2.

Figure 2:
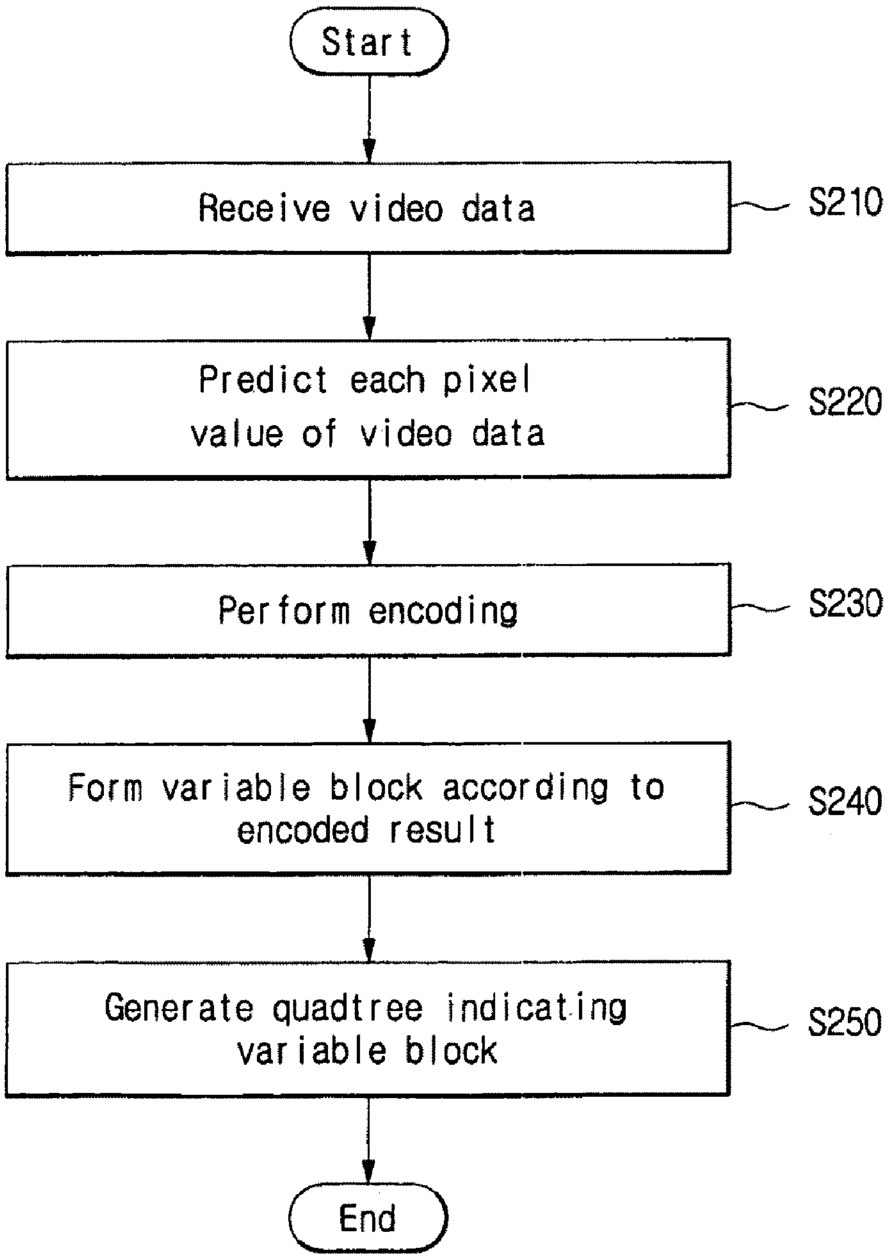
FIG. 2 is a flow chart showing how an encoding apparatus encodes video data by using a bit precision in accordance with an embodiment of the present invention.

FIG. 2 is a flow chart showing how an encoding apparatus encodes video data by using a bit precision in accordance with an embodiment of the present invention. Although the operations to be described below are performed by each inner element of the encoding apparatus 100, the inner elements are collectively referred to as the encoding apparatus for the convenience of understanding and description.

The data input unit 110 receives video data from an outside in a step represented by 210.

The predicting unit 120 computes a prediction value of an target pixel to be predicted from the received video data in a step represented by 220. The predicting unit 120 also computes the difference between the computed prediction value and a pixel value of the target pixel and determines its absolute value as an error value and its sign as a sign bit. This will be described in more detail below with reference to the related drawings.

In a step represented by 230, the encoding unit 130 encodes the foresaid error value by using a bit precision value selected in a block unit of a size of $2^n \times 2^n$ (n is a nature number and equal to or larger than 1) and stores compression capacity of each encoded block. The encoding unit also repeatedly performs the above operation and stores corresponding compression capacity with successively increasing the value of n until it is impossible that a block of a larger size is determined.

In a step represented by 240, the variable block, forming unit 140 forms a variable block by using the compression capacity stored in the step represented by 230 such that the overall input video is compressed in a maximum. This will be described below in more detail with reference to FIG. 3.

In accordance with another embodiment of the present invention, which is not shown in FIG. 2, the encoding unit 130 encodes the foresaid error value by using a bit precision value selected in a block unit of a size of $2^n \times 2^n$ (n is a nature number and equal to or larger than 1) and stores compression capacity of each encoded block in the step represented by 230, in which a first operation determines n as 1. The variable block forming unit 140 generates variable block forming information indicating a current variable block configuration in the step represented by 240. Then, the encoding unit 130 determines n as 2 to encode each block. The variable block forming unit 140 compares the summation of the compressed capacity of the blocks having the same pixels as each block when n is designated as 2 among the blocks of the currently formed variable block with the compressed capacity of each block when n is designated as 2. As the result of comparing, the variable block forming unit 140 re-forms the variable block by using the blocks satisfying the condition that the summation of the compressed capacity of the blocks having the same pixels as each block when n is designated as 2 among the blocks of the currently formed variable block is smaller than the compressed capacity of each block when n is designated as 2. The encoding unit 100 repeats the steps step represented by 230 and 240 until a block having a size of $2^n \times 2^n$ is not larger than a video.

In a step represented by 250, the variable block forming unit 140 generates variable block forming information indicating the variable block formed in the step represented by 240. The variable block forming information is represented in a bit string having a predetermined form before being inserted into a bitstream.

Figure 3:
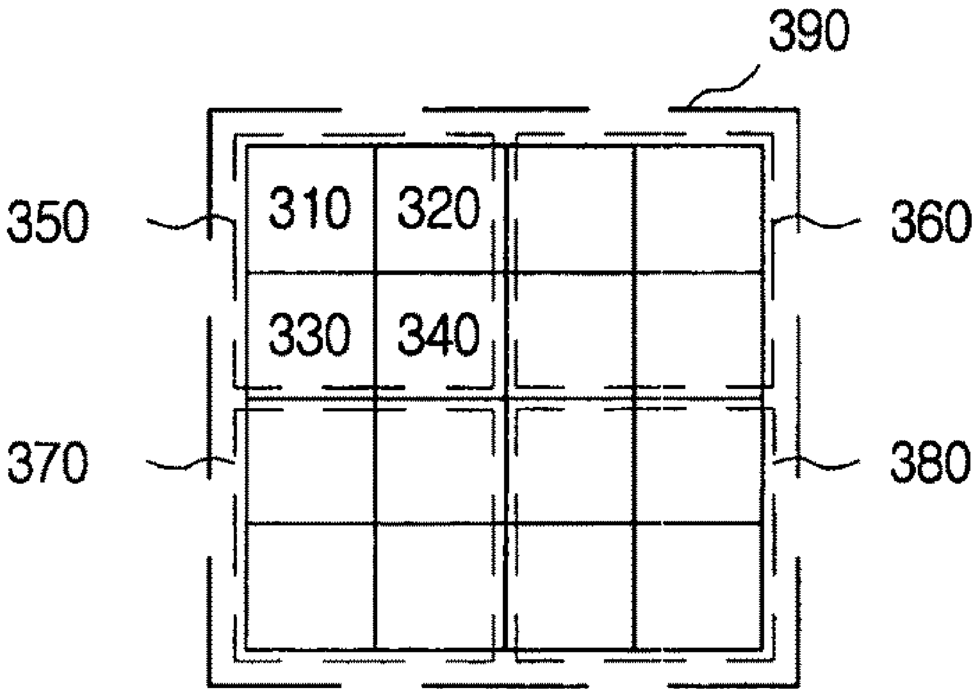
FIG. 3 shows a block per unit for describing how a variable block is formed in accordance with an embodiment of the present invention.
Figure 4:
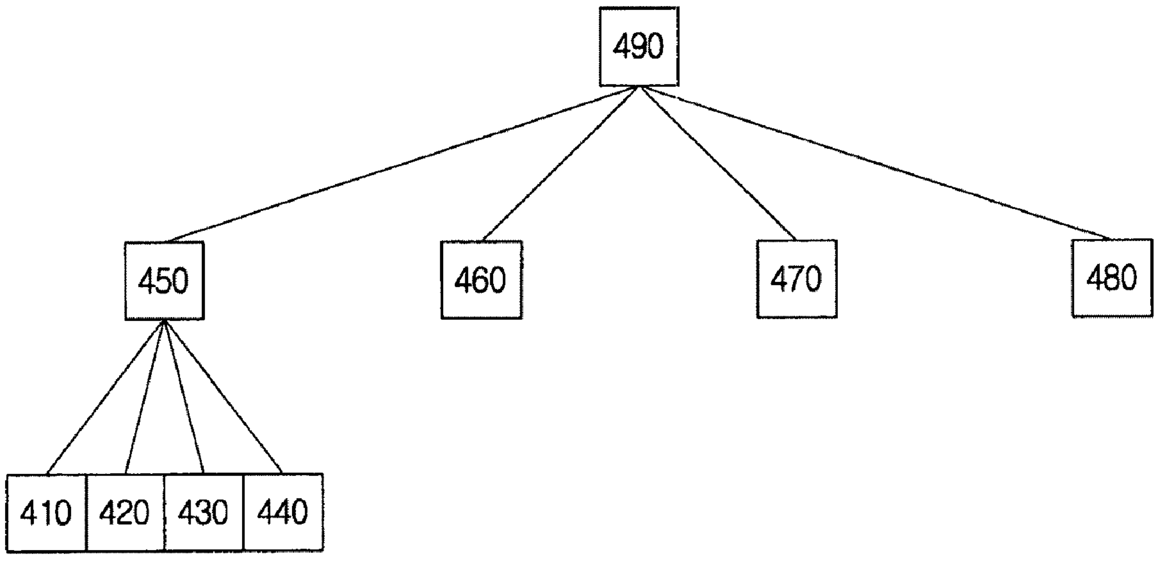
FIG. 4 shows a quadtree generated when an input video of FIG. 3 is encoded in accordance with an embodiment of the present invention.

Hitherto, the method of encoding vide data using a bit precision in accordance with an embodiment of the present invention has been briefly described. The foregoing steps step represented by 230 through 250 will be described in more detail with reference to FIG. 3 and FIG. 4. FIG. 3 and FIG. 4 will be described based on the assumption that video data (i.e. video data) has a size of 8×8.

FIG. 3 shows a block per unit for describing how a variable block is formed in accordance with an embodiment of the present invention, and FIG. 4 shows a quadtree generated when an input video of FIG. 3 is encoded in accordance with an embodiment of the present invention.

Referring to FIG. 3, the smallest block (e.g. 310) of the blocks of FIG. 3 has a size of $2^1 \times 2^1$. The variable block forming unit 140 divides a video into the blocks of the size of $2^1 \times 2^1$ and generates variable block forming information indicating the configuration of each divided block. Here, the variable block forming information can be represented by using a quadtree. In this description, it is assumed that the variable block forming information is represented by using the quadtree. However, it shall be obvious that the variable block forming information can be represented in other forms.

An initial quadtree also becomes a complete quadtree having 21 nods. The encoding unit 130 performs the decoding in units of each block unit and temporally stores compression capacity per each block.

Then, the variable block forming unit 140 divides the video into the blocks (e.g. 350) of a size of $2^2 \times 2^2$, and the encoding unit 130 performs the encoding per each block. The variable block forming unit 140 compares the compression capacity of an encoded block 350 of the size of $2^2 \times 2^2$ with the summation of the compression capacity of blocks (i.e. blocks 310, 320, 330 and 340) compressed and stored in units of blocks of the size of $2^1 \times 2^1$.

For easy overall understanding of the present invention, it is assumed that the summation of the compression capacity of the blocks 310, 320, 330 and 340 is smaller than the compression capacity of the block 350 of the size of $2^2 \times 2^2$. The variable block forming unit 140 temporally stores the compression capacity of the blocks 310, 320, 330 and 340 and amends the quadtree to indicate the configuration of this block. For example, the variable block forming unit 140 represents using the blocks 310 through 340 instead of the block 350 in the current step by maintaining nods 410 through 440 in FIG. 4 corresponding to the blocks 310 through 340 in FIG. 3.

Then, the variable block forming unit 140 repeatedly applies the processing operation of the block 350 to the blocks 360, 370 and 380, respectively.

Here, it is assumed that the compression capacity of the $2^2 \times 2^2$ blocks 360, 370 and 380 are smaller than the summation of the compression capacity of the $2^1 \times 2^1$ blocks of the blocks 360, 370 and 380, respectively. In this case, the variable block forming unit 140 temporally stores the compression capacity of the blocks 360, 370 and 380, respectively. The variable block forming unit 140 shows that the blocks 360 through 380 are used by removing lower nods of nods 460 through nods 480 of FIG. 4 such that the configuration of this block is indicated.

The variable block forming unit 140 performs the encoding in units of $2^3 \times 2^3$ blocks having the same size as a video and compares the summation of the compression capacity of temporally stored blocks 310, 320, 330, 340, 360, 370 and 380 with the compression capacity of an encoded block 390. If it is assumed that the compression capacity of an encoded block 390 is larger than the summation of the compression capacity of temporally stored blocks 310, 320, 330, 340, 360, 370 and 380, the variable block forming unit selects the blocks 310, 320, 330, 340, 360, 370 and 380 as the blocks for being encoded. Then, the decoding unit 130 performs the final encoding of the blocks 310, 320, 330, 340, 360, 370 and 380. At this time, since the compression capacity of an encoded block 390 is larger, as shown in FIG. 4, the variable block forming unit 140 adds a final quadtree formed without the removal of lower nods of the nod 490 to a bitstream in a predetermined type of bits.

The nods 410 through 480 shown in FIG. 4 correspond to the blocks 310 through 390 shown in FIG. 3. In other words, in an example shown in FIG. 4, the variable block forming unit 140 successively increases the size of blocks and encodes the blocks and determines the size unit for blocks of small compression capacity, and a quadtree is amended accordingly.

Here, it is evident to any person of ordinary skill in the art that when video data is not an exact multiple of $2^n \times 2^n$, it is possible to use an additional method to designate a block having a size that is different from the size of $2^n \times 2^n$.

It has been described above that the quadtree (refer to FIG. 4) is amended according to the operation which the variable block forming unit 140 determines the size unit for blocks of small compression capacity in the input video. Alternatively, in accordance with another embodiment of the present invention, the quadtree is finally amended after the variable block forming unit 140 determines the size unit for blocks of small compression capacity in the input video.

Hereinafter, a method which the predicting unit 120 predicts a pixel value of video data to compute a prediction value will be described in detail with reference to FIG. 5 through FIG. 7.

Figure 5:
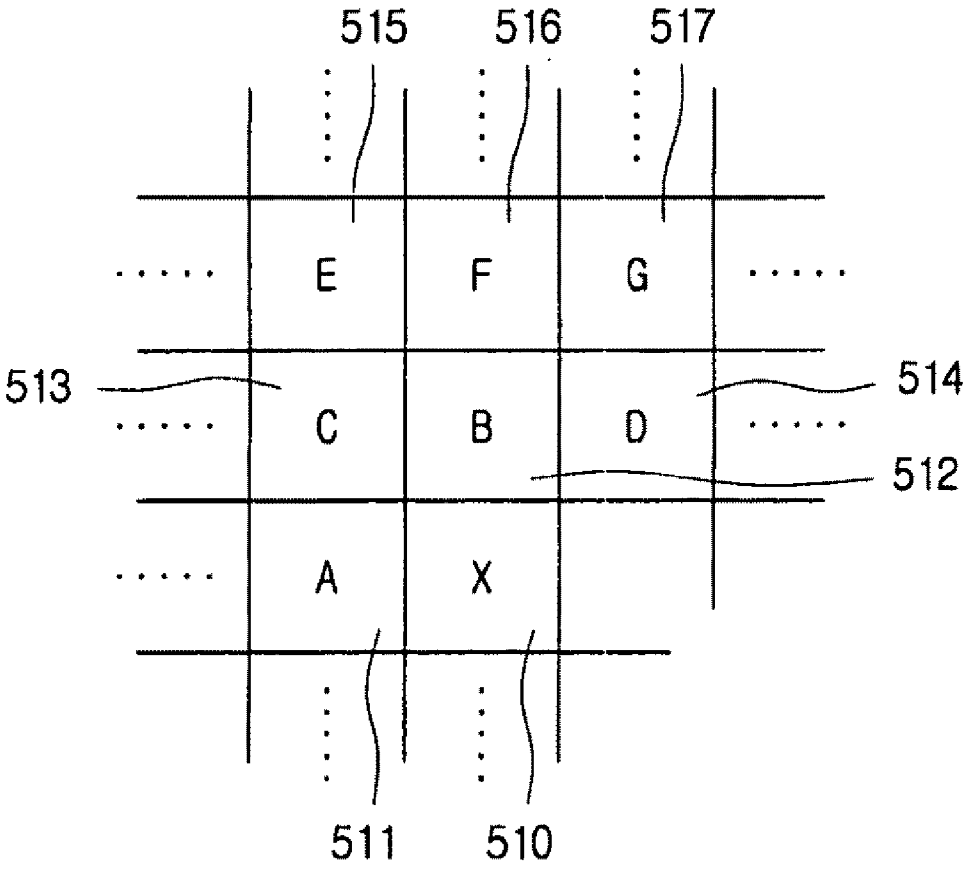
FIG. 5 and FIG. 6 show how each pixel value of video data is predicted in accordance with an embodiment of the present invention.
Figure 6:
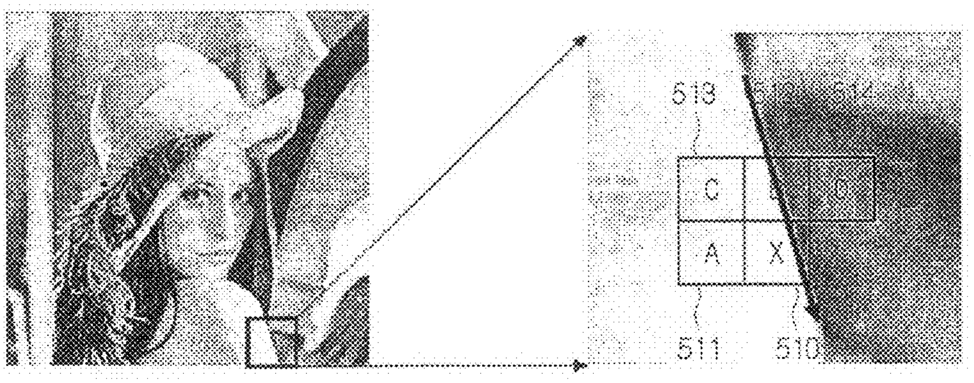

FIG. 5 and FIG. 6 show how each pixel value of video data is predicted in accordance with an embodiment of the present invention, and FIG. 7 shows a prediction algorithm considering a boundary of video data in accordance with an embodiment of the present invention.

Referring to FIG. 5, an target pixel X 710 to be predicted can be represented as X(i, j). Here, i refers to a row position of a pixel, and j refers to a column position of a pixel.

At this time, X(i, j−1), which is a next pixel to the left of the target pixel X(i, j) to be predicted, can be represented as A 511 of FIG. 5. Similarly, X(i−1, j−1), X(i−1, j) and X(i−1, j+1), which are next pixels to the upper left, upper and upper right, respectively, of the target pixel X(i, j) to be predicted, can be represented as C 513, B 512 and D 514 of FIG. 5. Hereinafter, the structure of a pixel of FIG. 5 will be described as an example for the convenience of understanding and description.

Typically, each pixel located at a boundary of video data has the same prediction direction as that of a next pixel located on the upper side. For this reason, the pixel value of the target pixel is predicted by using the prediction direction of the pixel placed in upper side.

If the target pixel X 510 has no boundary, the prediction method in accordance with an embodiment of the present invention uses the following formula 1 to perform the prediction, in which no additional bits are used and the prediction operation is simple, thereby resulting in little complexity.

$$P(X)=(A+B)/2 \quad \text{[Formula 1]}$$

At this time, the method of recognizing whether the upper pixel B 512 has a boundary is used in order to recognize whether the target pixel X 510 has the boundary. In particular, it is possible to recognize whether the upper pixel B 512 has a boundary by recognizing whether the difference between the values of the upper left pixel C 513 and the upper right pixel D 514 of the target pixel X 510 is equal to or larger than a threshold value. For example, referring to an exploded view showing a part of a Lena image, there is a boundary of the image. It is recognized that the difference value between the pixel C 512 and the pixel 514 of this boundary is larger than a difference value between the pixels having no boundary. For this reason, the predicting unit 120 uses the values of the left pixel C 513 and the right pixel D 514 of the upper side pixel B 512 in order to predict a pixel value of the target pixel X 510. In other words, the predicting unit 120 recognizes whether the difference value between the values of the left pixel C 513 and the right pixel D 514 of the upper side pixel B 512 is equal to or larger than a predetermined threshold value. As the result of recognizing it, if the difference value is equal to or larger than the threshold value, the predicting unit 120 can determine that there is a boundary in the target pixel X 510.

If the difference value between the upper left pixel C 513 and the upper right pixel D 514 of the target pixel 510 is smaller than the threshold value, the predicting unit 120 can determine the upper pixel B 512 has no boundary. In this case, it is possible to predict the pixel value of the target pixel X 510 by using the formula 1 as described above.

However, if the difference value between the left pixel C 513 and the right pixel D 514 of the upper pixel B 512 is equal to or larger than a predetermined threshold value. it can be determined that there is a boundary in the upper pixel 512. In this case, there is a strong probability that the pixel X 510 has a boundary. In this case, the embodiment of the present invention recognizes a boundary of video data and determines a predicting method.

Referring to the exploded view of FIG. 6, it can be recognized that the boundary of the target pixel X 510 has the direction that is similar to the pixel B 512. For this reason, it is possible to recognize whether the upper pixel B 512 has a boundary to determine a prediction direction and apply the determined prediction direction to the target pixel X 510. In particular, it is possible to determine an optimized prediction direction of the upper pixel B 512 by using adjacent pixels (e.g. the pixels C 613, B 515, F 516 and G517) of the upper pixel B 512 and use the determined prediction direction as a prediction direction of the target pixel X 510 to be predicted. As such, even through if the prediction direction of the upper pixel B 512 is used as it is, a little complexity may be caused, the compression efficiency is improved because it is not necessary that an additional bit indicating the prediction direction is added into a bitstream.

FIG. 7 shows an algorithm for the method of determining the prediction direction of the target pixel X 510 by using the prediction direction of the upper side B 512 of the target pixel 510. FIG. 7 shows an example for describing the prediction method. It shall be obvious that other algorithms can be used. In this description, the method of a prediction direction of an target pixel by using a prediction direction of an upper pixel of the target pixel to be predicted has been. However, this is an embodiment of the present invention. it shall be evident to any person of ordinary skill in the art that it is possible use prediction directions of various pixels that are adjacent to the target pixel.

Hitherto, the prediction method has been described in accordance with an embodiment of the present invention. Hereinafter, a method of re-determining the prediction value computed through the aforementioned prediction method by the predicting unit 120 will be described with reference to FIG. 8 in accordance with an embodiment of invention.

Figure 8:
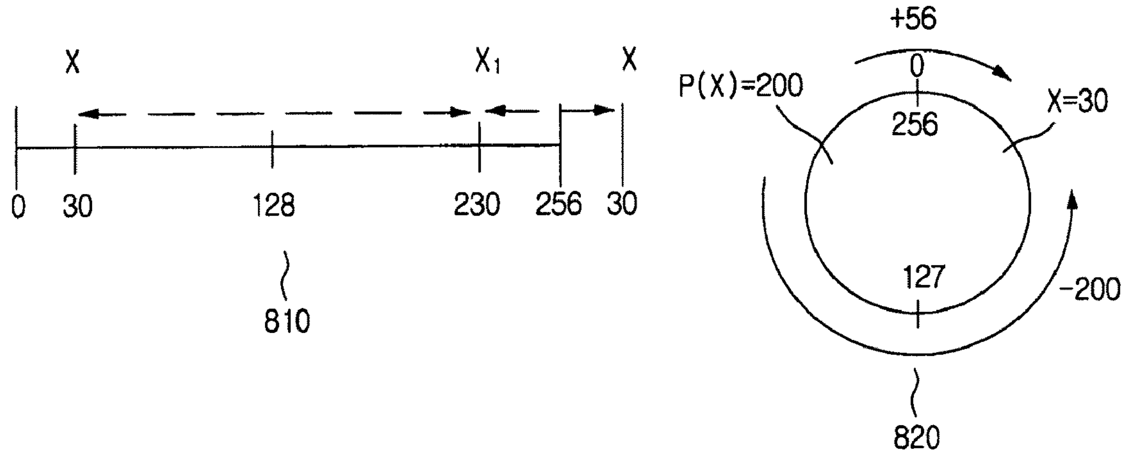
FIG. 8 shows how a prediction value is re-determined in accordance with an embodiment of the present invention.
Figure 9:
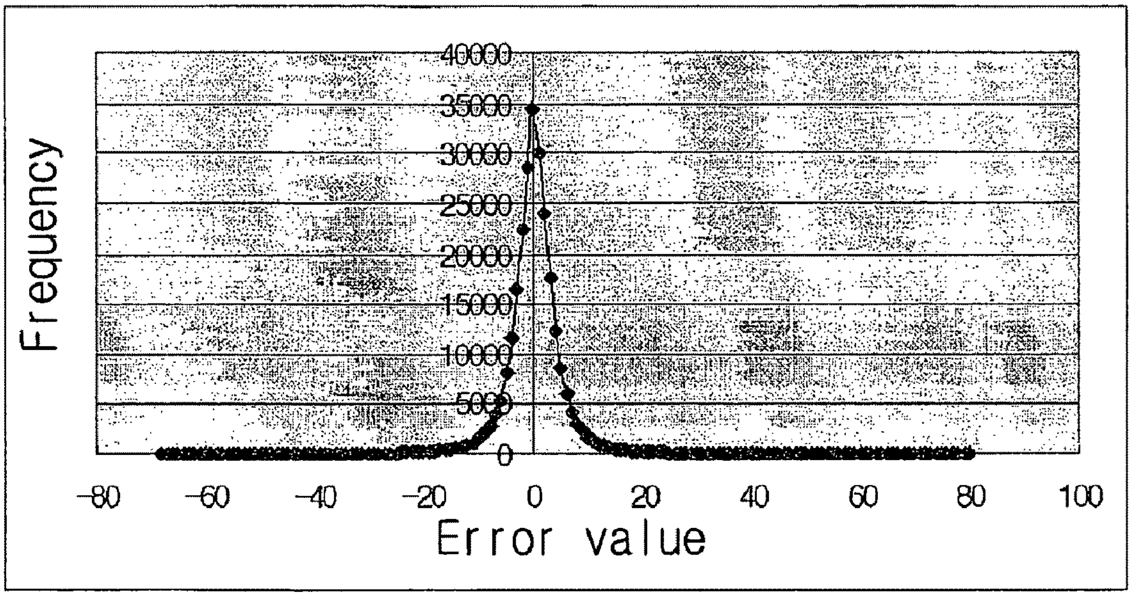
FIG. 9 is a graph showing the distribution of a difference value between an target pixel value and a prediction value of video data in accordance with an embodiment of the present invention.

FIG. 8 shows how a prediction value is re-determined in accordance with an embodiment of the present invention, and FIG. 9 is a graph showing the distribution of a difference value between an target pixel value and a prediction value of video data in accordance with an embodiment of the present invention.

An error value E can be computed by the following formula 2 using the prediction value computed by the predicting unit 120 in accordance with an embodiment of the present invention.

$$E=|X-P(X)| \quad \text{[Formula 2]}$$

Here, E refers to an error value, and X refers to a pixel value of a target pixel (i.e. the pixel value of the pixel X 510 in FIG. 5). P(X) refers to the predicted pixel value (i.e. prediction value) of the target pixel.

At this time, the sign of (X−P(X)) can be additionally processed as a sign bit. For example, if the sign is positive, the sign bit is stored as 1, and if the sign is negative, the sign bit is stored as 0, and vice versa. Hereinafter, it is assumed that if the sign is positive, the sign bit is stored as 1, and if the sign is negative, the sign bit is stored as 0.

If video data is a Gray scale image, a luminance value is typically represented by using 8 bits (i.e. 28). In the case of a high quality video, the luminance value is represented by using 10 bits (i.e. 210). In this description, it is assumed that the luminance value is represented by using 8 bits for the convenience of understanding and description. However, it shall be evident to any person of ordinary skill in the art that the present invention is not limited to the assumption.

If the luminance value is represented by using 8 bits, (X−P(X)) has a value that ranges between −255 and 255. Accordingly, the prediction value computed by the predicting unit 120 by using the formula 2 has a value that ranges between 0 and 255. In other words, the maximum of the error value is 255.

At this time, as shown in FIG. 8, the maximum of the error value can be re-determined by using 7 bits (i.e. 27, which 127 representations are possible) in this description.

Hereinafter, the embodiment of the present invention will be described with reference to FIG. 8. The computation of a straight line 810 is performed on a circle 820. In other words, it is assumed that “256” is followed by “1.”

For example, if it is assumed that the target pixel value X has 30, and the prediction value P(X) computed by the predicting unit 120 is 200. In this case, the error value E is obtained as 170, and the sign of (X−P(X)) is negative.

However, if the computation is performed on the circle 820 in accordance with an embodiment of the present invention, the error value E can be obtained as 86, and the sign of (X−P(X)) can be positive. In this case, even though the pixel value X is 286 in the decoding operation to be performed, since the pixel value X, 286, is larger than 256, the decoding is performed by using 30 obtained by subtracting 256 from 286. if the error value is presented in aforementioned method, the error value can be represented by using a value within 7 bits (i.e. 127).

The reason of reducing the error value to 127 or less is that since the error value itself is encoded in the foresaid encoding operation using a bit precision value, this is to improve the compression efficiency by reducing the number of bits being encoded.

FIG. 9 shows that most difference values between the target pixel value and the prediction value ranges between −20 and +20. The more frequent the smaller error values are, the greater the compression efficiency becomes at the time of encoding. Accordingly, it shall be evident to any person of ordinary skill in the art that if the error value is re-determined by reducing the maximum value in accordance with an embodiment of the present invention, the compression efficiency will be improved.

Hitherto, the method of computing the error value form the Gray scale image by using the luminance value in accordance with an embodiment of the present invention has been described with reference to FIG. 8. However, it shall be evident to any person of ordinary skill in the art that it is possible to apply the present invention together with a prediction technology using the relation between colors in a yuv or RGB representing type of a color video.

Hereinafter, a method of encoding an error value computed by the aforementioned method and a sign bit will be described.

이하에서는 영상 데이터가 512×512인 것을 가정하여 이를 중점으로 설명하기로 한다.

Figure 10:
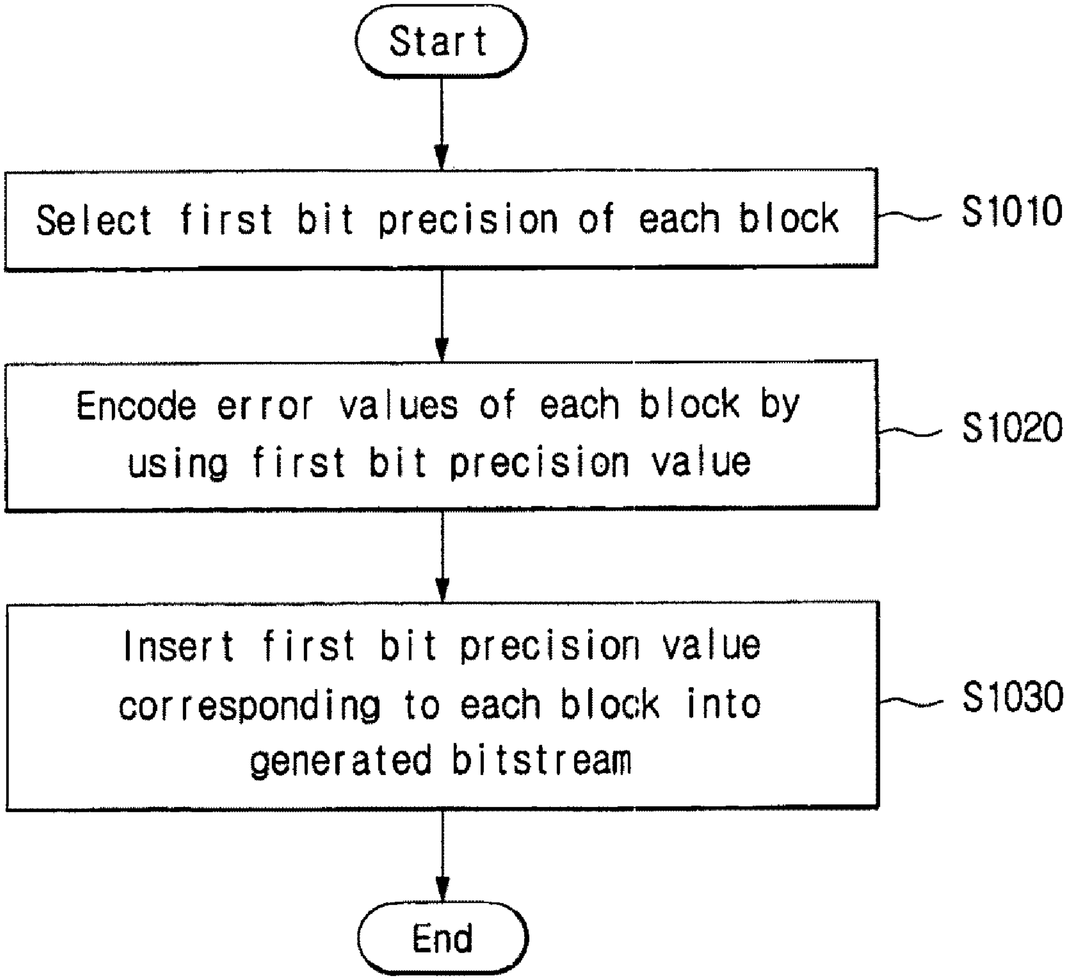
FIG. 10 is a flow chart showing how an encoding unit performs an encoding by using a bit precision value in accordance with an embodiment of the present invention.

FIG. 10 is a flow chart showing how an encoding unit performs an encoding by using a bit precision value in accordance with an embodiment of the present invention. Hereinafter, it is assumed that video data has the size of 512×512.

Referring to FIG. 10, the encoding unit 130 selects a first bit precision value of each block in a step represented by 1010.

In this description, it is assumed that each block has the size of 64×64 for the convenience of understanding and description. It has been described with reference to FIG. 2 through FIG. 4 that the variable block forming unit 140 can form each block in various sizes.

The bit precision value can be allotted to 3 bits (i.e. 23) in accordance with an embodiment of the present invention. In other words, the bit precision value can have a value between 0 and 7.

Here, if size information of all designated blocks has the size of 64×64, one block has a total of 4096 pixels. The predicting unit 120 also computes 4096 error values in one block. Accordingly, in accordance with an embodiment of the present invention, the encoding unit 130 performs the bit precision encoding of the 4096 prediction values by using 0 through 7 in order to select a bit precision value corresponding to a predetermined block and then determine the bit precision value corresponding to the predetermined block as the number having a best compression efficiency.

For example, the error values predicted for the pixels included in the predetermined block can have {5, 3, 8, 2, . . . }. Hereinafter, the method of selecting a bit precision value by using 4 error values as an example will be described for the convenience of understanding and description. The encoding unit 130 can perform the bit precision encoding of the error values {5, 3, 8, 2, . . . } by using 0 through 7 of the following table 3.

TABLE 3

| Error value | 5 | 3 | 8 | 2 | Total bits |
|---|---|---|---|---|---|
| 1 | 000001 | 0001 | 000000001 | 001 | 22 |
| 2 | 1110 | 1100 | 111110 | 10 | 18 |
| 3 | 101 | 011 | 111001 | 010 | 15 |
| 4 | 0101 | 0011 | 1000 | 0010 | 16 |
| 5 | 00101 | 00011 | 01000 | 00010 | 20 |
| 6 | 000101 | 000011 | 001000 | 000010 | 24 |
| 7 | 0000101 | 0000011 | 0001000 | 0000010 | 28 |

Referring to the table 3, it can be recognized that if the bit precision value, 3, is used, the best compression efficiency is obtained. In this case, the encoding unit 130 can determine the bit precision value as "3" for the predetermined block.

The encoding unit 130 selects a first bit precision value corresponding to a predetermined block by using an aforementioned method in a step represented by 1010.

Here, it shall be evident to any person of ordinary skill in the art that it is possible to encode predetermined pixels located at certain positions among the pixels included in the predetermined block before reviewing the compression efficiency to select the first bit precision value corresponding to the predetermined block.

Then, the encoding unit 130 uses the selected first bit precision value in order to encode error values of each block in a step represented by 1020.

In a step represented by 130, the encoding unit 130 can insert the first bit precision value corresponding to each block into a generated bitstream.

At this time, it shall be evident to any person of ordinary skill in the art that size information and the first bit precision value can be inserted into hierarchic structure of a bitstream in various ways in accordance with various embodiments of the present invention.

Hitherto, it has been described that the encoding unit 130 selects the bit precision value corresponding to the designated block in the video data and encodes the selected bit precision value.

In accordance with another embodiment of the present invention, the compression efficiency can be improved by additionally performing the bit-precision-encoding of a bit precision value corresponding to a block. This will be described below with reference to FIG. 11.

Figure 11:
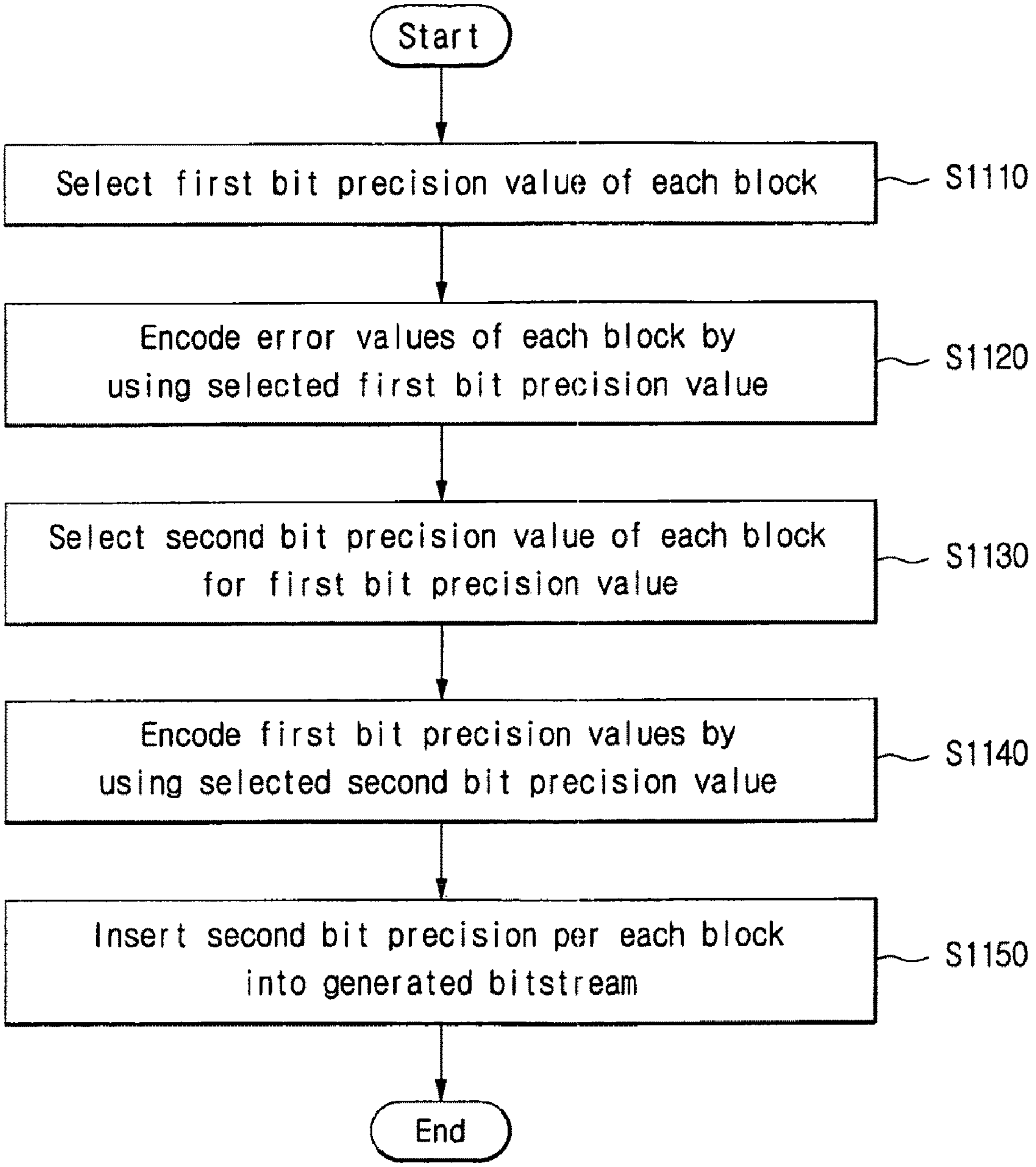
FIG. 11 is a flow chart showing how an encoding unit performs an encoding by using a bit precision value in accordance with another embodiment of the present invention.

FIG. 11 is a flow chart showing how an encoding unit performs an encoding by using a bit precision value in accordance with another embodiment of the present invention. Hereinafter, any matter already described with reference to FIG. 10 will not be redundantly described in order to make clear the gist of another embodiment of the present invention.

The encoding unit 130 selects a second bit precision value for the first bit precision value corresponding to each block of video data in a step represented by 1110.

For example, if the video data of 512×512 is divided into blocks of 64×64, a total of 64 blocks of 64×64 are divided. Accordingly, the encoding unit 130 selects a total of 64 first bit precision values. Here, the encoding unit 130 selects the second bit precision values for the 64 first bit precision values. Since the operation of selecting the second bit precision values is the same as the step represented by 1010 of FIG. 10, the overlapped description will be omitted.

At this time, it shall be evident to any person of ordinary skill in the art that the encoding unit 130 can select the second bit precision values in units of predetermined groups of the first bit precision values.

Then, the encoding unit 130 encodes the first bit precision values by using the selected second bit precision values in a step represented by 1140.

At this time, it shall be evident to any person of ordinary skill in the art that if the second bit precision values are selected in units of predetermined groups of the first bit precision values, the encoding unit 130 can perform the bit-precision-encoding of each of the first bit precision values in units of predetermined groups by using the second bit precision values corresponding to the first bit: precision values in units of predetermined groups.

In a step represented by 1150, the encoding unit 130 can insert the second bit precision values into the generated bitstream.

Hitherto, the method that the encoding unit 130 encodes the error value computed by the predicting unit 120 has been described with reference to FIG. 10 through FIG. 11. Below described is how the encoding unit 130 encodes the sign bit computed by the predicting unit 120.

As described above, the sign bit refers to the sign of (X−P(X)) in the formula 2. The sign bit has 1 bit as one of good examples in accordance with an embodiment of the present invention. Accordingly, although the sign bit, which is 1 bit per pixel, undergoes the bit-precision-encoding, the compression efficiency will not be improved. In accordance with an embodiment of the present invention, the sign bit can be analyzed as a sign symbol in units of predetermined groups and inserted into the generated bitstream.

For example, it is assumed that there are 8 predetermined group units of the sign bit, the video data is the video of 512×512 of FIG. 5 and the size of all blocks is 64×64.

If 8 first pixels of a predetermined block has sign bits of {0, 0, 0, 0, 1, 1, 1, 1}, the sign symbol is analyzed as 7. Since the size of the block is 64×64, there can be 512 sign symbols. At this time, the predicting unit 130 can insert the 512 symbols into the generated bitstream.

Hitherto, the method that the predicting unit 130 encodes the sign bit computed by the predicting unit 120 has been described in accordance with an embodiment of the present invention.

Hereinafter, the method that the encoding unit 130 performs the additional encoding processing will be described with reference to FIG. 12 through FIG. 14 in accordance with an embodiment of the present invention.

Figure 12:
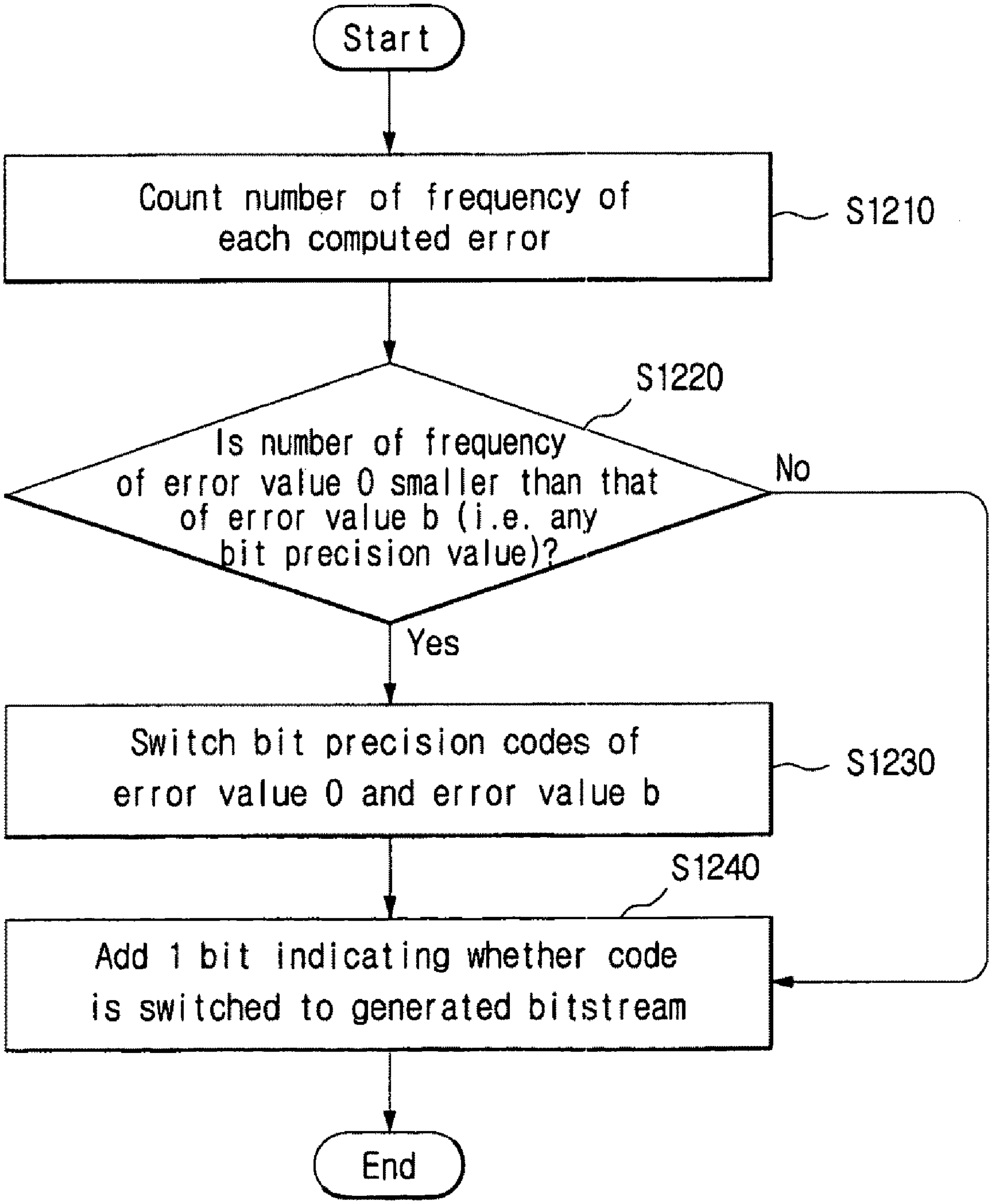
FIG. 12 is a flow chart showing how compression efficiency is improved by processing a sign in addition to a bit precision encoding method in accordance with an embodiment of the present invention.
Figure 13:
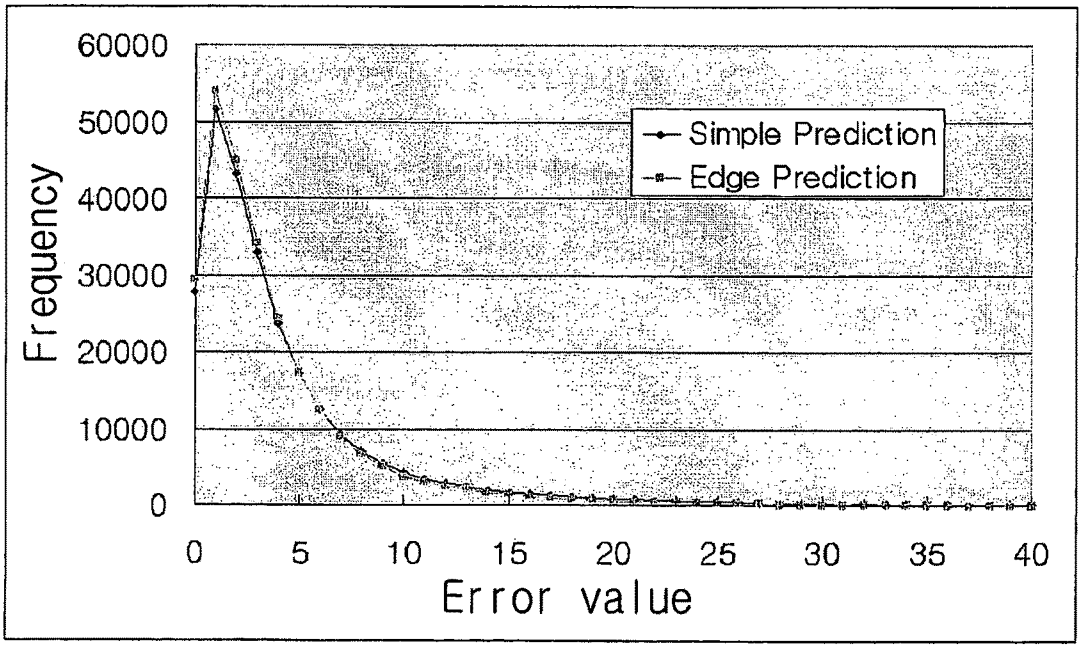
FIG. 13 is a graph showing the distribution of an error value of a Lena image in accordance with an embodiment of the present invention.

FIG. 12 is a flow chart showing how compression efficiency is improved by processing a sign in addition to a bit precision encoding method in accordance with an embodiment of the present invention, and FIG. 13 is a graph showing the distribution of an error value of a Lena image in accordance with an embodiment of the present invention. The following table 4 compares the code of the error value before being switched with the code of the error value after being switched in a Lena image in accordance with an embodiment of the present invention.

Referring to FIG. 13, the error value of 0 is less frequent than the error values 1, 2 and 3 in the Lena image in accordance with an embodiment of the present invention.

Referring to FIG. 12, the encoding unit 130 counts the number of frequency of the error value computed by the predicting unit in a step represented by 1210. In a step represented by 1220, the encoding unit 130 goes to a step represented by 1230 if the number of frequency of the error value of 0 is smaller than that of an error value b (i.e. any bit precision value). Otherwise, the encoding unit 130 goes to a step represented by 1240.

In the step represented by 1230, the encoding unit 130 switches codes of the error value of 0 and the error value b. In the step represented by 1240, 1 bit can be added to the generated bitstream in order to check whether the code is switched. It shall be evident to any person of ordinary skill in the art that the operation of adding a bit according to whether the code is switched is differently performed.

In particular, if it is assumed that the bit precision value for encoding an error value through the prediction value is 2, 2 bits must be used for the error values 0, 1, and 2, and 4 bits must be used for the error values 3, 4 and 5. For example, referring to FIG. 13, the error value has the higher number of frequency in the order of {1, 2, 3, 0, 4, 5}. Here, since the frequency of 0 is smaller than that of 3, a code "00" to be used when 0 is encoded is switched to a code "1100" for representing 3. This can reduce the compression capacity by as much as twice the difference in the frequency of 0 and 3. Accordingly, as shown in the table 4, the codes of 0 and 3 is switched to each other.

TABLE 4

| Error value | Code of error value before switched | Code of error value after switched |
|---|---|---|
| 0 | 00 | 1100 |
| 1 | 01 | 01 |
| 2 | 10 | 10 |
| 3 | 1100 | 00 |
| 4 | 1101 | 1101 |
| 5 | 1110 | 1110 |
| ... | ... | ... |

In a more general term, if the frequency of an error value 0 is smaller than an error value $2^k-1$ (k is the first bit precision value: e.g. 3), the encoding unit switches codes of the error values 0 and $2^k-1$. Hitherto, the operation of switching the bit precision values according to the number of frequency of the error values has been described with reference to FIG. 12 through FIG. 13.

Hereinafter, the switching of a second bit precision value according to the distribution of a first bit precision value will be described with reference to FIG. 14.

Figure 14:
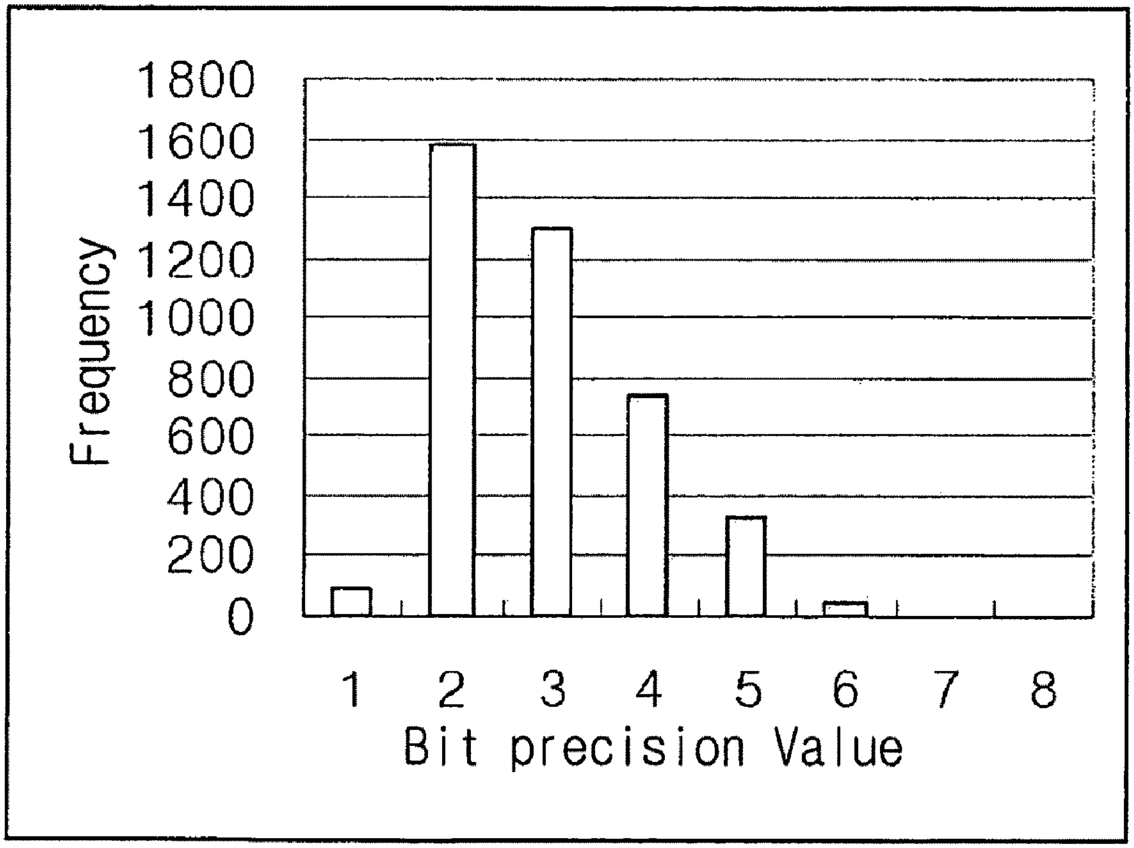
FIG. 14 is a graph showing the distribution of a bit precision value selected per block in a Lena image in accordance with an embodiment of the present invention.

FIG. 14 is a graph showing the distribution of a bit precision value selected per block in a Lena image in accordance with an embodiment of the present invention, and the following table 5 compares a code of the first bit precision value before being switched with a code of the first bit precision value after being switched in a Lena image in accordance with an embodiment of the present invention.

Referring to FIG. 14, the bit precision values of the Lena image in accordance with an embodiment of the present invention are mostly 2 and 3. Similar to the switching of the bit precision value selected for the error value, if the second bit precision value selected for the first bit precision value is switched, the compression efficiency can be more increasingly improved.

The first bit precision value in FIG. 14 becomes gradually less frequent from 2 to 8. The frequency of the first bit precision value of 1 is also smaller than that of the first bit precision value of 2. The distribution of the first bit precision value shows the similar pattern to that shown in FIG. 14, in spite of a few differences per every image.

The encoding unit 130 successively compares the number of frequency of the first bit precision value of 1 with those of the other first bit precision values 2 through 8. For example, if the encoding unit compares the number of frequency of the first bit precision value of 1 with that of the first bit precision value of 2 and recognizes that the number of frequency of the first bit precision value of 1 is smaller than that of the first bit precision value of 2, the encoding unit 130 compares the number of frequency of the first bit precision value of 1 with that of the first bit precision value of 3. In the case of the Lena image, when the number of frequency of the first bit precision value of 1 is compared with that of the first bit precision value of 6, the first bit precision value is larger than the first bit precision value of 6. Accordingly, the code of the first bit precision value of 1 is changed to the code of the first bit precision value of 6. As shown in the table 5, the codes of the first bit precision values 2 through 5 are changed to the codes of the corresponding first bit precision values 1 through 4.

TABLE 5

| First bit precision value | Code of bit precision value before switched | Code of bit precision value after switched |
|---|---|---|
| 1 | 00 | 1101 |
| 2 | 01 | 00 |
| 3 | 10 | 01 |
| 4 | 1100 | 10 |
| 5 | 1101 | 1100 |
| 6 | 1110 | 1110 |
| 7 | 111100 | 111100 |
| 8 | 111101 | 111101 |

More generally, among the first bit precision values 1 through 8, the encoding unit 130 compares the number of frequency of the first bit precision value 1 with those of the remainders 2 through 8 until the first bit precision value t (e.g. 6) having the number of frequency that is smaller than that of the first bit precision value of 1 is founded. The code of the first bit precision value 1 is changed to the code of the first bit precision value t−1, and the codes of the first bit precision values 2 through t−1 are changed to the codes of the corresponding first bit precision values 1 through t−2.

Hereinafter, a bit precision decoding apparatus and a method thereof will be described in accordance with an embodiment of the present invention.

Figure 15:
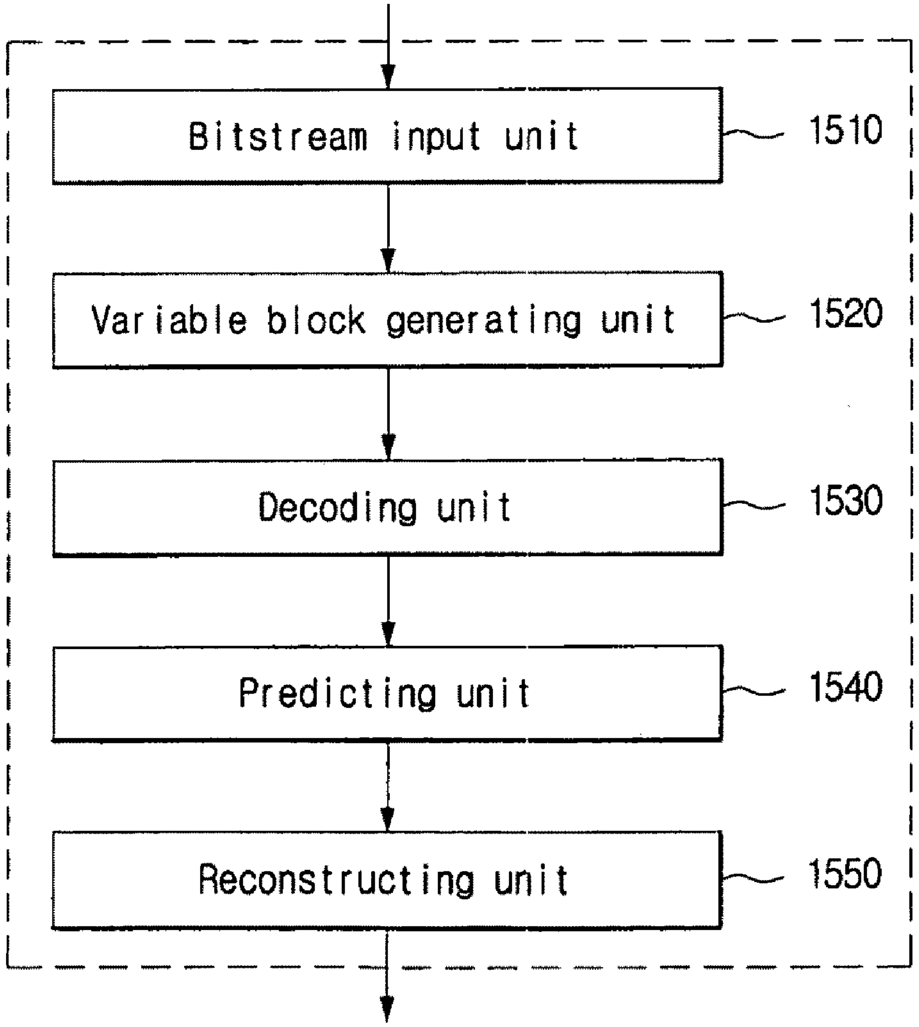
FIG. 15 is a block diagram showing a bit precision decoding apparatus in accordance with an embodiment of the present invention.
Figure 16:
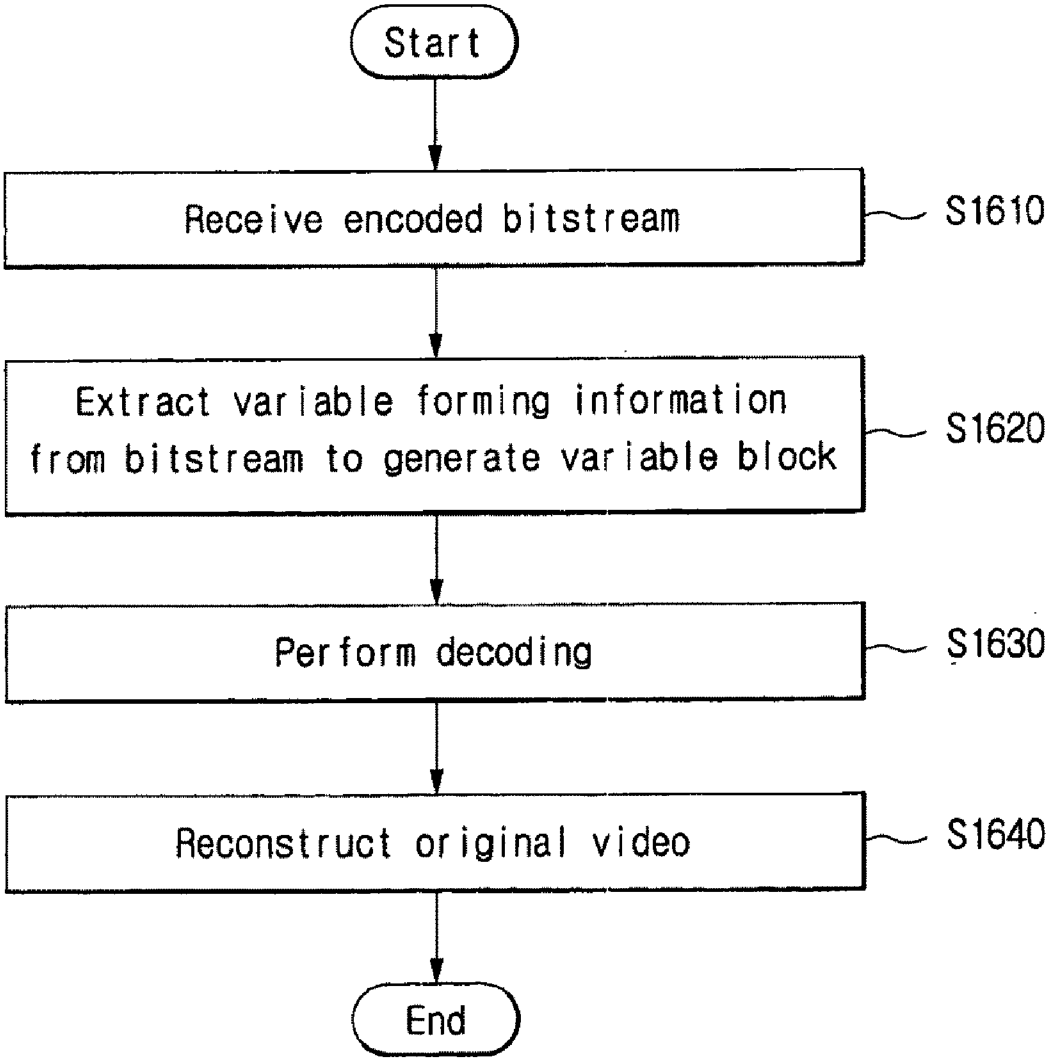
FIG. 16 is a flow chart showing a bit precision decoding method in accordance with an embodiment of the present invention.

FIG. 15 is a block diagram showing a bit precision decoding apparatus in accordance with an embodiment of the present invention, and FIG. 16 is a flow chart showing a bit precision decoding method in accordance with an embodiment of the present invention Referring to FIG. 15, the bit precision decoding apparatus in accordance with an embodiment of the present invention can include a bitstream input unit 1510, a variable block forming unit 1520, a decoding unit 1530, a predicting unit 1540 and a reconstructing unit 1550.

Hereinafter, the functions and operations of each element in FIG. 15 will be described with the flow chart in accordance with an embodiment of the present invention as shown in FIG. 16.

Referring to FIG. 16, the bitstream input unit 1510 receives an encoded bitstream from an outside in a step represented by 1610.

Then, the variable block forming unit 1520 extracts quadtree information from the received bitstream and generates a variable block to be used when encoding is performed.

In a step represented by 1630, the decoding unit 1530 decodes an error value by using a bit precision value extracted from the bitstream.

In a step represented by 1640, the predicting unit 1540 computes an prediction value by using the pixels that are adjacent to a target pixel. The reconstructing unit 1550 computes the target pixel value by using the prediction value, a decoded sign bit and the error value in order to reconstruct an original video.

Hereinafter, steps represented by 1630 and 1640 will be described in detail with reference to FIG. 17.

Figure 17:
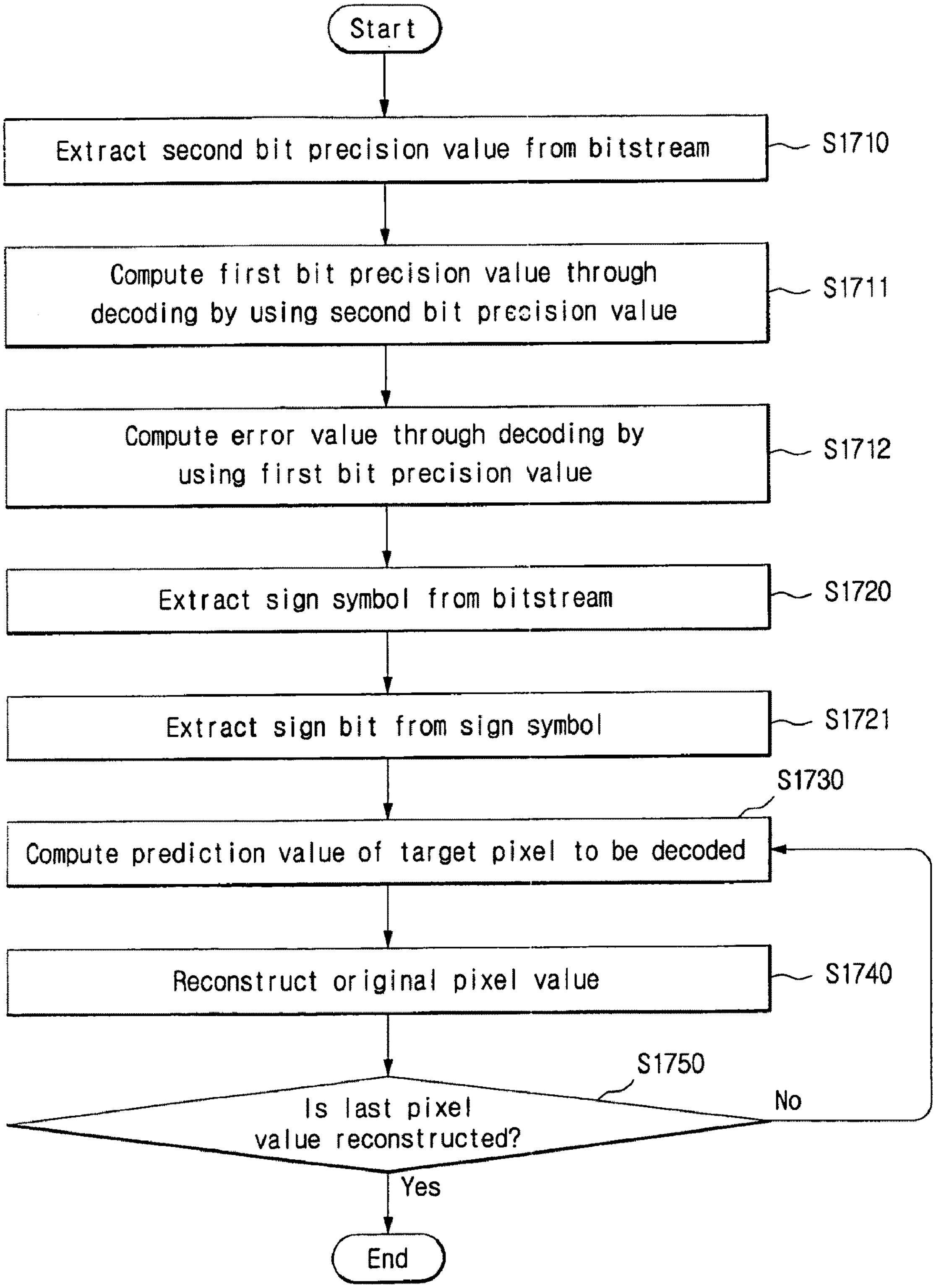
FIG. 17 is a flow chart showing how a decoding unit, a prediction unit and a reconstruction unit decode a bitstream in accordance with an embodiment of the present invention.

FIG. 17 is a flow chart showing how a decoding unit, a prediction unit and a reconstruction unit decode a bitstream in accordance with an embodiment of the present invention. Hereinafter, any description that is redundant in the reverse order of the bit precision encoding method, which was described with reference to FIG. 10 through FIG. 14, will be omitted in order to make clear the gist of the present invention. Moreover, since the method of the decoding using the bit precision value is performed in the reverse order of the aforementioned bit precision encoding method, the detailed pertinent description will be omitted.

Firstly, the method that the decoding unit 1530 computes error values from a bitstream will be described in accordance with an embodiment of the present invention.

In a step represented by 1710, the decoding unit 1530 extracts a second bit precision value from a bitstream to be decoded. In a step represented by 1711, the decoding unit 1530 decodes a first bit precision value by using the second bit precision value.

At this time, the steps represented by 1710 and 1711 have been described based on the assumption that the bitstream was generated by using the encoding method described with reference to FIG. 11.

In a step represented by 1720, the decoding unit 1530 extracts a sign symbol from a bitstream to be decoded. In a step represented by 1721, the decoding unit 1530 extracts a sign bit constituting the sign symbol, which is a group unit of the predetermined sign bit.

Although it has been described in the step represented by 1721 that the decoding unit 1530 analyzes the sign symbols in units of group of sign bits, it shall be evident to any person of ordinary skill in the art that this can be performed by another element.

In a step represented by 1730, the predicting unit 1540 computes an prediction value for a target pixel to be decoded. This prediction operation is the same as the prediction operation at the time of encoding described with reference to FIG. 5 through FIG. 7. However, since the prediction operation at the time of encoding must reconstruct each pixel value and perform the prediction by using the reconstructed pixel value, the reconstruction of pixel values and the prediction operation must be repeatedly performed pixel by pixel.

In a step represented by 1740, the decoding unit 1550 reconstructs an original value by using the following formula 3 and the prediction value, the error value and the sign bit.

$$\text{If } X=S\times E+P(X)$$

$$\text{and } X\geqq G,$$

$$\text{then } X=X-G \quad [\textit{Formula } 3]$$

E refers to an error value, and X refers to a value of a target pixel. P(X) refers to a prediction value, and n refers to the number of bits of a pixel value and a prediction value. S refers to a sign value having 1 or −1 according to a sign bit, and G refers to a predetermined maximum error value.

In a step represented by 1750, the reconstructing unit 1550 reconstructs the original pixel value and determines whether the reconstructed pixel is the last pixel of a video.

If the reconstruct pixel is not the last pixel, the steps represented by 1730 and 1740 are performed to compute a prediction value for a next pixel by using the currently reconstructed pixels.

If the reconstruct pixel is the last pixel, the decoding is ended.

Figure 18:
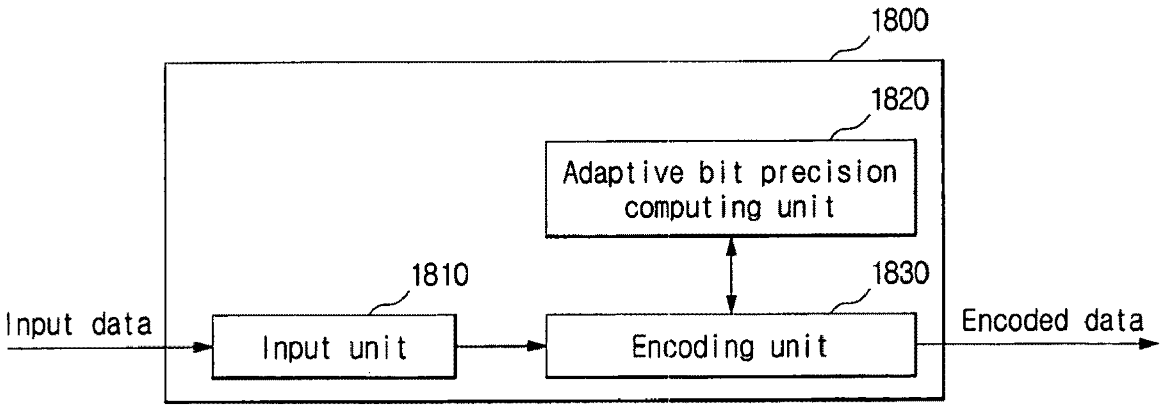
FIG. 18 is a block diagram showing an encoding apparatus using an adaptive bit precision in accordance with an embodiment.

FIG. 18 is a block diagram showing an encoding apparatus using an adaptive bit precision in accordance with an embodiment.

Referring to FIG. 18, the encoding apparatus 1800 include an input unit 1810, an adaptive bit precision computing unit 1820 and an encoding unit 1830.

The input unit 1810 receives input data from an outside device and extracts a symbol to be encoded. The input unit 1810 outputs the extracted symbol to the encoding unit 1830. At this time, the input data can include at least one of a pixel value, mcbpc, cbpy, mv(motion vector)-x, mv-y, DCT-luma and DCT-chroma. The mcbpc, cbpy, mv(motion vector)-x, mv-y, DCT-luma and DCT-chroma are used in the encoding/decoding operation according to the MPEG standard. This shall be evident to any person of ordinary skill in the art. Accordingly, the detailed pertinent description will be omitted.

The adaptive bit precision computing unit 1820 receives a signal requesting an adaptive bit precision and an adaptive bit string of a certain symbol from the encoding unit 1830. The adaptive bit precision computing unit 1820 computes the adaptive bit precision and the adaptive bit string of the symbol according to the requesting signal to output them to the encoding unit 1830. Since the method of computing the adaptive bit precision and the adaptive bit string has been described by using the table 2, the pertinent detailed description will be omitted. Alternatively, the adaptive bit precision computing unit 1820 can store a pre-computed adaptive bit precision and adaptive bit string instead of computing the adaptive bit precision and the adaptive bit string of the symbol according to the request of the encoding unit 1830. In other words, if the adaptive bit precision computing unit 1820 receives the signal requesting the adaptive bit precision and the adaptive bit string of the certain symbol from the encoding unit 1830, the adaptive bit precision computing unit 1820 can output the adaptive bit precision and the adaptive bit string of the pertinent symbol among pre-stored the adaptive bit precisions and the adaptive bit strings to the encoding unit 1830. Moreover, according to the method of embodying the encoding apparatus 1800, the pre-computed adaptive bit precision and adaptive bit string can be stored in the encoding unit 1830 and the adaptive bit precision computing unit 1820 can be omitted in the encoding apparatus 1800.

The encoding unit 1830 encodes a symbol inputted from the input 1810. For example, the encoding unit 1830 receives a symbol formed per each field from the input unit 1810. The encoding unit 1830 computes a bit precision of a pertinent field by using the symbol of the field. The method of computing the bit precision has been described with reference to the table 1. Then, the encoding unit 1830 outputs a signal requesting an adaptive bit precision and an adaptive bit string of a target symbol (i.e. a symbol that is currently being encoded) to the adaptive bit precision computing unit 1820. The encoding unit 1830 receives an adaptive bit precision and an adaptive bit string from the adaptive bit precision computing unit 1820 and determines whether the adaptive bit precision is identical to a bit precision of a field including the pertinent symbol. Next, the encoding unit 1830 inserts a bit indicating that the adaptive bit precision is identical to the bit precision of the field including the target symbol into a bitstream. If the adaptive bit precision is identical to the bit precision, the encoding unit 1830 does not insert the adaptive bit precision into the bitstream but inserts the encoded adaptive bit string into the bit stream. On the other hand, if the adaptive bit precision is not identical to the bit precision, the encoding unit 1830 inserts the adaptive bit precision for the target symbol into the bitstream. After that, the encoding unit 1830 encodes the target symbol by using the adaptive bit precision.

Below described is an embodiment of the present invention that the encoding apparatus 1800 encodes successive symbols {3, 7, 5, 2} by using an adaptive bit precision.

The encoding unit 1830 receives the successive symbols {3, 7, 5, 2} from the input unit 1810. The encoding unit 1830 computes bit precisions for the successive symbols {3, 7, 5, 2}. The following table 6 shows the bit number of an encoded bit string when using a plurality of bit precisions with reference to the table 1.

TABLE 6

| Bit precision | Encoded bit string | Bit number of encoded bit string |
|---|---|---|
| 1 | 100010000000100000100 | 21 |
| 2 | 1100111101111010 | 16 |
| 3 | 011111000101010 | 15 |
| 4 | 0011011101010001 | 16 |
| 5 | 00011001110010100001 | 20 |

The encoding unit 1830, as shown in the table 6, determines the bit precision 3, which has the smallest bit number of the encoded bit string as the bit precision of the received symbols {3, 7, 5, 2}. At this time, although the table 6 shows the bit precisions 1 through 5, it shall be evident to any person of ordinary skill in the art that the range of the bit precision considered according to the method of computing the bit precision can be varied.

The predicting unit 1830 inserts the determined bit precision into the bitstream. Then, the predicting unit 1830 outputs a signal requesting an adaptive bit precision and an adaptive bit string of the symbol 3 to the adaptive bit precision computing unit 1820. The adaptive bit precision computing unit 1820 outputs the adaptive bit precision "3" and the adaptive bit string "00" of the symbol 3 to the encoding unit 1830 according to the requesting signal. Then, the encoding unit 1830 checks whether the adaptive bit precision 3 is identical to the bit precision 3. Since the two values are identical, the encoding unit 1830 inserts "0" into the bitstream. "0" inserted into the bitstream indicates an adaptive bit precision of a symbol to be encoded is identical to a bit precision. In other words, the encoding unit 1830 inserts "0" into the bitstream in order to inform a decoder that the encoding is performed by using the bit precision inserted into the bitstream in the aforementioned operations as an adaptive bit precision. Accordingly, the encoding unit 1830 can save two bits by inserting "0" of 1 bit instead of 3 bits of the adaptive bit precision (at this time, it is assumed that the adaptive bit precision is represented by using 3 bits) into the bitstream. After that, the encoding unit 1830 encodes the symbol 3 by using the adaptive bit precision 3. Since the method of performing the encoding by using the adaptive bit precision has been described with reference to the table 2, the pertinent description will be omitted.

Then, the predicting unit 1830 outputs a signal requesting an adaptive bit precision and an adaptive bit string of the symbol 7 to the adaptive bit precision computing unit 1820. The adaptive bit precision computing unit 1820 outputs the adaptive bit precision "4" and the adaptive bit string "000" of the symbol 7 to the encoding unit 1830 according to the requesting signal. Then, the encoding unit 1830 recognizes that the adaptive bit precision 4 is different from the bit precision 3. The encoding unit 1830 inserts "1" into the bitstream to inform that the adaptive bit precision 4 is different from the bit precision 3. After that, the encoding unit 1830 inserts the adaptive bit precision 4 into the bitstream. The encoding unit 1830 encodes the symbol 7 by using the adaptive bit precision 4.

Then, the encoding unit 1830 encodes the symbols 5 and 2 like the aforementioned symbols 3 and 7.

Figure 19:
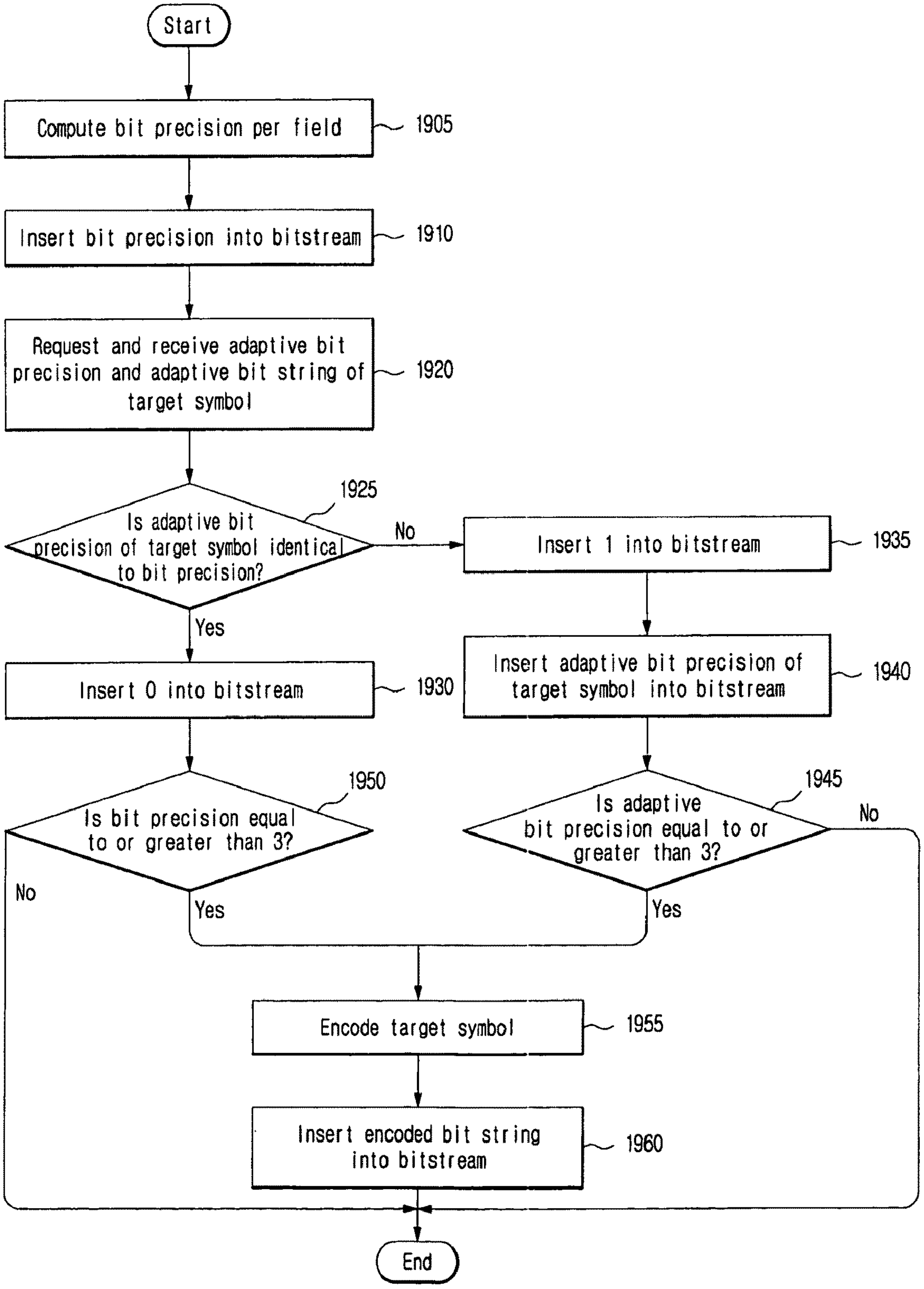
FIG. 19 is a flow chart showing an encoding operation using an adaptive bit precision in accordance with an embodiment of the present invention.

FIG. 19 is a flow chart showing an encoding operation using an adaptive bit precision in accordance with an embodiment of the present invention.

Referring to FIG. 19, the encoding unit 1830 computes a bit precision per each field in a step represented by 1905. At this time, the fields, into which input data is divided in predetermined units, can be at least one of a pixel value, mcbpc, cbpy, mv(motion vector)-x, my-y, DCT-luma and DCT-chroma. Since the method of computing a bit precision has been described with reference to the table 1, the pertinent detailed description will be omitted.

In a step represented by 1910, the encoding unit 1830 inserts the bit precision computed per each field into bitstream.

In a step represented by 1920, the encoding unit 1830 requests an adaptive bit precision and an adaptive bit string of a target symbol from the adaptive bit precision computing unit 1820 and receives the corresponding adaptive bit precision and adaptive bit string.

In a step represented by 1925, the encoding unit 1830 compares the adaptive bit precision of the target symbol with a bit precision to check whether the adaptive bit precision of the target symbol is identical to the bit precision.

If the adaptive bit precision of the target symbol is identical to the bit precision, the encoding unit 1830 inserts "0" into a bitstream in a step represented by 1930. Then, the encoding unit 1830 checks whether the bit precision is identical to or larger than 3 in a step represented by 1950. If the bit precision is identical to or larger than 3, the encoding unit 1830 encodes a target symbol in a step represented by 1955. After that, the encoding unit 1830 inserts the encoded adaptive bit string into the bitstream. If the bit precision is smaller than 3, the encoding unit 1830 ends the encoding operation of the pertinent symbol.

If the adaptive bit precision of the target symbol is identical to the bit precision, the encoding unit 1830 inserts "1" into the bitstream in a step represented by 1935.

Then, the encoding unit 1830 inserts the adaptive bit precision of the target symbol in a step represented by 1940.

The encoding unit 1830 checks whether the adaptive bit precision is equal to or larger than 3 in a step represented by 1945.

If the adaptive bit precision is smaller than 3, the encoding unit 1830 ends the encoding operation of the pertinent symbol.

If the adaptive bit precision is equal to or larger than 3, the encoding unit 1830 encodes the target symbol by using the adaptive bit precision in a step represented by 18555. In other words, the encoding unit 1830 encodes the symbol as the adaptive bit string corresponding to the symbol among the adaptive bit strings inputted in the step represented by 1920. For example, if it is assumed that the symbol 3 is to be encoded, the encoding unit 1830 encodes the symbol as the adaptive bit string of 00 corresponding to the symbol 3 inputted in the step represented by 1920.

Then, the encoding unit 1830 inserts the encoded adaptive bit string into the bitstream. As a result, the encoding unit 1830 encodes the symbol 3 and inserts "000" into the bitstream in consideration of inserting "0" in the step represented by 1930. Of course, the aforementioned example has been described based on the assumption that the adaptive bit precision of the symbol is identical to a temporary adaptive bit precision. If the adaptive bit precision of the symbol is not equal to the temporary adaptive bit precision, the encoding unit 1830 inserts an adaptive bit string "101100" (i.e. 1 in the step represented by 1935, 011 in the step represented by 1945 and 00 in the step represented by 1955).

Even though the method of encoding one symbol has been described above for clear description of the present invention, the encoding unit 1830 can repeatedly perform the steps represented by 1920 through 1960 until all symbols of the pertinent field are encoded. The bitstream, outputted through the aforementioned encoding operation must undergo a corresponding decoding operation in order to be converted to data capable of being used by a user. Hereinafter, a decoding apparatus that can decode data encoded by using the foresaid operation will be described with FIG. 20.

Figure 20:
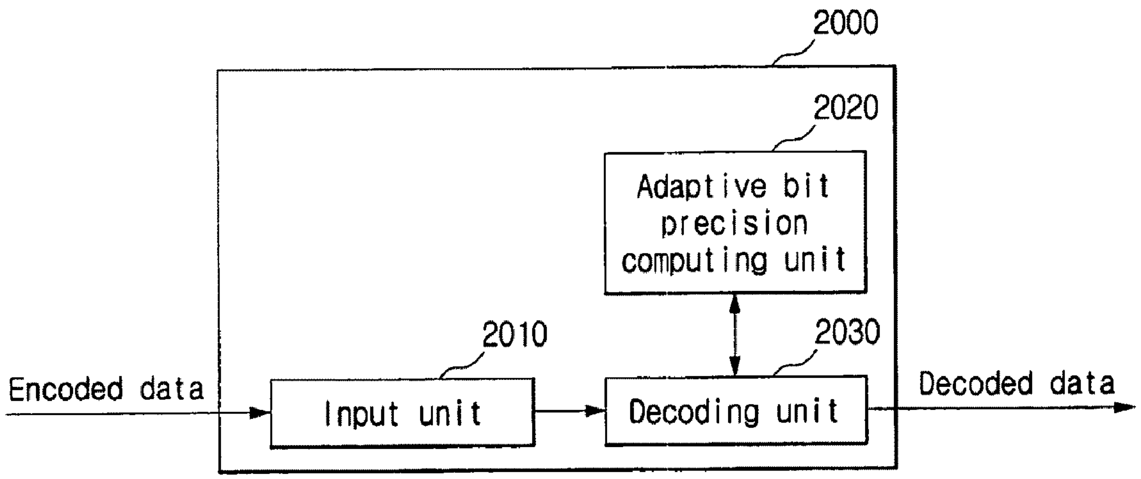
FIG. 20 is a block diagram showing a decoding apparatus using an adaptive bit precision in accordance with an embodiment.

FIG. 20 is a block diagram showing a decoding apparatus using an adaptive bit precision in accordance with an embodiment.

Referring to FIG. 20, the decoding apparatus 2000 includes an input unit 2010, an adaptive bit precision extracting unit 2020 and a decoding unit 2030.

The input unit 2010 receives data encoded by using an adaptive bit precision from an outside device. Then, the input unit 2010 parses the received encoded data per each field and output the parsed data to the decoding unit 2030. The field can be at least one of a pixel value, mcbpc, cbpy, mv(motion vector)-x, my-y, DCT-luma and DCT-chroma.

The adaptive bit precision extracting unit 2020 receives a signal requesting a symbol corresponding to an encoded adaptive bit stream from decoding unit 2030. The adaptive bit precision extracting unit 2020 computes the symbol corresponding to the encoded adaptive bit string and outputs the computed symbol to the decoding unit 2030. The method of computing the adaptive bit precision and the adaptive bit string has been described by using the table 2. Accordingly, the pertinent detailed described will be omitted. Alternatively, the adaptive bit precision extracting unit 2020 can store a pre-computed adaptive bit precision, adaptive bit string and symbol instead of computing the symbol corresponding to the encoded adaptive bit string. In other words, if the signal requesting the symbol corresponding to the encoded adaptive bit string of the decoding unit 2030 is inputted, the adaptive bit precision extracting unit 2020 can search a list of the pre-stored adaptive bit precision, adaptive bit string and symbol and output the symbol corresponding to the pertinent adaptive bit string to the decoding unit 2030. Moreover, according to the embodying method of the decoding apparatus 2000, the list of the pre-stored adaptive bit precision, adaptive bit string and symbol can be stored in the decoding unit 2030, and the adaptive bit precision extracting unit 2020 can be omitted in the decoding apparatus 2000.

The decoding unit 2030 receives the data parsed per field from the input unit 2010. The decoding unit 2030 decodes the parsed data per each field by using the adaptive bit precision. For example, the decoding unit 2030 extracts the adaptive bit precision from the parsed data. Then, the decoding unit 2030 extracts the encoded adaptive bit string from the data parsed according to the adaptive bit precision. For example, if the adaptive bit precision is assumed to be 3, the decoding unit 2030 extracts 2 bits from the parsed data. At this time, it shall be obvious that the decoding unit successively extracts each bit from the parsed data. After that, the decoding unit 2030 outputs a signal requesting a symbol corresponding to the parsed adaptive bit string to the adaptive bit precision extracting unit 2020. Then, the decoding unit 2030 receives the symbol (i.e. decoded data) corresponding to the pertinent adaptive bit string from adaptive bit precision extracting unit 2020 and outputs the symbol to an outside device.

Figure 21:
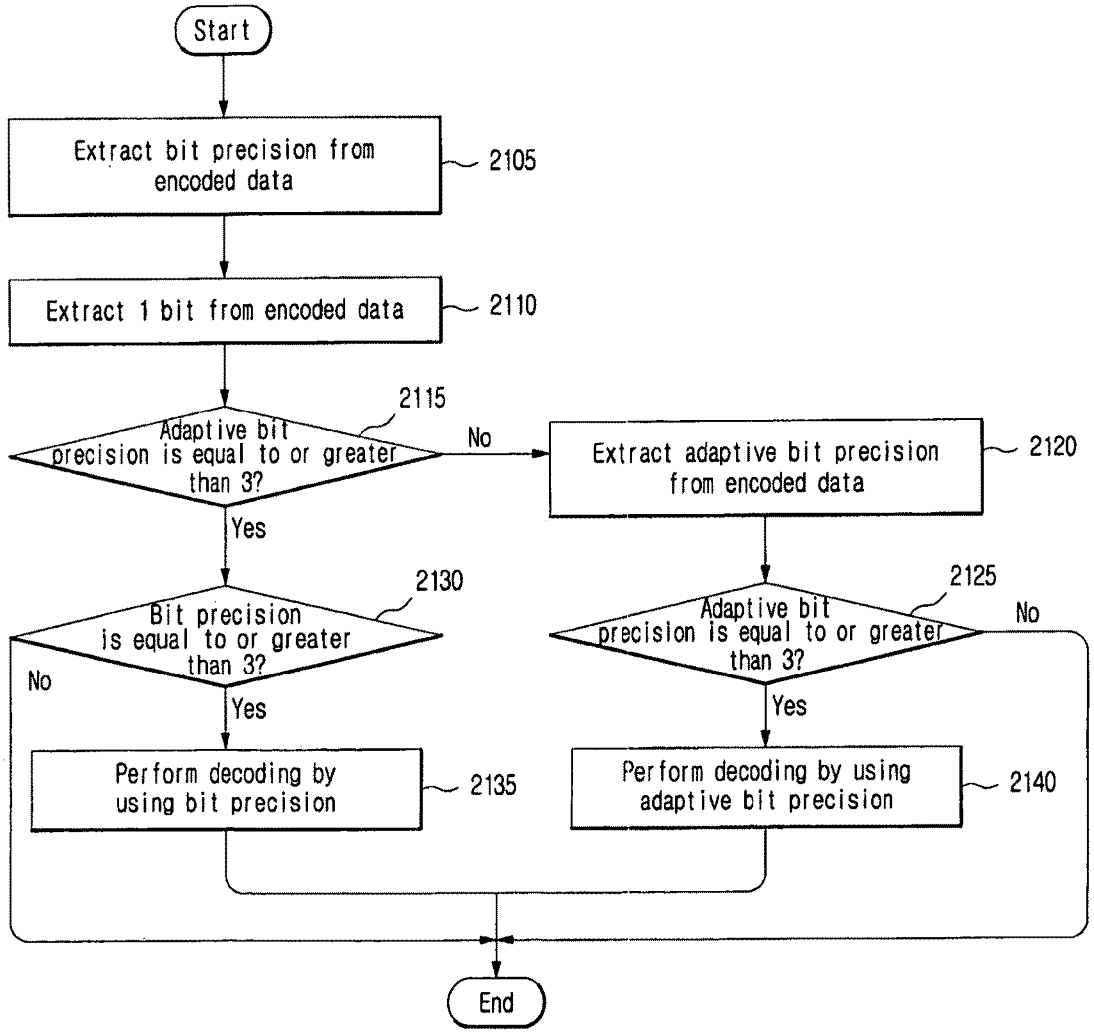
FIG. 21 is a flow chart showing a decoding operation using an adaptive bit precision in accordance with an embodiment of the present invention.

FIG. 21 is a flow chart showing a decoding operation using an adaptive bit precision in accordance with an embodiment of the present invention.

Referring to FIG. 21, the decoding unit 2030 extracts a bit precision from encoded data in a step represented by 2105.

In a step represented by 2110, the decoding unit 2030 extracts 1 bit from the encoded data.

In a step represented by 2115, the decoding unit 2939 checks whether the 1 bit extracted in the step represented by 2110 is 0.

If the 1 bit extracted in the step represented by 2110 is not 0, the decoding unit 2030 extracts an adaptive bit precision from the encoded data in a step represented by 2120.

In a step represented by 2125, the decoding unit 2030 checks whether the adaptive bit precision extracted in the step represented by 2120 is equal to or larger than 3.

If the adaptive bit precision extracted in the step represented by 2120 is equal to or larger than 3, the decoding unit 2030 decodes a pertinent symbol by using the adaptive bit precision in a step represented by 2140.

If the adaptive bit precision is smaller than 3, however, the decoding of the pertinent symbol is ended.

If the 1 bit extracted in the step represented by 2110 is 0, the decoding unit 2030 checks whether the bit precision value is equal to or larger than 3 in a step represented by 2130. If the bit precision value is equal to or larger than 3, decoding unit 2030 decodes a pertinent symbol by using the adaptive bit precision. If the bit precision is smaller than 3, however, the decoding of the pertinent symbol is ended.

The aforementioned decoding operation decodes an adaptive bit stream corresponding to one symbol. The decoding unit 2030 can repeatedly perform the steps represented by 2110 through 2140 until all adaptive bit strings of the encoded data are decoded.

Figure 22:
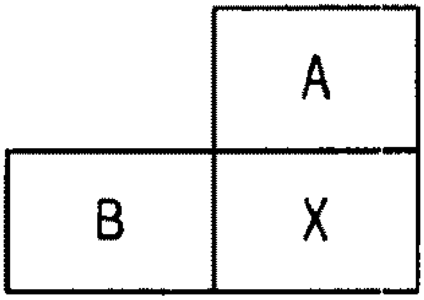
FIG. 22 is a diagram for helping to describe how to compute a prediction bit precision in accordance with an embodiment of the present invention.

FIG. 22 is a diagram for helping to describe how to compute a prediction bit precision in accordance with an embodiment of the present invention.

Referring to FIG. 22, the prediction bit precision refers to the bit precision computed by using symbols pertaining to an upper macroblock and/or a left macroblock of a macroblock (hereinafter, referred to as a "target macroblock") to be currently encoded. For example, as shown in FIG. 22, X refers to the target macroblock. A refers to the upper macroblock, and B refers to the left macroblock. The prediction bit precision of the target macroblock X refers to the bit precision computed by using the symbols included in the macroblocks A and B. The method of selecting the bit precision is the same as described with reference to the table 1. In other words, the symbols included in the macroblocks A and B are encoded, and a bit precision having the smallest encoded capacity is computed as the prediction bit precision of the target macroblock X.

If there is only any one of the upper macroblock and the left macroblock (i.e. there is the target macroblock at the uppermost part or leftmost part of a VOP), the prediction bit precision can be computed by using the symbols of the uppermost or leftmost macroblock. On the other hand, if there is neither the upper macroblock nor the left macroblock (i.e. there is the target macroblock at the lowermost left part), the prediction bit precision is not able to be computed. In this case, the encoding can be performed by using the bit precision computed by use of the symbol pertaining to the pertinent VOP.

Figure 23:
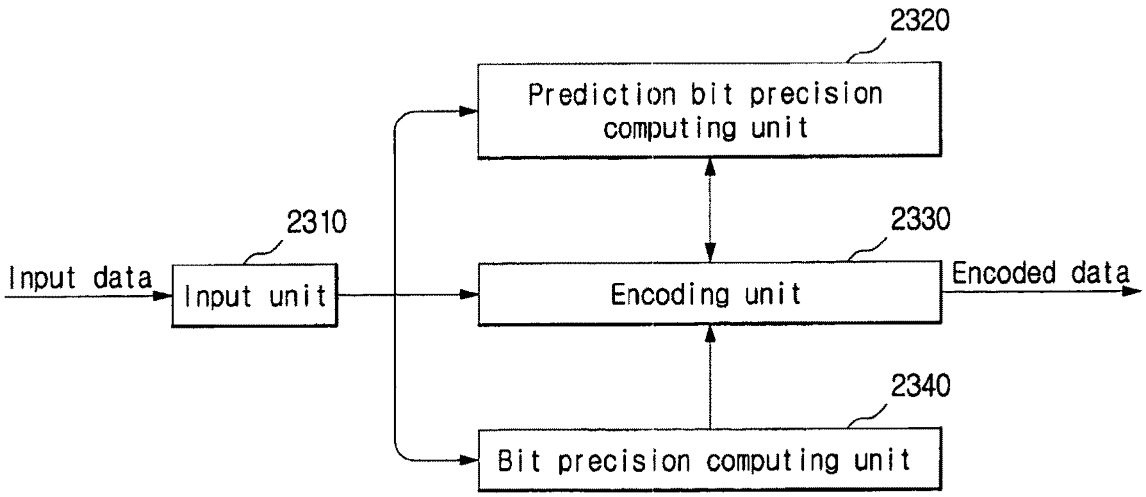
FIG. 23 is a block diagram showing an encoding apparatus using a prediction bit precision in accordance with an embodiment of the present invention.

FIG. 23 is a block diagram showing an encoding apparatus using a prediction bit precision in accordance with an embodiment of the present invention.

Referring to FIG. 23, the encoding apparatus using a prediction bit precision in accordance with an embodiment of the present invention includes an input unit 2310, a prediction bit precision computing unit 2320, a bit precision computing unit 2330 and an encoding unit 2340.

The input unit 2310 receives input data from the outside and extracts and outputs the symbols to be encoded. At this time, the input unit 2310 distinguishes the extracted symbols in units of VOP and macroblock (or block having a predetermined size) and the distinguished symbols and distinguishment information to the prediction bit precision computing unit 2320, the bit precision computing unit 2330 and the encoding unit 2340. At this time, the input data can include at least one of data corresponding to a value, mcbpc, cbpy, mv(motion vector)-x, my-y, DCT-luma and DCT-chroma. The mcbpc, cbpy, mv(motion vector)-x, mv-y, DCT-luma and DCT-chroma are used in the encoding/decoding operation according to the MPEG standard. This shall be evident to any person of ordinary skill in the art. Accordingly, the detailed pertinent description will be omitted.

The prediction bit precision computing unit 2320 distinguishes the received symbols in units of macroblock and computes a prediction bit precision to output it to the encoding unit 2340. The detailed operation of computing the prediction bit precision is the same as described above. Accordingly, the pertinent description will be omitted. However, if there is neither the upper macroblock nor the left macroblock of the target macroblock (i.e. there is the target macroblock at the lowermost left part), the prediction bit precision is computed as "0" and outputted. On the other hand, if the upper macroblock and the left macroblock are skipped macroblocks, the prediction bit precision is computed as "0." Information indicating that if the upper macroblock and the left macroblock are skipped macroblocks can be included in the input data or can be additionally inputted from the outside. Since it shall be evident to any person of ordinary skill in the art that the skipped macroblock refers to the macroblock undergoing a skip processing in the encoding operation, the pertinent detailed description will be omitted.

The bit precision computing unit 2330 distinguishes the inputted symbols in units of VOP and computes a bit precision to output it to the encoding unit 2340. The detailed method of computing the bit precision is the same as described above.

The encoding unit 2340 encodes the symbol by using any one of the prediction bit precision and the bit precision inputted from the prediction bit precision computing unit 2320 and/or the bit precision computing unit 2330.

Below described in detail is the encoding operation of the encoding unit 2340.

Firstly, the encoding unit 2340 inserts a bit precision of a VOP into a bitstream.

Then, the encoding unit 2340 checks whether a prediction bit precision of macroblocks included in the VOP is "0."

As the result of checking it, if the prediction bit precision is 0, the symbols of target macroblock is encoded by using the bit precision of the pertinent VOP.

On the other hand, if the prediction bit precision is not 0, the encoding unit 2340 encodes the symbols of the target macroblock by using the prediction bit precision. Then, the encoding unit 2340 inserts a bit string of the encoded symbol into the bitstream.

Figure 24:
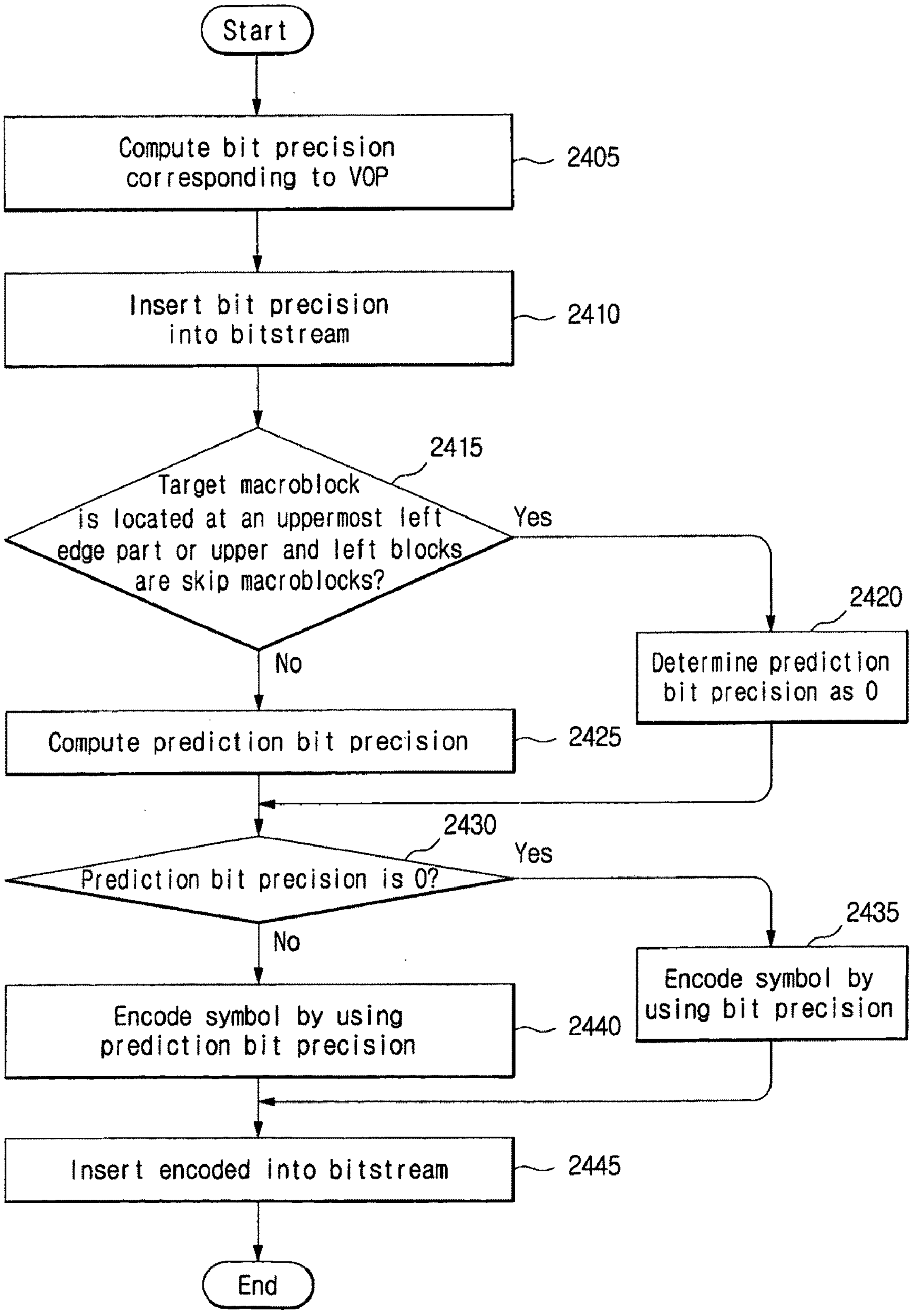
FIG. 24 is a flow chart showing an encoding operation using a prediction bit precision in accordance with an embodiment of the present invention.

FIG. 24 is a flow chart showing an encoding operation using a prediction bit precision in accordance with an embodiment of the present invention. Although the operations to be described below are performed by each inner element of the encoding apparatus, the inner elements are collectively referred to as the encoding apparatus for the convenience of understanding and description.

Firstly, the encoding apparatus computes a bit precision of a VOP in a step represented by 2405. At this time, the symbols included in the VOP can have a value indicating one of mcbpc, cbpy, mv(motion vector)-x, my-y, DCT-luma and DCT-chroma. Since the method of computing the bit precision has been described with reference to the table 1, the pertinent detailed description will be omitted.

In a step represented by 2410, the encoding apparatus inserts the computed bit precision into a bitstream.

In a step represented by 2415, the encoding apparatus checks whether a target macroblock is located at an uppermost left edge part or upper and left blocks are skip macroblocks.

As the result of being checked in the step represented by 2415, if the target macroblock is located at the uppermost left edge part or the upper and left blocks are the skip macroblocks, the encoding apparatus determines a prediction bit precision as "0" in a step represented by 2420.

However, if the target macroblock is not located at the uppermost left edge part and the upper and left blocks are not the skip macroblocks, the decoding apparatus computes the prediction bit precision by using the upper and/or left macroblock in a step represented by 2425.

Then, the encoding apparatus checks whether the prediction bit precision is 0 in a step represented by 2430.

If the prediction bit precision is 0, the encoding apparatus encodes symbols of the target macroblock by using the bit precision of a pertinent VOP in a step represented by 2435.

However, if the prediction bit precision is not 0, the encoding apparatus encodes the symbols of the target macroblock by using the prediction bit precision in a step represented by 2440.

In a step represented by 2445, the encoding apparatus inserts the encoded bit string into the bitstream.

Even though the method of encoding symbols of one macroblock has been described above for clear description of the present invention, the encoding apparatus can repeatedly perform the steps represented by 2415 through 2445 until all symbols of a pertinent frame or VOP are encoded.

Figure 25:
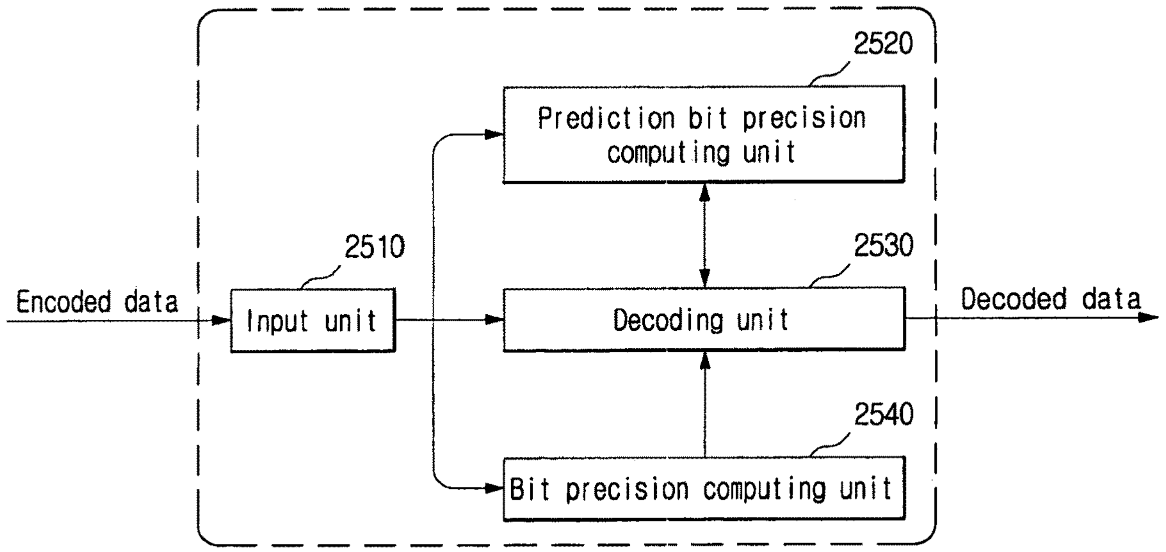
FIG. 25 is a block diagram showing a decoding apparatus using a prediction bit precision in accordance with an embodiment of the present invention.

FIG. 25 is a block diagram showing a decoding apparatus using a prediction bit precision in accordance with an embodiment of the present invention.

Referring to FIG. 25, the decoding apparatus using the prediction bit precision in accordance with an embodiment of the present invention includes an input unit, a prediction bit precision computing unit 2520, a decoding unit 2530 and a bit precision extracting unit 2540.

The input unit 2510 receives data encoded by using a bit precision and/or a prediction bit precision from the outside. Then, the input unit 2510 outputs the received encoded data to the bit precision extracting unit 2540 and the decoding unit 2530.

The bit precision extracting unit 2540 extracts a bit precision inserted into a decoded bitstream and output the extracted bit precision to the decoding unit 2530.

The prediction bit precision computing unit 2520 receives a signal requesting a prediction bit precision of a target macroblock and a symbol of a previously decoded macroblock from the decoding unit 2530. At this time, the prediction bit precision computing unit 2520 can store decoded symbol received from the decoding unit 2530 until the decoding operation of a pertinent VOP is ended. After that, the prediction bit precision computing unit 2520 computes a prediction bit precision with reference to the encoded symbols of upper and left macroblocks of the target macroblock and outputs the computed prediction bit precision to the decoding unit 2530. Since the method of computing the prediction bit precision has been described with reference to FIG. 22, the pertinent detailed description will be omitted.

The decoding unit 2530 decodes the encoded data inputted from the input unit 2510 by using the bit precision and the prediction bit precision.

Below described in detail is the processing operation of decoding unit 2530. The decoding unit 2530 extracts a bit string as much as the length of the bit precision value from the encoded data. For example, if the bit precision is assumed to have the value of 3, the decoding unit 2530 extracts 3 bits from the encoded data in order to decode an uppermost left macroblock of a VOP. Of course, if the extracted 3 bits is "111," the decoding unit 2530 extracts another 3 bits. Here, it shall be obvious that the decoding unit 2530 successively extracts each bit from the encoded data. Then, the decoding unit 2530 compounds the extracted bits and decodes them as the symbol 8. For example, if "111001" is assumed to be extracted, the decoding unit 2530 decodes the extracted 6 bits as the symbol 8 as shown in the table 1. The decoding unit 2530 repeatedly performs the extracting and reconstructing operations until all symbols of the uppermost left macroblock of the VOP are decoded. The decoding unit 2530 decodes all symbols of the target macroblock before outputting their symbols to the prediction bit precision computing unit 2520.

Then, the decoding unit 2530 determines the right macroblock of the macroblock decoded in the aforementioned operation as a target macroblock. The decoding unit 2530 checks whether the upper and left macroblocks are the skipped macroblocks. At this time, information indicating that the upper and left macroblocks are the skipped macroblocks can be included in the encoded data or can be additionally inputted from the outside. If the upper and left macroblocks are the skipped macroblocks, the decoding unit 2530 decodes an encoded string as the symbol of the target macroblock by using the bit precision. The operation of performing the decoding by using the bit precision has been described in the operation of decoding the uppermost left macroblock of the VOP. On the other hand, if the upper and left macroblocks are not the skipped macroblocks, the decoding unit 2530, the decoding unit 2530 outputs a signal requesting a prediction bit precision of the target macroblock to the prediction bit precision computing unit 2520.

After that, the decoding unit 2530 receives the prediction bit precision of the target macroblock from the prediction bit precision computing unit 2520. Then, the decoding unit 2530 extracts an encoded string from the bitstream and decodes the encoded string as the symbol of the target macroblock by using the prediction bit precision. Since the operation of performing the decoding by using the prediction is identical to the operation of performing the decoding by using the bit precision, the pertinent description will be omitted. At this time, if the computed prediction bit precision has the value of 0, the decoding unit 2530 performs the decoding by using the bit precision.

Then, the decoding unit 2530 determines the right macroblock of the previously decoded macroblocks as the target macroblock. If there is not the right macroblock at all, the decoding unit 2530 determines the lower leftmost block as the target macroblock. Since the operation of decoding the symbols of the macroblock is identical to the foresaid decoding operation, the pertinent description will be omitted. After that, the decoding unit 2530 outputs symbol data of the decoded macroblock to the prediction bit precision computing unit 2520. If all macroblocks in the VOP is completely decoded, the decoding unit 2520 ends the decoding of the pertinent VOP.

Figure 26:
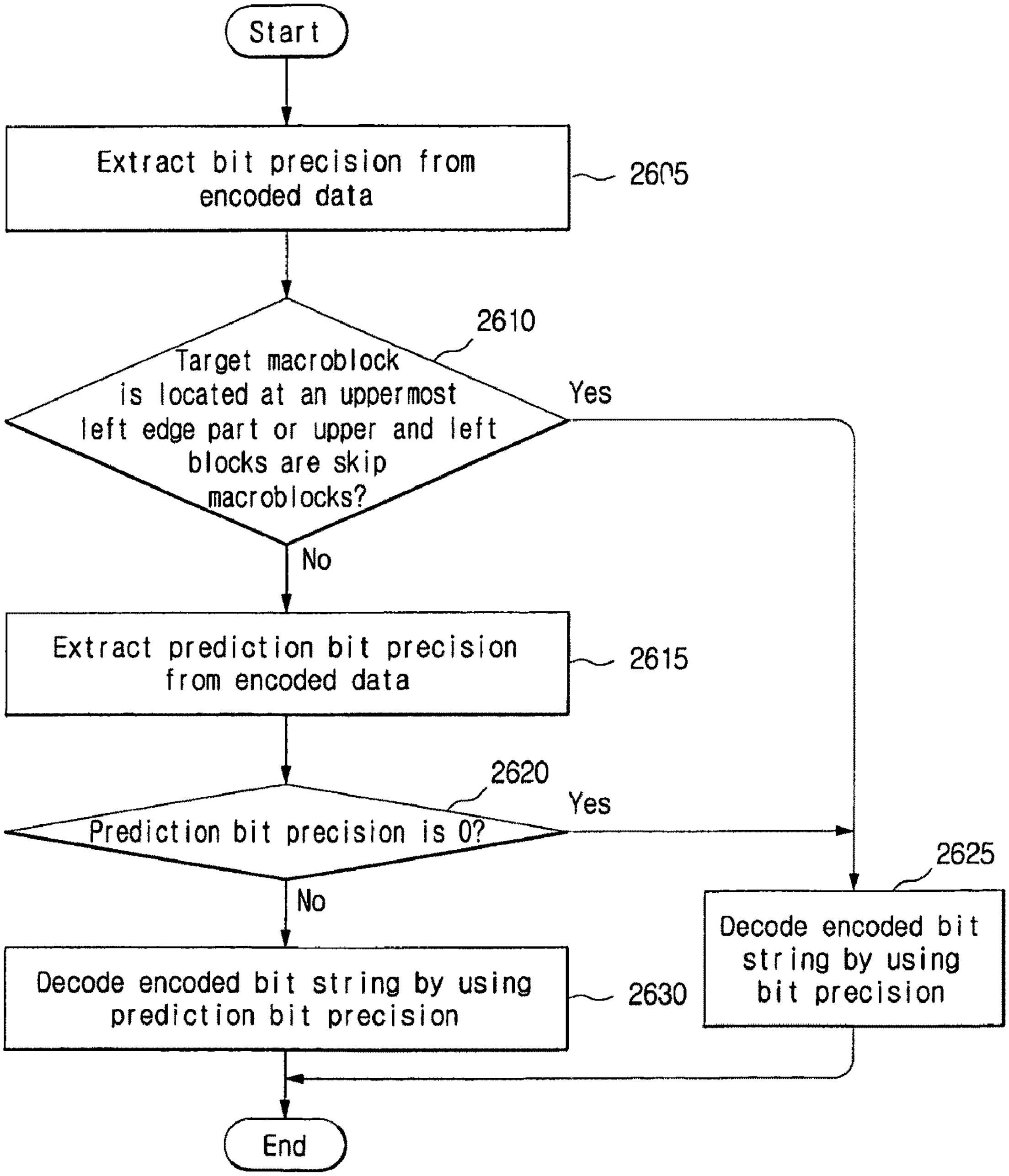
FIG. 26 is a flow chart showing a decoding operation using a prediction bit precision in accordance with an embodiment of the present invention.

FIG. 26 is a flow chart showing a decoding operation using a prediction bit precision in accordance with an embodiment of the present invention. Although the operations to be described below are performed by each inner element of the decoding apparatus 2500, the inner elements are collectively referred to as the decoding apparatus 2500 for the convenience of understanding and description.

Firstly, the decoding apparatus 2500 extracts a bit precision from an inputted encoded data in a step represented by 2605. Then, the decoding apparatus 2500 checks whether a target macroblock is located at an uppermost left or upper and left macroblocks are skipped macroblocks in a step represented by 2610.

If the target macroblock is located at an uppermost left or the upper and left macroblocks are the skipped macroblocks, the decoding apparatus 2500 decodes the encoded data by using the bit precision.

However, if the target macroblock is located at an uppermost left or the upper and left macroblocks are not the skipped macroblocks, the decoding apparatus 2500 computes a prediction bit precision of a target macroblock by using symbols of already-decoded upper and/or left macroblock(s) in a step represented by 2615.

In a step represented by 2620, the decoding apparatus 2500 checks whether the computed prediction bit precision is "0."

If the prediction bit precision is 0, the decoding apparatus 2500 decodes the encoded data by using the bit precision in a step represented by 2625.

However, if the prediction bit precision is not 0, the decoding apparatus 2500 extracts an encoded string from a bitstream and decodes the encoded string by using the prediction bit precision in a step represented by 2630.

Even though the operation of decoding symbols of one macroblock has been described above for clear description of the present invention, the decoding apparatus 2500 can repeatedly perform the steps represented by 2610 through 2630 until all symbols of a pertinent frame or VOP are decoded.

Figure 27:
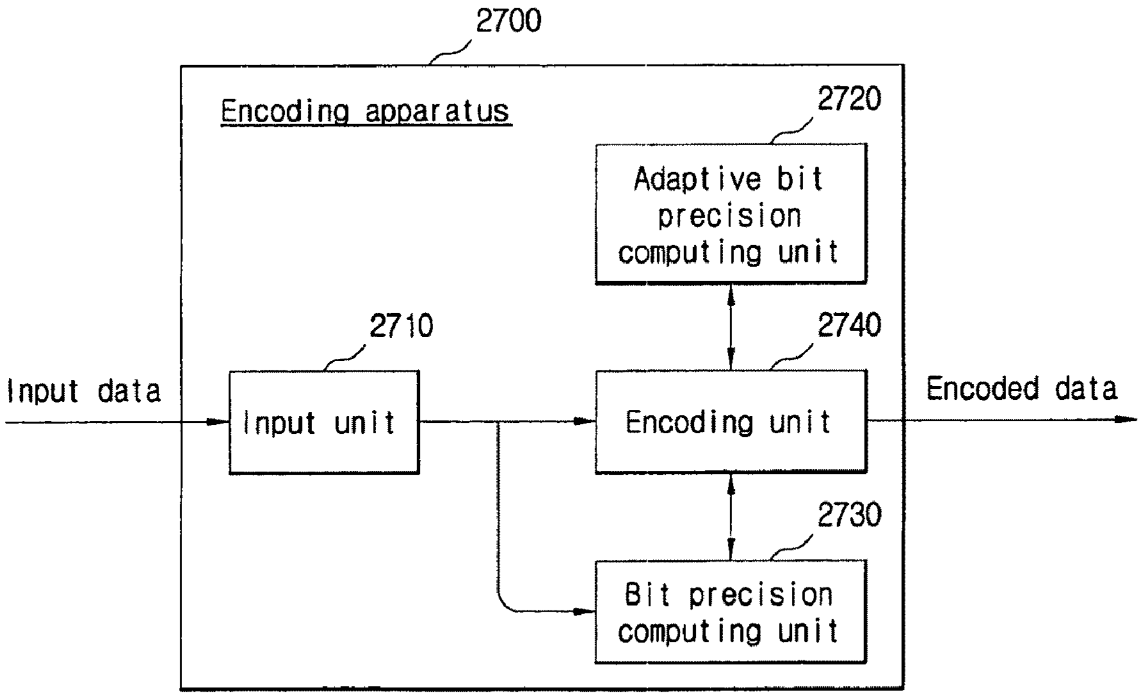
FIG. 27 is a block diagram showing an encoding apparatus using a bit precision in accordance with an embodiment of the present invention.

FIG. 27 is a block diagram showing an encoding apparatus using a bit precision in accordance with an embodiment of the present invention.

Referring to FIG. 27, the encoding apparatus 2700 using a bit precision in accordance with an embodiment of the present invention includes an input unit 2710, an adaptive bit precision computing unit 2720, a bit precision extracting unit 2730 and an encoding unit 2740.

The input unit 2710 receives input data from the outside and extracts and outputs symbols to be encoded. At this time, the input unit 2710 can output the extracted symbols along with distinguishment information that distinguishes the symbols in units of VOP and macroblock (i.e. block having a predetermined size. The input unit 2710 also extracts field information from the input data to output the extracted field information. Here, the field information indicates the kind (i.e. type) of fields of the input data. As a result, the input unit 2710 outputs the field information, the distinguishment information and the symbol to the bit precision extracting unit 2730 and the encoding unit 2740.

At this time, the input data can include at least one of a macroblock type & coded block pattern for chrominance (mcbpc) field, a coded block pattern for luminance (cbpy) field, motion vector (mv-x and my-y) fields and DCT (DCT-luma and DCT-chroma) fields. The mcbpc, cbpy, motion vector and DCT fields are used in the encoding/decoding operation according to the MPEG standard. Since this is evident to any person of ordinary skill in the art, the pertinent detailed description will be omitted.

In this description, the encoding/decoding operation according to the MPEG-4 standard will be described. Accordingly, the fields of the input data will be described based on the mcbpc, cbpy, the motion vector and DCT fields. However, if the encoding/decoding targets are different fields such as AVC and RV9, although the names of the fields of the input data are different, this can be applied to the present invention.

The adaptive bit precision computing unit 2720 computes an adaptive bit precision and an adaptive bit string of a certain block according to a requesting signal of the encoding unit 2740 and outputs them to the encoding unit 2740. Since the method of the adaptive bit precision and the adaptive bit string has been described by using the table 2, the pertinent detailed description will be omitted.

Of course, if the adaptive bit precision and the adaptive bit string of the certain block are stored in the adaptive bit precision computing unit 2720, the additional computing operation can be omitted. For example, in case that the adaptive bit precision and the adaptive bit string of the certain block are pre-stored in the adaptive bit precision computing unit 2720, if a signal requesting the adaptive bit precision and the adaptive bit string of the certain block is inputted, the adaptive bit precision computing unit 2720 can extracts the adaptive bit precision and the adaptive bit string of the certain block pre-stored corresponding to the pertinent symbol and outputs them to encoding unit 2740.

Moreover, an adaptive bit precision and an adaptive bit string corresponding to each symbol can be pre-stored in the encoding unit 2740 according to the embodying method of the encoding unit. In this case, the adaptive bit precision computing unit 2720 can be omitted in the encoding unit 2700.

The bit precision computing unit 2730 distinguishes the inputted symbols in units of VOP (or macroblock) and computes the bit precision to output it to the encoding unit. The detailed operation of the bit precision is the same as described above.

The encoding unit 2740 encodes the symbols by using the adaptive bit precision and the bit precision inputted from the adaptive bit precision computing unit 2720 and/or the bit precision computing unit 2730. The encoding unit 2740 also differently each symbol according to the field information inputted through the input unit 2710. In other words, the encoding unit 2740 can select one of a plurality of decoding operations according to the inputted field information and decodes the symbols. This will be described below in detail with reference to FIG. 28 through FIG. 32.

Figure 28:
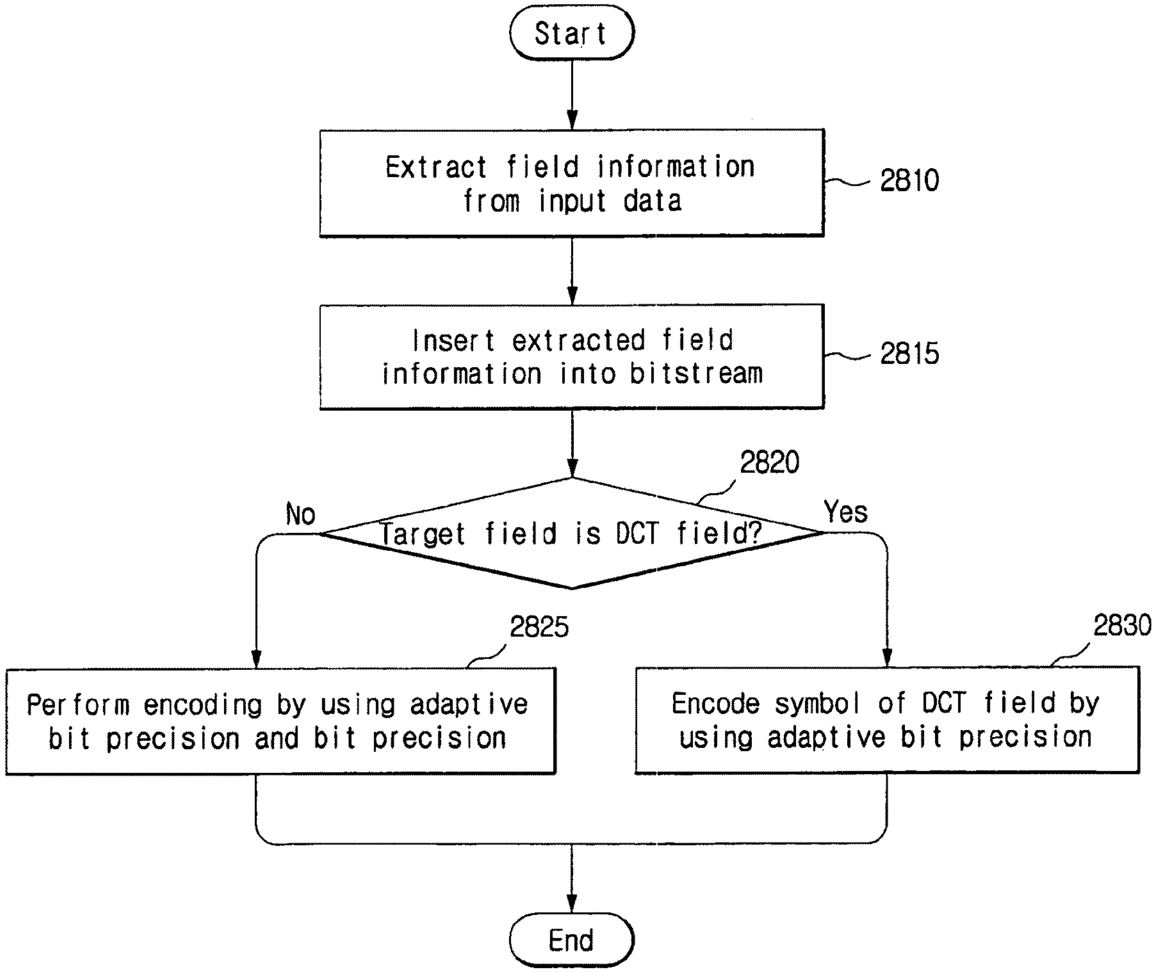
FIG. 28 is a flow chart showing how an encoding is performed per each field by using a bit precision and an adaptive bit precision in accordance with an embodiment of the present invention.

FIG. 28 is a flow chart showing how an encoding is performed per each field by using a bit precision and an adaptive bit precision in accordance with an embodiment of the present invention. Although the operations to be described below are performed by each inner element of the encoding apparatus 2700, the inner elements are collectively referred to as the encoding apparatus 2700 for the convenience of understanding and description.

In a step represented by 2810, the encoding apparatus 2700 extracts field information from input data. As described above, the field information indicates the kind (i.e. type) of fields of the input data.

In a step represented by 2815, the encoding apparatus 2700 inserts the extracted field information into a bitstream according to the encoding method of the present invention. For example, the encoding apparatus 2700 can inserts the field information into a head of the bitstream.

In a step represented by 2820, the encoding apparatus 2700 checks whether a field (hereinafter, referred to as a “target field” for the convenience of understanding and description) to be currently decoded is a DCT field by using the extracted field information.

If the target field is not the DCT field, in a step represented by 2825, the encoding apparatus 2700 computes an adaptive bit precision and a bit precision and encodes a symbol of the target field by using the adaptive bit precision and the bit precision. This will be described below in detail with reference to FIG. 29. In this description, another field, which is not the DCT field, can be a mcbpc, cbpy or motion vector field.

However, if the target field is the DCT field, in a step represented by 2830, the encoding apparatus 2700 computes an adaptive bit precision corresponding to a symbol of the DCT symbol and encodes the symbol of the target symbol by using the computed adaptive bit precision. This will be described below in detail with reference to FIG. 30.

Figure 29:
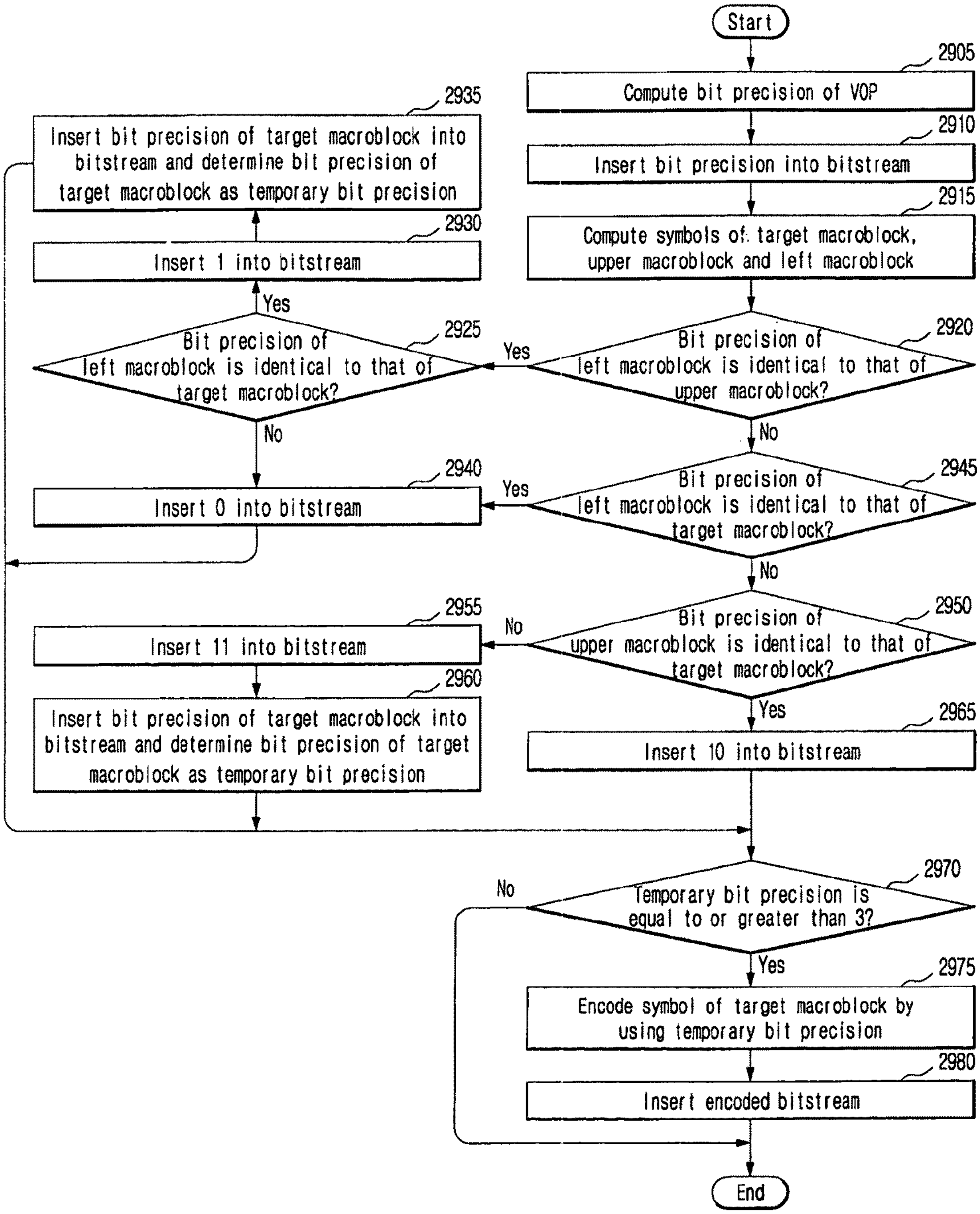
FIG. 29 is a flow chart showing how an encoding is performed by using a bit precision and an adaptive bit precision in accordance with an embodiment of the present invention.

FIG. 29 is a flow chart showing how an encoding is performed by using a bit precision and an adaptive bit precision in accordance with an embodiment of the present invention. Hereinafter, the method of encoding input data by using an adaptive bit precision and a bit precision when a target field is not a DCT field will be described in detail. Below described is a flow chart showing a detailed description related to an embodiment of the step represented by 2825 of FIG. 28. Although the operations to be described below are performed by each inner element of the encoding apparatus 2700, the inner elements are collectively referred to as the encoding apparatus 2700 for the convenience of understanding and description. Moreover, since the method of distinguishing or extracting data in units of VOP from input data, to be described below, is evident to any person of ordinary skill in the art, the pertinent detailed description will be omitted. The encoding method to be described below can be used to encode symbols of a mcbpc, cbpy or motion vector field.

Firstly, the encoding apparatus 2700 computes a bit precision of a VOP in a step represented by 2905. At this time, the bit precision is computed by using an index of a Huffman table of each field. For example, the encoding apparatus 2700 can compute a bit precision by using possibility information of a VLC table of the MPEG standard. Here, the Huffman table, which is used in a Huffman encoding method, lists bit strings to be encoded according to the frequency of symbols to be encoded. Since the Huffman table is evident to any person of ordinary skill in the art, the pertinent detailed description will be omitted.

In a step represented by 2910, the decoding apparatus 2700 determines the computed bit precision as a temporary bit precision and inserts the temporary bit precision into a bit stream. In this description, the temporary bit precision is another term which refers to an adaptive bit precision. Accordingly, the temporary bit precision must be analyzed or understood as the adaptive bit precision in the description related to the present invention.

In this description, the temporary bit precision is defined as a variable that stores a bit precision. The temporary bit precision is used for the encoding in the following operations.

In a step represented by 2915, the encoding apparatus computes symbols of a target macroblock, an upper macroblock and a left macroblock, respectively.

In this description, the target macroblock refers to the macroblock that is currently being encoded. The upper macroblock refers to the next macroblock to the upper side of the target macroblock, and the lower macroblock refers to the next block to the left side of the target macroblock.

In a step represented by 2920, the encoding apparatus compares bit precisions of the left macroblock and the upper macroblock and checks whether the bit precision of the left macroblock is identical to that of the upper macroblock.

In the description hereinafter, it shall be understood that the bit precision of a macroblock and the bit precision of a symbol of a macroblock have the same meaning.

If it is determined that the bit precision of the left macroblock is identical to that of the upper macroblock, in a step represented by 2925, the encoding apparatus 2700 checks whether a bit precision of the left macroblock is identical to that of the target macroblock.

If the bit precision of the left macroblock is identical to that of the target macroblock, in a step represented by 2930, the encoding apparatus 2700 inserts a first bit value (e.g. “1”) into a bitstream.

In a step represented by 2935, the encoding apparatus 2700 determines the bit precision of the target macroblock as a temporary bit precision. In the step represented by 2935, the encoding apparatus 2700 insets the bit precision of the target macroblock into the bitstream.

As the result of checking it in the step represented by 2925, if it is determined that the bit precision of the left macroblock is not identical to that of the upper macroblock, in a step represented by 2940, the encoding apparatus 2700 inserts a second bit value (e.g. “0”) into the bitstream.

As the result of checking it in the step represented by 2920, if it is determined that the bit precision of the left macroblock is not identical to that of the upper macroblock, in a step represented by 2945, the encoding apparatus 2700 checks whether the bit precision of the left macroblock is identical to that of the target macroblock.

If it is determined that the bit precision of the left macroblock is identical to that of the target macroblock, the encoding apparatus 2700 performs the step represented by 2940.

However, if it is determined that the bit precision of the left macroblock is not identical to that of the target macroblock, in a step represented by 2950, the encoding apparatus 2700 checks whether a bit precision of the upper macroblock is identical to that of the target macroblock.

If it is determined that the bit precision of the upper macroblock is not identical to that of the target macroblock, in a step represented by 2955, the encoding apparatus 2700 inserts a third bit value (e.g. “11”) into the bitstream.

In a step represented by 2960, the encoding apparatus 2700 determines the bit precision of the target macroblock as the temporary bit precision. The encoding apparatus 2700 also inserts the bit precision of the target macroblock into the bitstream.

However, if it is determined that the bit precision of the upper macroblock is identical to that of the target macroblock, in a step represented by 2965, the encoding apparatus 2700 inserts a fourth bit value (e.g. “10”) into the bit stream.

In a step represented by 2970, the encoding apparatus 2700 checks whether a value of the temporary bit precision is equal to or larger than a threshold value (e.g. “3”).

If the value of the temporary bit precision is equal to or larger than the threshold value (e.g. “3”), in a step represented by 2975, the encoding apparatus 2700 encodes a symbol of the target macroblock by using the temporary bit precision.

For example, the encoding apparatus 2700 can consider the temporary bit precision as an adaptive bit precision and compute an adaptive bit string corresponding to the temporary bit precision in order to encode the pertinent symbol by using the adaptive bit string.

In a step represented by 2980, the encoding apparatus 2700 inserts the decoded bit string (i.e. the adaptive bit string) into the bitstream.

As the result of checking it in the step represented by 2970, if the value of the temporary bit precision is smaller than the threshold value (e.g. “3”), the encoding apparatus 2700 ends the encoding operation of the target macroblock.

Even though the method of encoding symbols of one macroblock has been described above for clear description of the present invention, the encoding apparatus 2700 can repeatedly perform the steps represented by 2915 through 2980 until all symbols of a pertinent frame or VOP are encoded.

Hereinafter, the operation of encoding symbols of a DCT field will be described.

Figure 30:
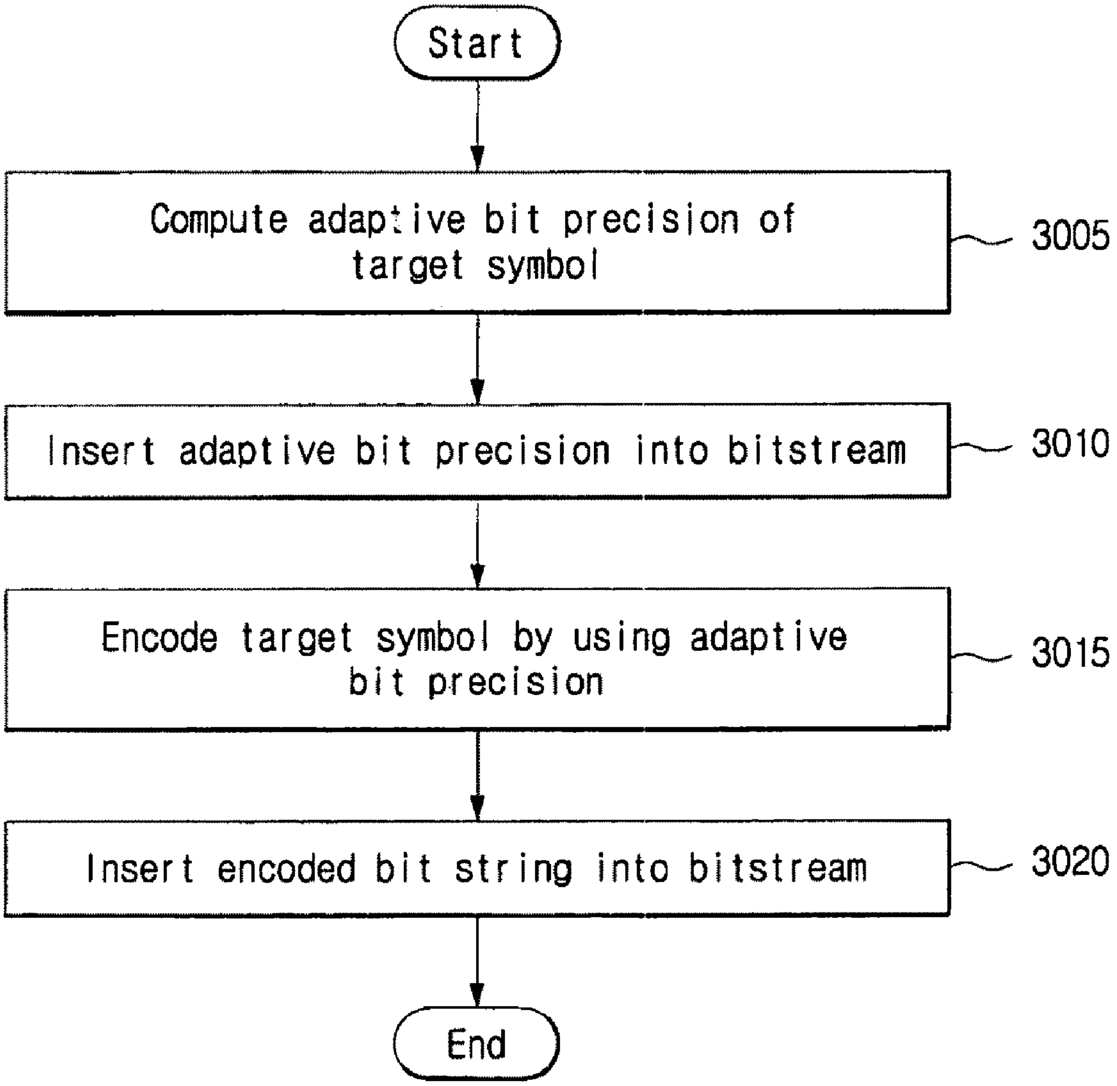
FIG. 30 is a flow chart showing an operation of encoding a symbol of a DCT field by using an adaptive bit precision in accordance with an embodiment of the present invention.

FIG. 30 is a flow chart showing an operation of encoding a symbol of a DCT field by using an adaptive bit precision in accordance with an embodiment of the present invention. Below described is a flow chart showing a detailed description related to an embodiment of the step represented by 2830 of FIG. 28. Although the operations to be described below are performed by each inner element of the encoding apparatus 2700, the inner elements are collectively referred to as the encoding apparatus 2700 for the convenience of understanding and description.

In a step represented by 3005, the encoding apparatus 2700 computes an adaptive bit precision of a target symbol. Here, the target symbol refers to the symbol that is currently being encoded among the symbols of a DCT field.

In a step represented by 3010, the encoding apparatus 2700 inserts the adaptive bit precision into a bitstream to correspond to the target symbol.

In a step represented by 3015, the encoding apparatus 2700 generates an adaptive bit string by encoding the target symbol by use of the adaptive bit precision.

In a step represented by 3020, the encoding apparatus 2700 inserts the generated adaptive bit string (i.e. the encoded target symbol) into the bitstream.

Even though the method of encoding symbols of one macroblock has been described above for clear description of the present invention, the encoding apparatus 2700 can repeatedly perform the steps represented by 3010 through 3020 until all symbols of a pertinent frame or VOP are encoded.

Figure 31:
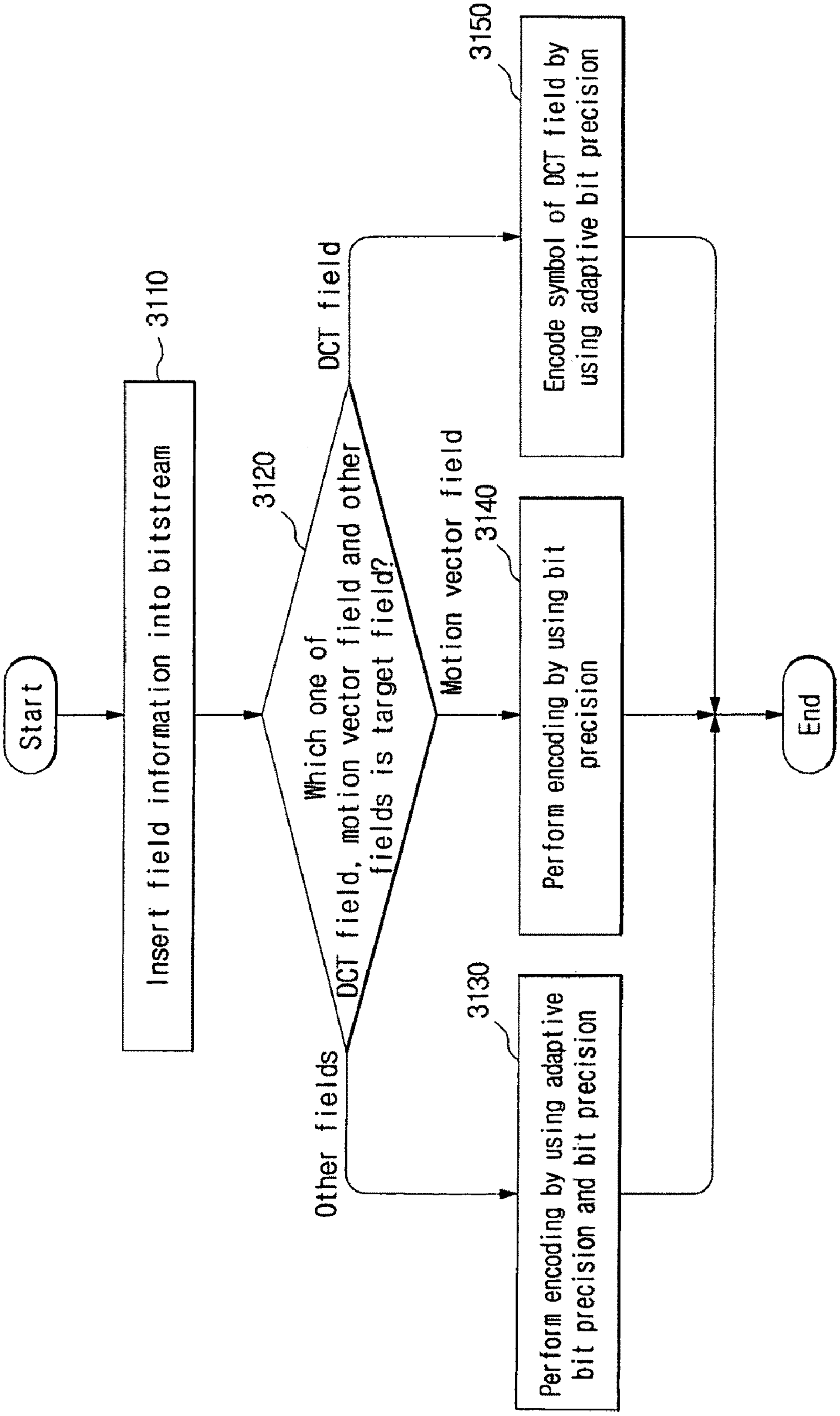
FIG. 31 is a flow chart showing how an encoding is performed per each field by using a bit precision and an adaptive bit precision in accordance with another embodiment of the present invention.

FIG. 31 is a flow chart showing how an encoding is performed per each field by using a bit precision and an adaptive bit precision in accordance with another embodiment of the present invention. Although the operations to be described below are performed by each inner element of the encoding apparatus 2700, the inner elements are collectively referred to as the encoding apparatus 2700 for the convenience of understanding and description.

In a step represented by 3110, the encoding apparatus 2700 inserts field information into a bitstream.

In particular, the encoding apparatus 2700 can extract the field information form input data before inserting the field information into a header of the bitstream. Accordingly, the field information can be extracted and used in the below operation of decoding each symbol.

In a step represented by 3120, the encoding apparatus 2700 recognizes which one of DCT, motion vector and other fields is the field (hereinafter, referred to as a “target field” for the convenience of understanding and description) that is currently being encoded by using the extracted field information. As described above, the field information can refer to the information indicating the kind (i.e. type) of the pertinent field.

In this description, the remainders except for the motion vector field and the DCT field are referred to as other fields for the convenience of understanding and description. For example, other fields can include mcbpc and cbpy fields.

If it is determined that the target field is one of other fields, in a step represented by 3130, the encoding apparatus 2700 computes an adaptive bit precision and a bit precision corresponding to the target field. The encoding apparatus 2700 can also encode symbols of the target field by using the computed adaptive bit precision and bit precision. Since the operation of encoding the symbols of the target field by using the adaptive bit precision and bit precision is identical to that of encoding the symbol of the target macroblock in FIG. 30, the overlapped description will be omitted.

However, if it is determined that the target field is the motion vector field, in a step represented by 3140, the encoding apparatus 2700 computes a bit precision of a symbol of the target field and decodes the symbol of the target field by using the computed bit precision. This is will be described below in more detail with reference to FIG. 32 through FIG. 34.

If the target field is the DCT field, in a step represented by 3150, the encoding apparatus 2700 computes an adaptive bit precision of the symbol of the target field. The encoding apparatus 2700 also encodes the symbol of the target field by using the computed adaptive bit precision. Since this is the same as described with reference to FIG. 30, the overlapped description will be omitted.

Figure 32:
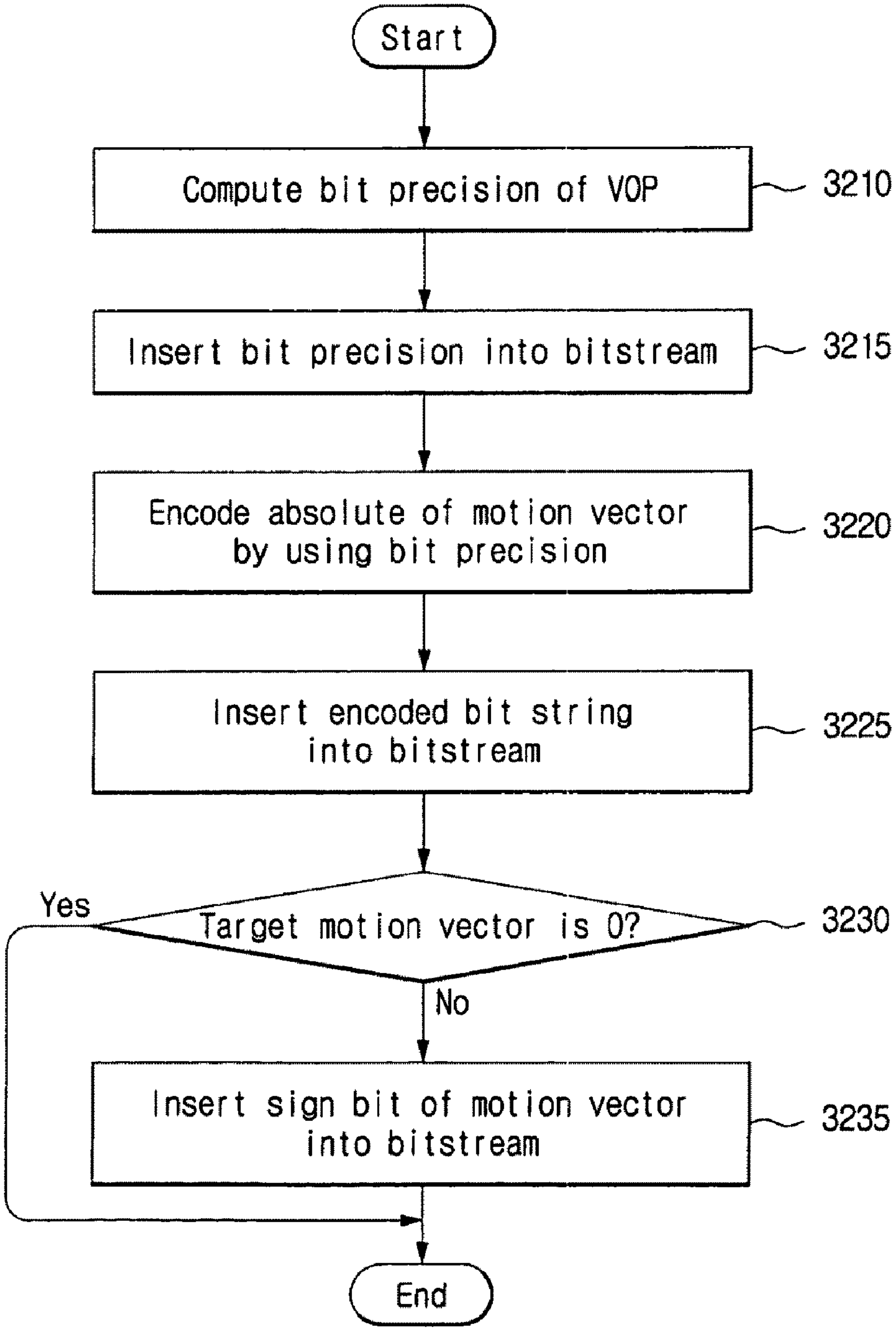
FIG. 32 is a flow chart showing an operation of encoding a field of a motion vector by using a bit precision in accordance with an embodiment of the present invention.

FIG. 32 is a flow chart showing an operation of encoding a field of a motion vector by using a bit precision in accordance with an embodiment of the present invention. This is a flow chart showing a detailed description related to an embodiment of the step represented by 3140 of FIG. 31. Although the operations to be described below are performed by each inner element of the encoding apparatus 2700, the inner elements are collectively referred to as the encoding apparatus 2700 for the convenience of understanding and description.

In a step represented by 3210, the encoding apparatus 2700 computes a bit precision of a target VOP of an X-axis motion vector (hereinafter, referred to as "MV-X" for the convenience of understanding and description) field or a Y-axis axis motion vector (hereinafter, referred to as "MV-X" for the convenience of understanding and description) field. For example, the encoding apparatus 2700 can compute a bit precision by using a symbol (i.e. a motion vector) that pertains to a pertinent target VOP.

In a step represented by 3215, the encoding apparatus 2700 inserts the computed bit precision into a bitstream.

In a step represented by 3220, the encoding apparatus 2700 encodes a absolute value of a motion vector (hereinafter, referred to as a "target motion vector") that is currently being encoded by using the computed bit precision.

In a step represented by 3225, the encoding apparatus 2700 insets the encoded absolute value into the bitstream.

In a step represented by 3230, the encoding apparatus 2700 checks whether the target motion vector is "0."

If the target motion vector is "0," the encoding apparatus 2700 ends the encoding of the target motion vector.

However, if the target motion vector is not "0," the encoding apparatus 2700 a bit value of a sign bit of the target motion vector into the bitstream.

Even though the method of encoding symbols of one macroblock has been described above for clear description of the present invention, the encoding apparatus 2700 can repeatedly perform the steps represented by 3210 through 3235 until all symbols of a pertinent frame or VOP are encoded.

Figure 33:
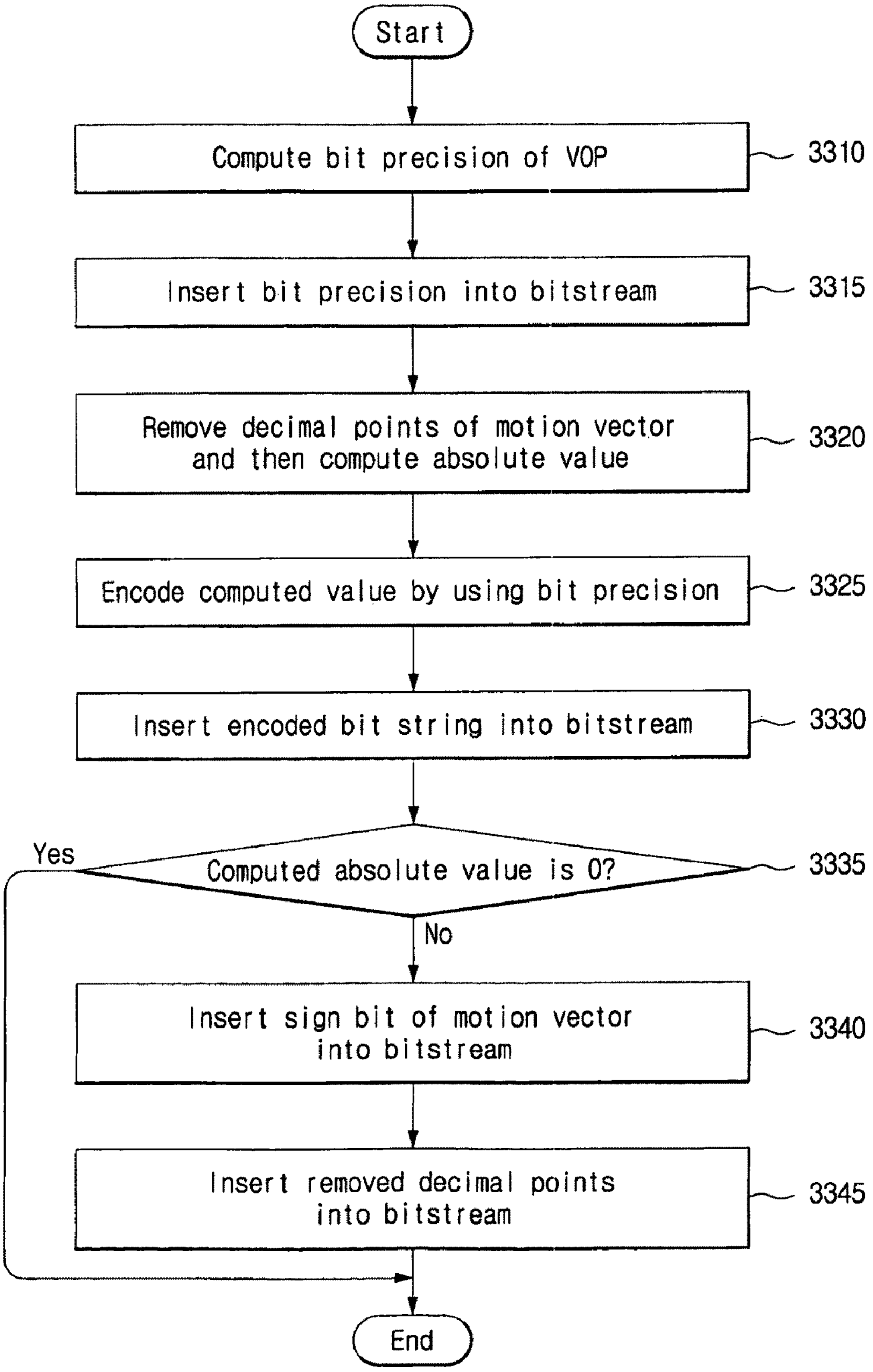
FIG. 33 is a flow chart showing an operation of encoding a field of a motion vector by using a bit precision in accordance with another embodiment of the present invention.

FIG. 33 is a flow chart showing an operation of encoding a field of a motion vector by using a bit precision in accordance with another embodiment of the present invention. This is a flow chart showing a detailed description related to another embodiment of the step represented by 3140 of FIG. 31. Although the operations to be described below are performed by each inner element of the encoding apparatus 2700, the inner elements are collectively referred to as the encoding apparatus 2700 for the convenience of understanding and description.

In a step represented by 3310, the encoding apparatus 2700 computes a bit precision of a target VOP of a motion vector (e.g. MV-X or MV-Y) field. At this time, the bit precision is computed by using an index of the Huffman table of each field or a value excluding a sign (i.e. motion vector) of VOP and decimal points.

In a step represented by 3315, the encoding apparatus 2700 inserts the computed bit precision into a bitstream.

In a step represented by 3320, the encoding apparatus 2700 computes an absolute value by removing decimal points of the target symbol (i.e. the target motion vector).

In a step represented by 3325, the encoding apparatus 2700 encodes the computed absolute value by using the computed bit precision.

In a step represented by 3330, the encoding apparatus 2700 inserts the encoded absolute value into the bitstream.

In a step represented by 3335, the encoding apparatus 2700 checks whether the computed absolute value is 0.

If the computed absolute value is 0, since this means that there is no sign and no decimal points corresponding to the target symbol, the encoding apparatus 2700 ends the encoding of the symbol.

However, if the computed absolute value is not 0, in a step represented by 3340, the encoding apparatus 2700 inserts the sign bit of the target symbol into the bitstream. Here, the sign bit refers to the bit value indicating a sign of the target symbol. For example, if the target symbol is positive, the sign bit has the value of 0, and if the target symbol is negative, the sign bit has the value of 1.

In a step represented by 3345, the encoding apparatus 2700 inserts a value of domical places removed corresponding to the target symbol (i.e. the target motion vector) into the bitstream.

Even though the method of encoding symbols of one macroblock has been described above for clear description of the present invention, the encoding apparatus 2700 can repeatedly perform the steps represented by 3310 through 3345 until all symbols of a pertinent frame or VOP are encoded.

Figure 34:
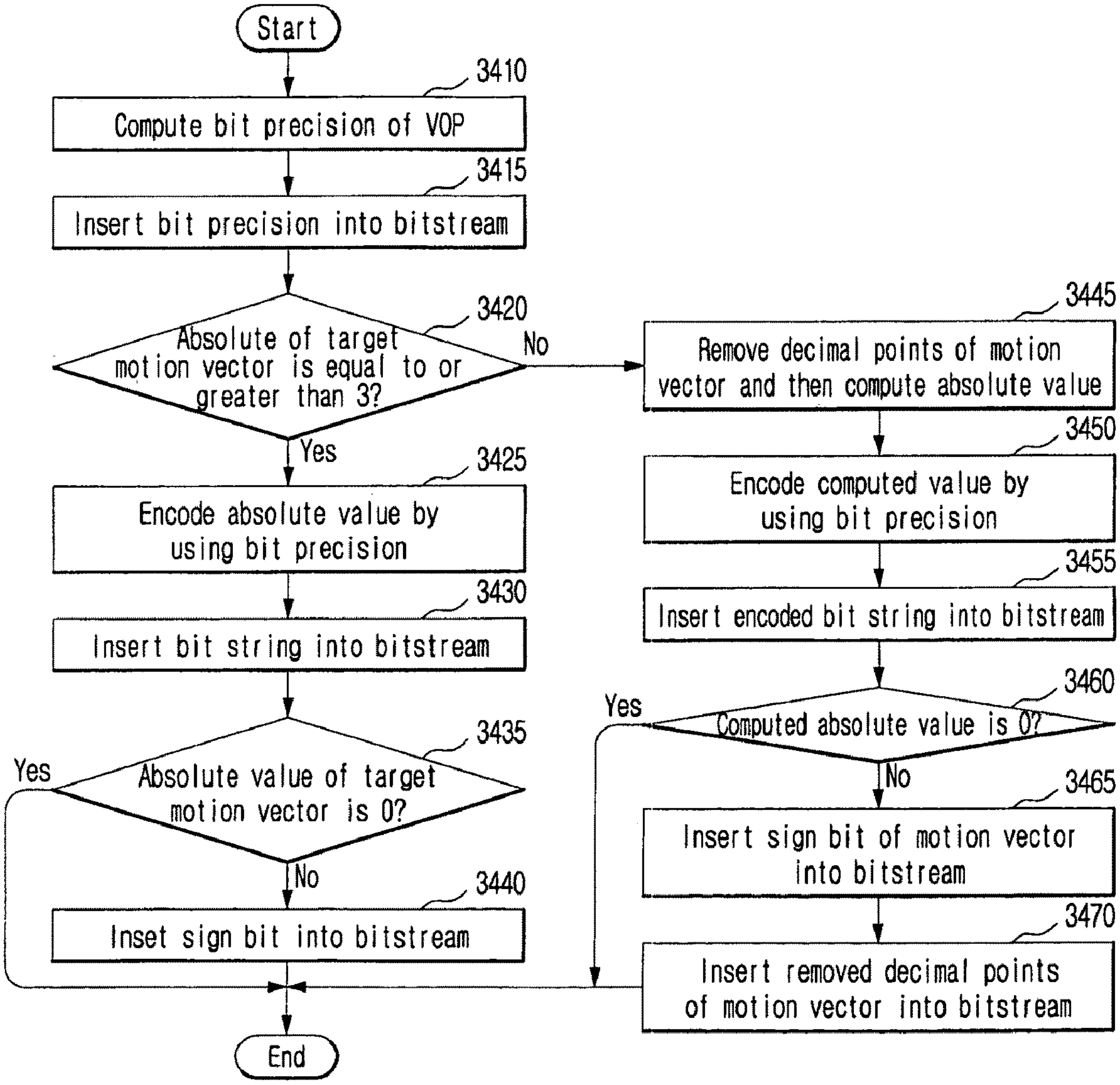
FIG. 34 is a flow chart showing an operation of encoding a field of a motion vector by using a bit precision in accordance with another embodiment of the present invention.

FIG. 34 is a flow chart showing an operation of encoding a field of a motion vector by using a bit precision in accordance with another embodiment of the present invention. This is a flow chart showing a detailed description related to another embodiment of the step represented by 3140 of FIG. 31. Although the operations to be described below are performed by each inner element of the encoding apparatus 2700, the inner elements are collectively referred to as the encoding apparatus 2700 for the convenience of understanding and description.

In a step represented by 3410, the encoding apparatus 2700 computes a bit precision of a target VOP of a motion vector (e.g. MV-X or MV-Y) field. At this time, the bit precision is computed by using an index of the Huffman table of each field or a value excluding a sign (i.e. motion vector) of VOP and decimal points.

In a step represented by 3415, the encoding apparatus 2700 inserts the computed bit precision into a bitstream.

In a step represented by 3420, the encoding apparatus 2700 computes an absolute value of the target motion vector and then checks whether the absolute value of the target motion vector is equal to or smaller than a threshold value (e.g. "3").

If the target motion vector is equal to or smaller than a threshold value (e.g. "3"), in a step represented by 3425, the encoding apparatus 2700 encodes the absolute value of the target motion vector by using the computed bit precision.

In a step represented by 3430, the encoding apparatus 2700 inserts the decoded bit string (i.e. the encoded absolute value) into the bitstream.

In a step represented by 3435, the encoding apparatus 2700 checks whether the absolute value of the target motion vector is "0."

If the absolute value of the target motion vector is "0," the encoding apparatus 2700 recognizes that the target motion vector includes no sign and no decimal points and ends the encoding of the target motion vector.

However, if the absolute value of the target motion vector is not "0," in a step represented by 3440, the encoding apparatus 2700 inserts a sign bit of the target motion vector into the bitstream. Here, the sign bit refers to the bit value indicating a sign of the target motion vector.

As the result of checking it in the step represented by 3420, if the absolute value of the target motion vector is larger than a threshold value (e.g. "3"), in a step represented by 3345, the encoding apparatus 2700 removes decimal points of the target motion vector and then re-computes the absolute value without a sign and decimal points.

In a step represented by 3450, the encoding apparatus 2700 encodes the computed absolute value by using the bit precision.

In a step represented by 3455, the encoding apparatus 2700 inserts the encoded bit string (i.e. the absolute value computed by removing the decimal plates) into the bitstream.

In a step represented by 3460, the encoding apparatus 2700 checks whether the absolute value computed corresponding to the target motion vector is "0."

If the computed absolute value is "0," the encoding apparatus 2700 recognizes that the target motion vector includes no sign and no decimal points and ends the encoding of the target motion vector If the computed absolute value is not "0," in a step represented by 3465, the encoding apparatus 2700 inserts the sign bit of the target motion vector into the bitstream.

In a step represented by 3470, the encoding apparatus 2700 inserts a value of domical places of the target motion vector into the bitstream.

Even though the method of encoding symbols of one macroblock has been described above for clear description of the present invention, the encoding apparatus 2700 can repeatedly perform the steps represented by 3410 through 3470 until all symbols of a pertinent frame or VOP are encoded.

Figure 35:
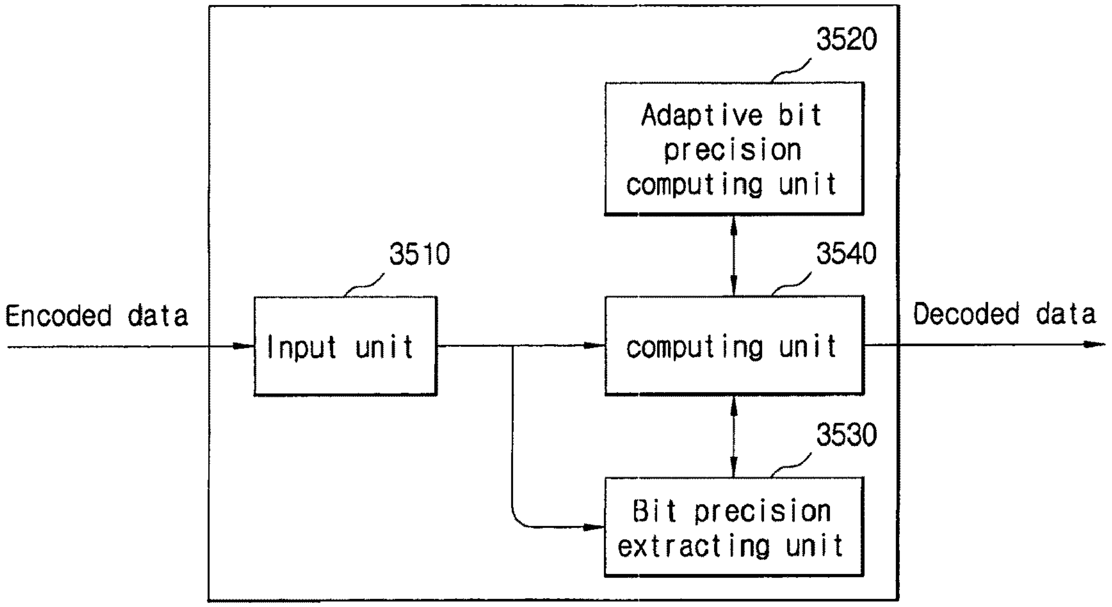
FIG. 35 is a block diagram showing a decoding apparatus using a bit precision in accordance with an embodiment of the present invention.

FIG. 35 is a block diagram showing a decoding apparatus using a bit precision in accordance with an embodiment of the present invention.

Referring to FIG. 35, the decoding apparatus 3500 using a bit precision in accordance with an embodiment of the present invention includes input unit 3510, an adaptive bit precision computing unit 3520, a bit precision extracting unit 3530 and a decoding unit 3540.

The input unit 3510 receives an encoded bitstream and extracts field information and data encoded per each field in a predetermined form in order to output them to the bit precision extracting unit 3530 and the decoding unit 3540.

The adaptive bit precision computing unit 3520 computes an adaptive bit precision and an adaptive bit string corresponding to a certain field according to a request signal. Then, the adaptive bit precision computing unit 3520 computes a symbol corresponding to the computed adaptive bit precision and adaptive bit string and outputs them to the decoding unit 3540. Since the method of computing the adaptive bit precision and the adaptive bit string has been described above by using the following table 2, the overlapped description will be omitted. Of course, the adaptive bit precision computing unit 3520 can extract an adaptive bit precision from the bitstream.

On the other hand, if the adaptive bit precision, the adaptive bit string and a symbol are pre-stored. The adaptive bit precision computing unit 3520 can extract the adaptive bit precision, the adaptive bit string and the symbol and output them to the decoding unit 3540. Of course, if the adaptive bit precision, the adaptive bit string and the symbol are stored in the decoding unit 3540, the adaptive bit precision computing unit 3520 can be omitted in the decoding apparatus 3500.

The adaptive bit precision computing unit 3530 extracts a bit precision from the received encoded bitstream and outputs the extracted bit precision to decoding unit 3540. The adaptive bit precision computing unit 3530 also computes a bit precision by using the received encoded bitstream.

For example, a bit precision of an upper macroblock and a bit precision of a left macroblock which are most adjacent to a target macroblock are computed through the received encoded bitstream. Since the method of computing a bit precision has described above by using the table 1, the pertinent description will be omitted.

The decoding unit 3540 decodes an encoded bitstream inputted from the input unit 3510 by using the adaptive bit precision and the bit precision. The decoding unit 3540 can decode a bitstream that is differently encoded according to field information inputted from the input unit 3510. This will be described below in detail with reference to the related drawings.

Figure 36:
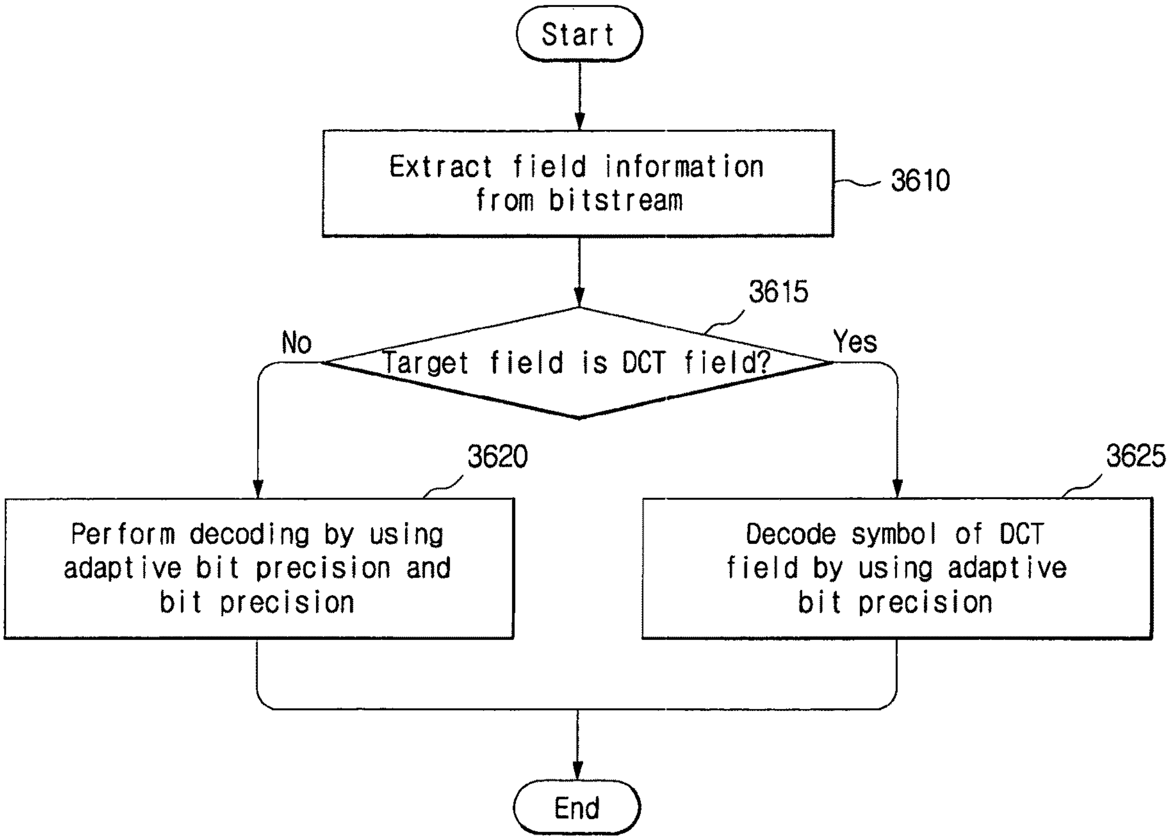
FIG. 36 is a flow chart showing how a decoding is performed per each field by using a bit precision and an adaptive bit precision in accordance with an embodiment of the present invention.

FIG. 36 is a flow chart showing how a decoding is performed per each field by using a bit precision and an adaptive bit precision in accordance with an embodiment of the present invention. Below described is the method of decoding a bitstream encoded according to the encoding method of FIG. 28. Although the operations to be described below are performed by each inner element of the decoding apparatus 3500, the inner elements are collectively referred to as the decoding apparatus 3500 for the convenience of understanding and description.

In a step represented by 3610, the decoding apparatus 3500 extracts field information from an inputted encoded bitstream.

In a step represented by 3615, the decoding apparatus 3500 checks whether a field (hereinafter, referred to as a "target field" for the convenience of understanding and description) to be decoded is a DCT field.

In this description, other fields except for the DCT field are referred to as other fields. Other fields can include a mcbpc, cbpy or motion vector field.

If the target field is not the DCT field, in a step represented by 3620, the decoding apparatus 3500 performs the decoding operation corresponding to the target field by using a adaptive bit precision and a prediction bit. This will be described below in detail with reference to the related drawings.

However, if the target field is the DCT field, in a step represented by 3625, the decoding apparatus 3500 decodes a bitstream encoded corresponding to the target field as a symbol by using the adaptive bit precision.

Figure 37:
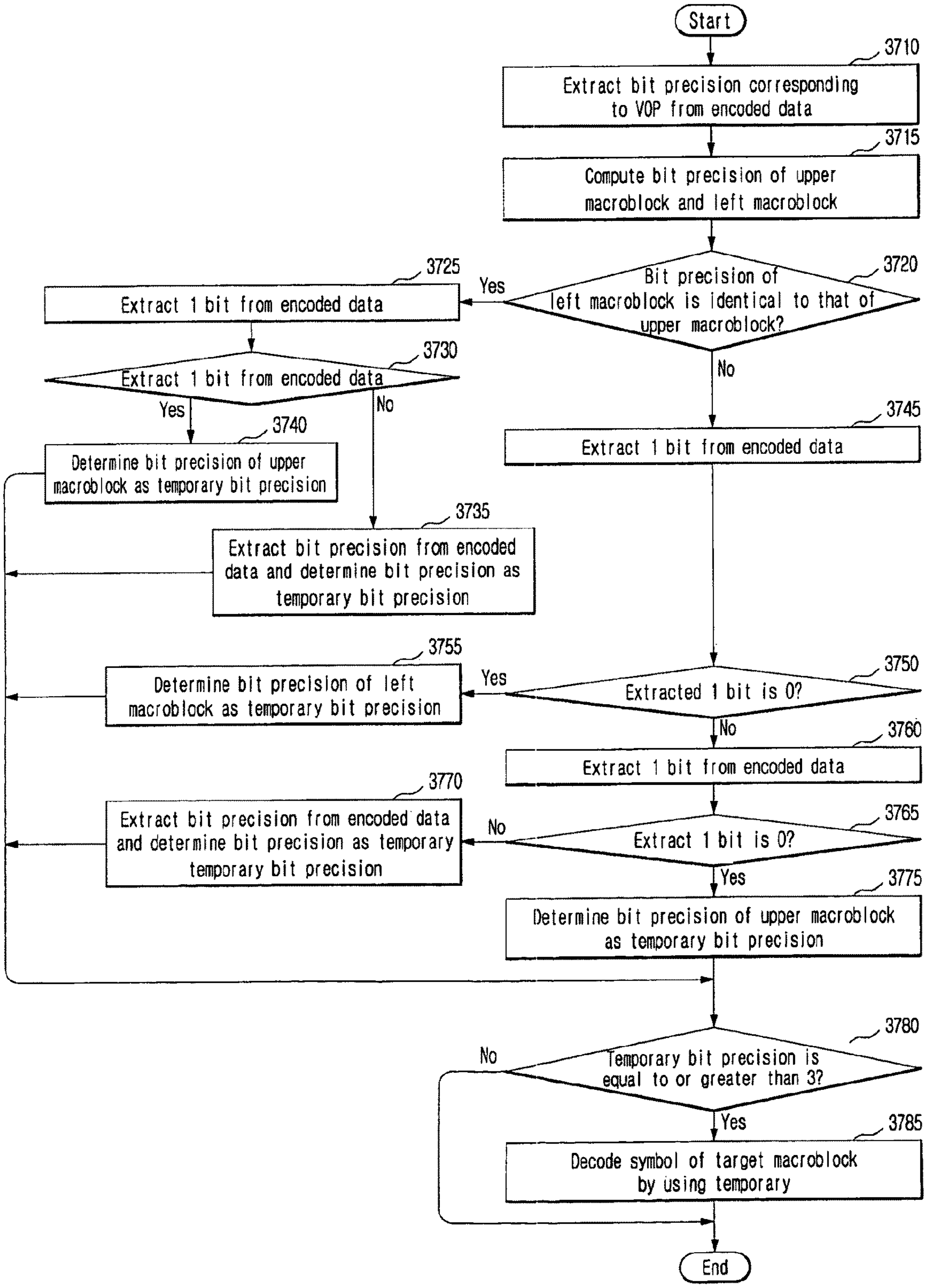
FIG. 37 is a flow chart showing how a decoding is performed by using a bit precision and an adaptive bit precision in accordance with an embodiment of the present invention.

FIG. 37 is a flow chart showing how a decoding is performed by using a bit precision and an adaptive bit precision in accordance with an embodiment of the present invention. This is a flow chart showing a detailed description related to an embodiment of the step represented by 3620 of FIG. 36. In particular, FIG. 37 is a flow chart showing the method of encoding the bitstream by the already-mentioned method in FIG. 29. Although the operations to be described below are performed by each inner element of the decoding apparatus 3500, the inner elements are collectively referred to as the decoding apparatus 3500 for the convenience of understanding and description.

In a step represented by 3710, the decoding apparatus 3500 extracts a bit precision corresponding to a VOP from an inputted encoded bitstream.

In a step represented by 3715, the decoding apparatus 3500 computes a bit precision of an upper macroblock and a bit precision of a left macroblock.

In a step represented by 3720, the decoding apparatus 3500 checks whether the computed bit precision of the left macroblock is identical to the computed bit precision of the upper macroblock.

If the computed bit precision of the left macroblock is identical to the computed bit precision of the upper macroblock, in a step represented by 3725, the decoding apparatus 3500 extracts 1 bit from the encoded bitstream.

In a step represented by 3610, the decoding apparatus 3500 checks whether the extracted 1 bit has a fifth bit value (e.g. “1”).

If the extracted 1 bit has the fifth bit value, in a step represented by 3735, the decoding apparatus 3500 extracts the bit precision from the encoded bitstream and determines the computed bit precision as a temporary bit precision. As described above, the temporary bit precision is another term which refers to an adaptive bit precision. Accordingly, the temporary bit precision must be analyzed or understood as the adaptive bit precision.

If the extracted 1 bit does not have the fifth bit value, in a step represented by 3740, the decoding apparatus 3500 determines the computed bit precision of the upper macroblock as the temporary bit precision As the result of checking it in the step represented by 3720, if the computed bit precision of the left macroblock is not identical to the computed bit precision of the upper macroblock, in a step represented by 3745, the decoding apparatus 3500 extracts 1 bit from the encoded bitstream.

In a step represented by 3750, the decoding apparatus 3500 checks whether the extracted 1 bit has a sixth bit value (e.g. “0”).

If the extracted 1 bit has the sixth bit value, in a step represented by 3755, the decoding apparatus 3500 determines the bit precision of the left macroblock as the temporary bit precision.

If the extracted 1 bit does not have the sixth bit value, in a step represented by 3760, the decoding apparatus 3500 extracts 1 bit from the encoded bitstream.

In a step represented by 3765, the decoding apparatus 3500 checks whether the extracted 1 bit has a seventh bit value (e.g. “0”).

If the extracted 1 bit does not have the seventh bit value, in a step represented by 3770, the decoding apparatus 3500 extracts a bit precision from the encoded bitstream and determines the extracted bit precision as the temporary bit precision.

If the extracted 1 bit has the seventh bit value, in a step represented by 3775, the decoding apparatus 3500 determines the bit precision of the upper macroblock as the temporary bit precision.

In a step represented by 3610, the decoding apparatus 3500 checks whether a value of the temporary bit precision is equal to or larger than a threshold value (e.g. “3”).

If the value of the temporary bit precision is equal to or larger than the threshold value, in a step represented by 3785, the decoding apparatus 3500 decodes a symbol of the target macroblock by using the temporary bit precision.

For example, the decoding apparatus 3500 can compute an adaptive bit string corresponding to the same adaptive bit precision as the temporary bit precision. The decoding apparatus 3500 can also decode the pertinent bit string as the symbol corresponding to the computed adaptive bit string.

However, if the value of the temporary bit precision is smaller than the threshold value, the decoding apparatus 3500 ends the decoding operation of the pertinent macroblock.

Even though the method of decoding symbols of one macroblock has been described above for clear description of the present invention, the decoding apparatus 3500 can repeatedly perform the steps represented by 3710 through 3780 until all symbols of a pertinent frame or VOP are decoded. The decoding operation in accordance with an embodiment of the present invention is to decode a bitstream, a mcbpc, cbpy, MV-x, or MV-y field being encoded in the adequate form for the decoding as the bitstream. In accordance with an embodiment of the present invention, the symbol of the DCT field can improve its compression efficiency through an additional encoding operation. Accordingly, it is also required to decode the symbol of the DCT field. Below described is the encoding operation the symbol of the DCT field.

Figure 38:
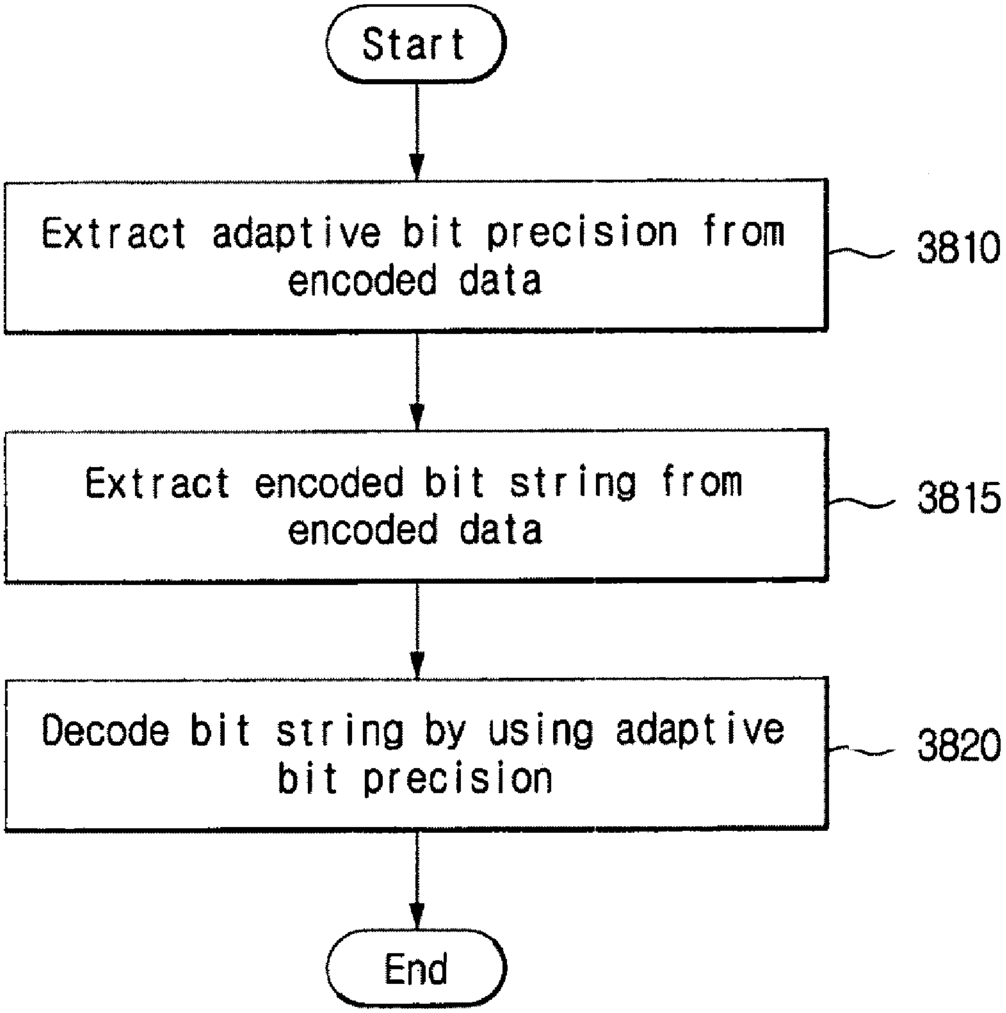
FIG. 38 is a flow chart showing an operation of decoding a symbol of a DCT field by using an adaptive bit precision in accordance with an embodiment of the present invention.

FIG. 38 is a flow chart showing an operation of decoding a symbol of a DCT field by using an adaptive bit precision in accordance with an embodiment of the present invention. This is a flow chart showing a detailed description related to an embodiment of the step represented by 3625 of FIG. 36. In particular, FIG. 38 is a flow chart showing the method of encoding the bitstream by the already-mentioned method in FIG. 30. Although the operations to be described below are performed by each inner element of the decoding apparatus 3500, the inner elements are collectively referred to as the decoding apparatus 3500 for the convenience of understanding and description.

In a step represented by 3810, the decoding apparatus 3500 extracts an adaptive bit precision from an inputted encoded bitstream.

In a step represented by 3815, the decoding apparatus 3500 extracts an encoded bit string (i.e. adaptive bit string) from the encoded bitstream.

In a step represented by 3820, the decoding apparatus 3500 decodes the adaptive bit string by using the adaptive bit precision.

Even though the method of encoding symbols of one macroblock has been described above for clear description of the present invention, the decoding apparatus 3500 can repeatedly perform the steps represented by 3810 through 3820 until all symbols of a pertinent frame or VOP are decoded.

Figure 39:
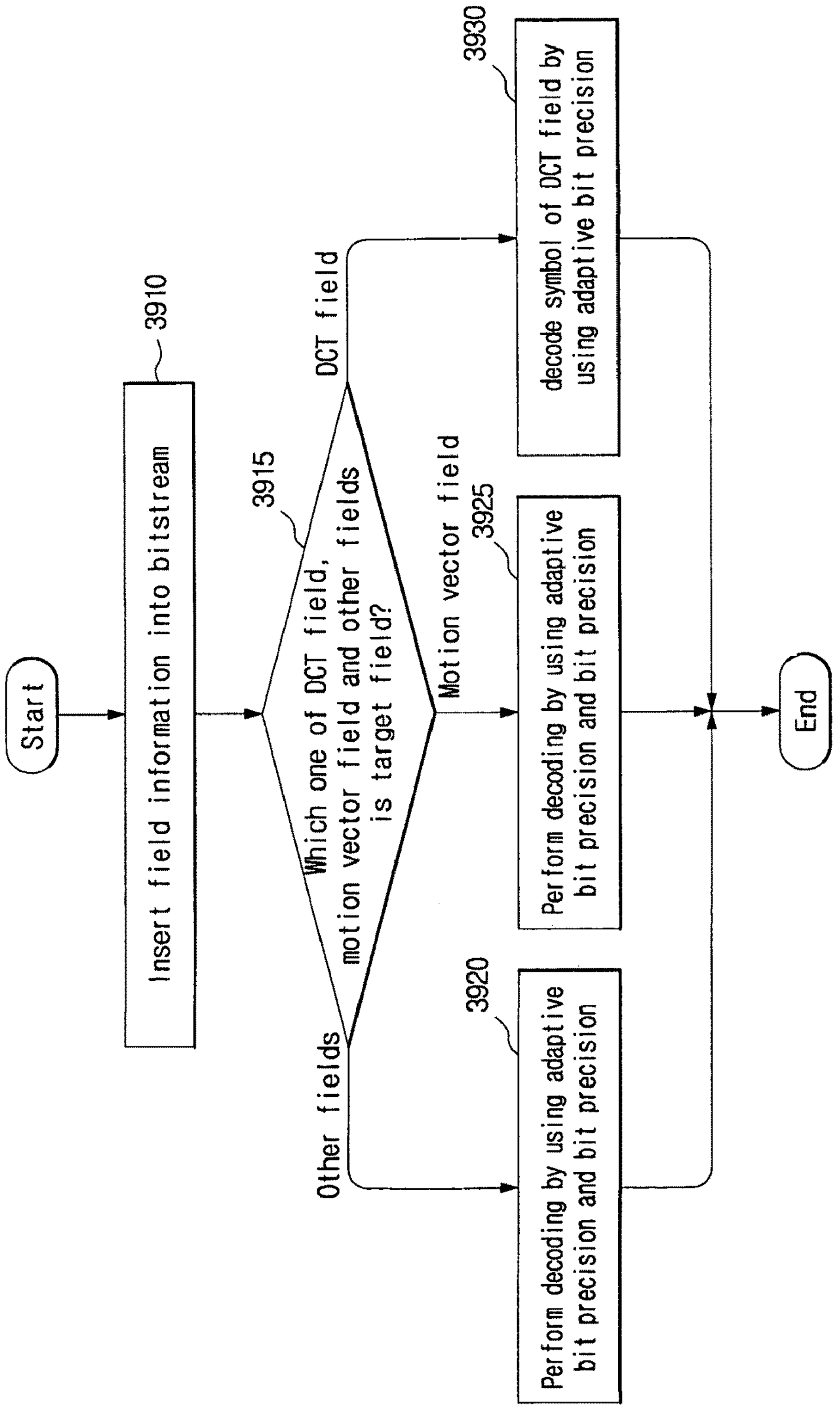
FIG. 39 is a flow chart showing how a decoding is performed per each field by using a bit precision and an adaptive bit precision in accordance with another embodiment of the present invention.

FIG. 39 is a flow chart showing how a decoding is performed per each field by using a bit precision and an adaptive bit precision in accordance with another embodiment of the present invention. Although the operations to be described below are performed by each inner element of the decoding apparatus 3500, the inner elements are collectively referred to as the decoding apparatus 3500 for the convenience of understanding and description.

In a step represented by 3910, the decoding apparatus 3500 extracts field information from an inputted encoded bitstream. As described above, the field information indicates the kind (i.e. type) of fields of the input data.

In a step represented by 3915, the decoding apparatus 3500 recognizes which one of DCT, motion vector and other fields is the field (hereinafter, referred to as a "target field" for the convenience of understanding and description) that is currently being decoded by using the extracted field information.

Other fields include the remainders except for the motion vector field and the DCT field. For example, other fields can include mcbpc and cbpy fields.

If the target field is one of other fields, in a step represented by 3920, the decoding apparatus 3500 extracts an adaptive bit precision and a bit precision from the encoded bitstream. Then, the decoding apparatus 3500 extracts and decodes an encoded string corresponding to the target field by using the pertinent adaptive bit precision and bit precision. Since this decoding operation is the same as described above with reference to FIG. 37, the overlapped description will be omitted.

However, if the target field is the motion vector field, in a step represented by 3925, the decoding apparatus 3500 extracts a bit precision corresponding to the target field and decodes a bit string corresponding to the target field by using the extracted bit precision.

If the target field is the DCT field, in a step represented by 3930, the decoding apparatus 3500 extracts am adaptive bit precision corresponding to the target field and decodes an encoded bit string corresponding to the target field by using the extracted adaptive bit precision. Since the operation of decoding encoded data as a symbol of the DCT field by using the adaptive bit precision is the same as the decoding operation described with reference to FIG. 38, the pertinent detailed description will be omitted.

Figure 40:
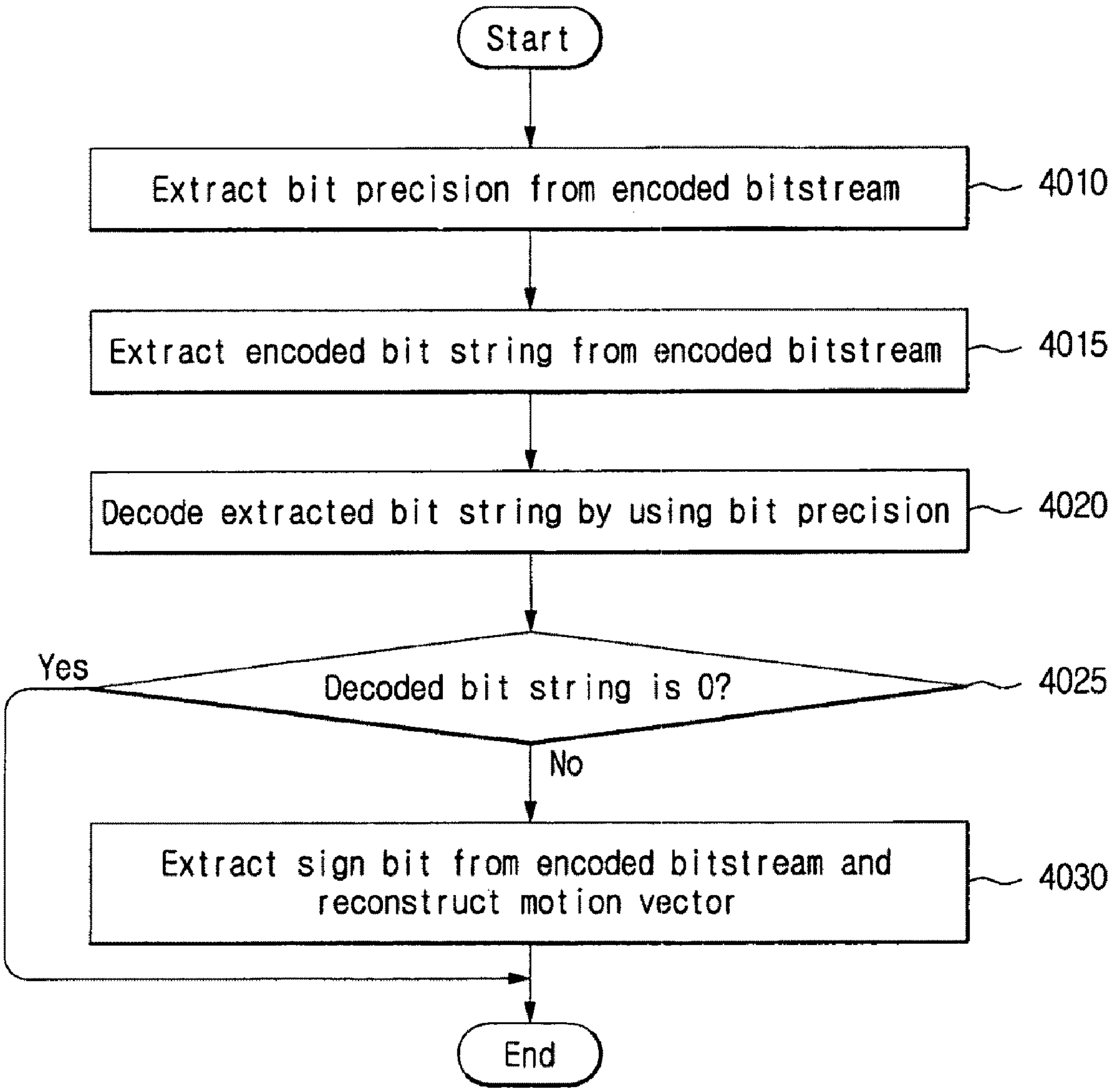
FIG. 40 is a flow chart showing an operation of decoding encoded data as a symbol of a motion vector field by using a bit precision in accordance with an embodiment of the present invention.

FIG. 40 is a flow chart showing an operation of decoding encoded data as a symbol of a motion vector field by using a bit precision in accordance with an embodiment of the present invention. This is a flow chart showing a detailed description related to an embodiment of the step represented by 3925 of FIG. 39. In particular, FIG. 40 is a flow chart showing the method of encoding the bitstream by the already-mentioned method in FIG. 32. Although the operations to be described below are performed by each inner element of the decoding apparatus 3500, the inner elements are collectively referred to as the decoding apparatus 3500 for the convenience of understanding and description.

In a step represented by 4010, the decoding apparatus 3500 extracts a bit precision from an inputted encoded bitstream.

In a step represented by 4015, the decoding apparatus 3500 extracts an encoded bit string corresponding to the extracted bit precision from the encoded bitstream.

In a step represented by 4020, the decoding apparatus 3500 decodes the extracted bit string by using the extracted bit precision. Here, the decoded bit string can be a symbol (i.e. an absolute value of a motion vector).

In a step represented by 4025, the decoding apparatus 3500 checks whether the decoded bit string is "0."

If the decoded bit string is "0," the decoding apparatus 3500 ends the decoding operation of the pertinent bit string.

However, if the decoded bit string is not "0," in a step represented by 4030, the decoding apparatus 3500 extracts a sign bit from the encoded bitstream and decodes a final symbol (i.e. a motion vector) by attaching the sign bit to the decoded string.

Even though the method of encoding symbols of one macroblock has been described above for clear description of the present invention, the decoding apparatus 3500 can repeatedly perform the steps represented by 4010 through 4030 until all symbols of a pertinent frame or VOP are decoded.

Figure 41:
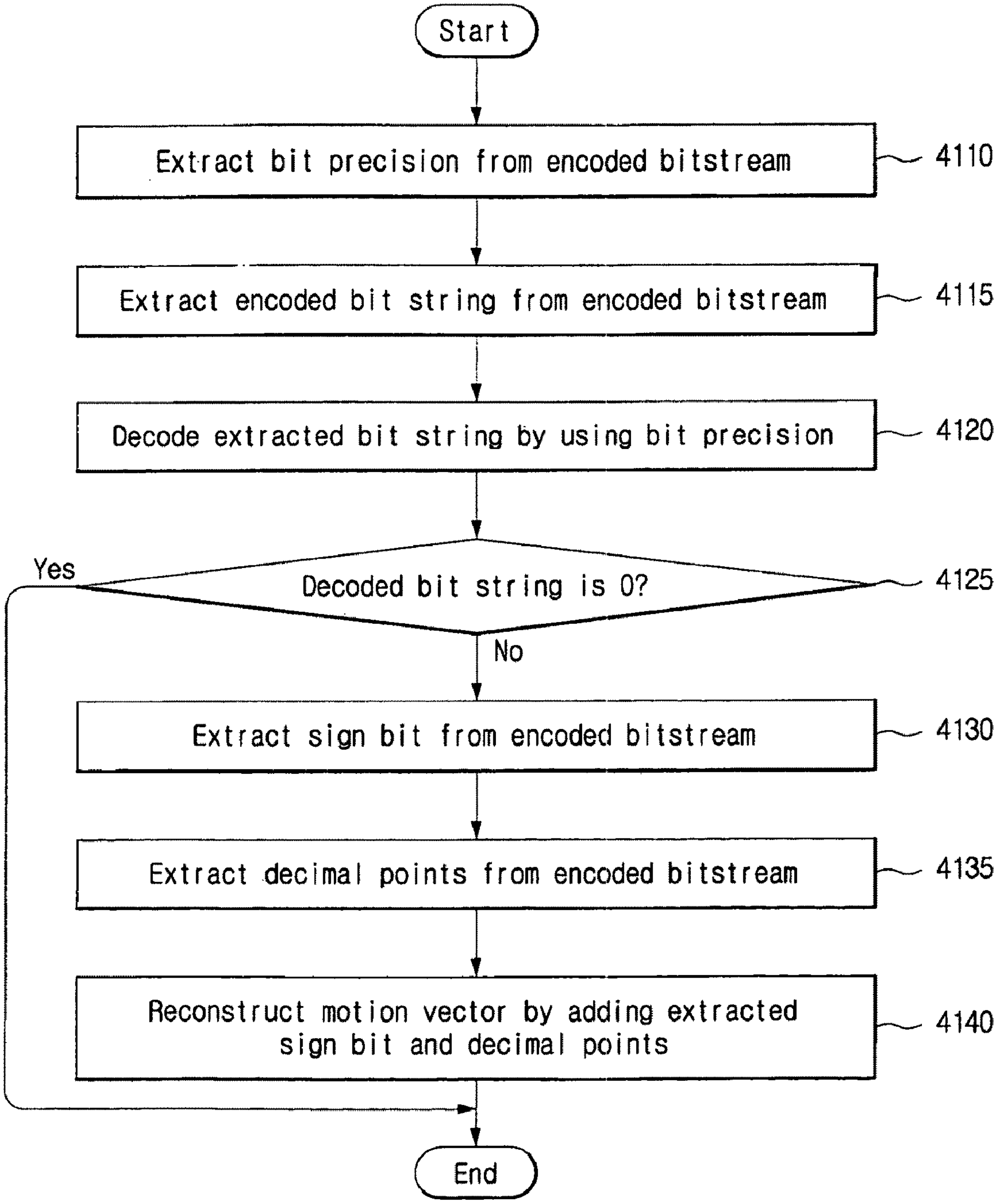
FIG. 41 is a flow chart showing an operation of decoding an encoded bitstream by using bit precision in accordance with another embodiment of the present invention.

FIG. 41 is a flow chart showing an operation of decoding an encoded bitstream by using bit precision in accordance with another embodiment of the present invention. This is a flow chart showing a detailed description related to another embodiment of the step represented by 3925 of FIG. 39. In particular, FIG. 41 is a flow chart showing the method of encoding the bitstream by the already-mentioned method in FIG. 33. Although the operations to be described below are performed by each inner element of the decoding apparatus 3500, the inner elements are collectively referred to as the decoding apparatus 3500 for the convenience of understanding and description. Hereinafter, it is assumed that symbols included in one macroblock are decoded.

In a step represented by 4110, the decoding apparatus 3500 extracts a bit precision from an encoded bitstream.

In a step represented by 4115, the decoding apparatus 3500 extracts an encoded bit string from the encoded bitstream.

In a step represented by 4120, the decoding apparatus 3500 decodes the bit string extracted by using the extracted bit precision. Here, the decoded bit string can refer to an absolute value of the motion vector removed with decimal points.

In a step represented by 4125, the decoding apparatus 3500 checks whether the decoded bit string is "0"

If the decoded bit string is "0," the decoding apparatus 3500 ends the decoding operation by determining the decoded bit string as a symbol (i.e. motion vector). For example, if the decoded bit string is "0," the decoding apparatus 3500 can recognize that the motion vector does not include a sign and the decimal points and end the decoding operation by outputting the decoded bit string as the symbol (i.e. motion vector).

However, if the decoded bit string is not "0,"in a step represented by 4130, the decoding apparatus 3500 extracts a sign bit from the encoded bitstream.

In a step represented by 4135, the decoding apparatus 3500 extracts a bit string below the decimal points from the encoded bit string.

In a step represented by 4140, the decoding apparatus 3500 reconstructs the symbol (i.e. motion vector) by adding the bit string below the decimal points to the decoded bit string and adding a sign corresponding to the sign bit.

Even though the method of encoding symbols of one macroblock has been described above for clear description of the present invention, the decoding apparatus 3500 can repeatedly perform the steps represented by 4110 through 4140 until all symbols of a pertinent frame or VOP are decoded.

Figure 42:
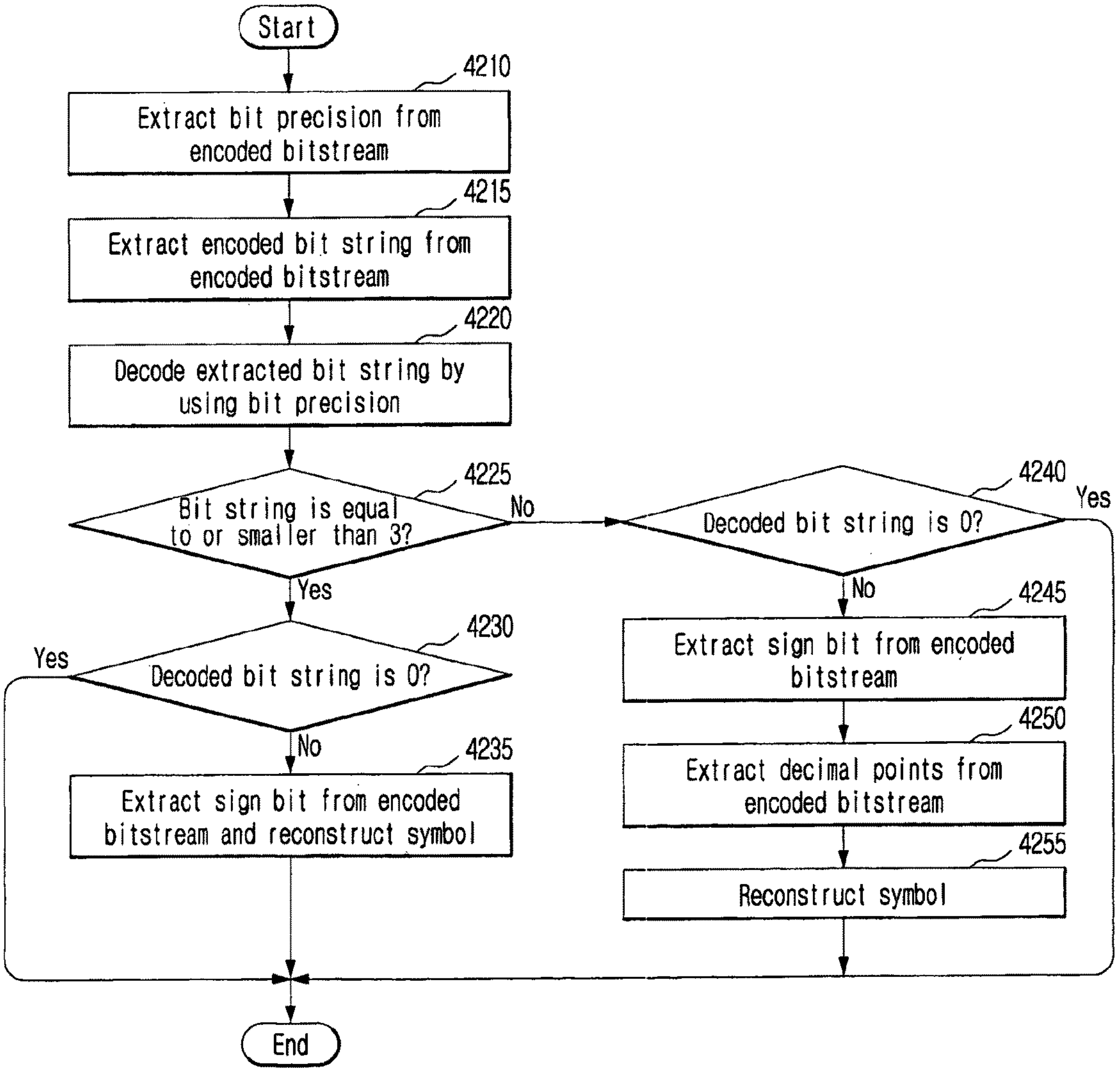
FIG. 42 is a flow chart showing an operation of decoding an encoded bitstream as a symbol by using bit precision in accordance with another embodiment of the present invention.

FIG. 42 is a flow chart showing an operation of decoding an encoded bitstream by using bit precision in accordance with another embodiment of the present invention. This is a flow chart showing a detailed description related to another embodiment of the step represented by 3925 of FIG. 39. In particular, FIG. 42 is a flow chart showing the method of encoding the bitstream by the already-mentioned method in FIG. 34. Although the operations to be described below are performed by each inner element of the decoding apparatus 3500, the inner elements are collectively referred to as the decoding apparatus 3500 for the convenience of understanding and description.

In a step represented by 4210, the decoding apparatus 3500 extracts a bit precision from an encoded bitstream.

In a step represented by 4215, the decoding apparatus 3500 extracts an encoded bit string from the encoded bitstream.

In a step represented by 4220, the decoding apparatus 3500 decodes the bit string extracted by using the extracted bit precision. Here, the decoded bit string can refer to an absolute value of the motion vector removed with decimal points.

In a step represented by 4225, the decoding apparatus 3500 checks whether the value of the decoded bit string is equal to or smaller than "3."

If the value of the decoded bit string is equal to or smaller than "3," in a step represented by 4230, the decoding apparatus 3500 checks whether the decoded bit string has the value of "0."

If the decoded bit string has the value of "0," the decoding apparatus 3500 determines that the decoded bit string is the motion vector including no sign and no decimal point and ends the decoding operation of the decoded bit string by outputting the decoded bit string as the symbol (i.e. motion vector).

However, if the decoded bit string does not have the value of "0," in a step represented by 4235, the decoding apparatus 3500 extracts a sign bit from the encoded bitstream. Then, the decoding apparatus 3500 reconstructs the symbol (i.e. motion vector) by adding the extracted sign bit to the decoded bit string.

As the result of checking it in the step represented by 4225, if the value of the decoded bit string is larger than "3," in a step represented by 4240, the decoding apparatus 3500 checks whether the decoded bit string has the value of "0."

If the decoded bit string has the value of "0, the decoding apparatus 3500 reconstructs the decoded bit string as the symbol (i.e. motion vector) and ends the decoding operation of the decoded bit string.

However, if the decoded bit string does not have the value of "0," in a step represented by 4245, the decoding apparatus 3500 extracts a sign bit from the encoded bitstream.

In a step represented by 4250, the decoding apparatus 3500 extracts a bit string below the decimal points from the encoded bit string.

In a step represented by 4255, the decoding apparatus 3500 reconstructs the symbol (i.e. motion vector) by adding the bit string below the decimal points to the decoded bit string and adding a sign corresponding to the extracted sign bit.

Even though the method of encoding symbols of one macroblock has been described above for clear description of the present invention, the decoding apparatus 3500 can repeatedly perform the steps represented by 4210 through 4255 until all symbols of a pertinent frame or VOP are decoded.

Hitherto, although some embodiments of the present invention have been shown and described for the above-described objects, it will be appreciated by any person of ordinary skill in the art that a large number of modifications, permutations and additions are possible within the principles and spirit of the invention, the scope of which shall be defined by the appended claims and their equivalents.

INDUSTRIAL APPLICABILITY

The present invention can be applied to a video codec.

The invention claimed is:

1. An encoding apparatus using a bit precision, the apparatus comprising:

a predicting unit, configured to determine a predicting method of each target pixel of a video datum to be encoded and to compute a prediction value of the target pixel by using the predicting method;

an encoding unit connected to the predicting unit, the encoding unit configured to compute an error value by using the prediction value, to successively increase a size of a predetermined block at an increment of a predetermined unit from a predetermined size of the block and to select a first bit precision value according to the error value corresponding to the block to encode the error value; and a variable block forming unit connected to the encoding unit, the variable block forming unit configured to compute a variable block forming information indicating a forming of a block having an minimum compression capacity by using an encoded result of the block, wherein the encoding unit is configured to generate a bitstream by encoding a block according to the computed variable block forming information, wherein the encoding unit further computes a sign bit by using the prediction value, and at least one of the variable block information, the sign bit and the bit precision value is inserted into the bitstream, wherein the sign bit refers to a sign of a difference between a value of the target pixel and the prediction value, and wherein the prediction value is computed by using values of a plurality of pixels that are adjacent to the target pixel and the sign bit refers to a sign of a difference between a value of the target pixel and the prediction value.

2. The apparatus of claim 1, wherein the encoding unit selects a second bit precision value according to the first bit precision value and further encodes the first bit precision value by using the second bit precision value.

3. A decoding apparatus using a bit precision, the apparatus comprising:

a block generating unit, configured to generate a variable block by using a variable block forming information being extracted from a bitstream to be decoded;

a decoding unit connected to the block generating unit, the decoding unit configured to compute an error value by decoding the bitstream by use of a first bit precision value, a second bit precision value and the variable block forming information being extracted from the bitstream to be decoded;

a predicting unit connected to the decoding unit, the predicting unit configured to determine a predicting method of each target pixel of a video datum to be decoded and to compute a prediction value of the target pixel by using the predicting method; and a reconstructing unit connected to the predicting unit, the reconstructing unit configured to compute a pixel value by using the error value and the prediction value.

4. The apparatus of claim 3, wherein the prediction value is computed by using values of a plurality of pixels that are adjacent to the target pixel.

5. The apparatus of claim 3, wherein the decoding unit decodes the encoded first bit precision value by using the second bit precision value extracted from the bitstream and decodes the encoded error value by using the first bit precision value.

6. An encoding method using a bit precision, the method comprising:

(a) determining a predicting method corresponding to each target pixel of a video datum to be encoded;

(b) computing a prediction value of the target pixel corresponding to the predicting method;

(c) computing an error value by using the prediction value, successively increasing a size of a predetermined block at an increment of a predetermined unit from a predetermined size of the block and selecting a bit precision value according to the an error corresponding to the block and selecting according the error value corresponding to the block;

(d) encoding the error value by using the selected bit precision value;

(e) computing a variable block forming information that minimizes compression capacity by using a result of encoding the block, and (f) generating a bitstream by encoding a block according to the computed variable block forming information, wherein the (c) further computes a sign bit by using the prediction value, wherein at least one of the variable block forming information, the sign bit and the bit precision value is inserted into the bitstream, and wherein the prediction value is computed by using values of a plurality of pixels that are adjacent to the target pixel and the sign bit refers to a sign of a difference between a value of the target pixel and the prediction value.

7. The method of claim 6, wherein the (c) comprises (g1) selecting a first bit precision value corresponding to the error value; and (g2) selecting a second bit precision value corresponding to the first bit precision value.

8. A decoding method using a bit precision, the method comprising:

(a) generating a variable block by extracting a variable block forming information from a bitstream to be decoded;

(b) extracting a bit precision value from the bitstream;

(c) computing an error value by decoding the bitstream by use of the bit precision value and the variable block;

(d) determining a predicting method of each target pixel of a video datum to be decoded and computing a prediction value of the target pixel by using the predicting method; and (e) reconstructing a video datum by using the error value and the prediction value, wherein the prediction value is computed by using values of a plurality of pixels that are adjacent to the target pixel.

9. The method of claim 8, wherein the (b) comprises (e1) extracting a first bit precision value corresponding to the error value from the bitstream, and the (c) comprises (f1) decoding the encoded error value by using the first bit precision value.

10. The method of claim 8, wherein the (b) further comprises extracting the second bitstream from the bitstream before the (e1), and the (c) further comprises decoding the encoded first bit precision value by using the second bit precision value before the (f1).

* * * * *